United States Patent [19]
Mak et al.

[11] Patent Number: 5,721,920
[45] Date of Patent: Feb. 24, 1998

[54] METHOD AND SYSTEM FOR PROVIDING A STATE ORIENTED AND EVENT DRIVEN ENVIRONMENT

[75] Inventors: Simon Chung-Tong Mak, Pomona; Siong-Kiat Ng, Chino Hills, both of Calif.

[73] Assignee: Telefonaktiebolaget LM Ericsson, Stockholm, Sweden

[21] Appl. No.: 286,821

[22] Filed: Aug. 5, 1994

[51] Int. Cl.[6] .................. G06F 9/40; G06F 9/44
[52] U.S. Cl. ............ 395/672; 395/681; 395/825; 395/826
[58] Field of Search ............... 395/650, 700, 395/672, 677, 681, 682, 825, 826, 827

[56] References Cited

U.S. PATENT DOCUMENTS

| | | | |
|---|---|---|---|
| 4,727,575 | 2/1988 | Hansen et al. | 379/94 |
| 4,796,179 | 1/1989 | Lehman et al. | 364/300 |
| 5,018,097 | 5/1991 | Kuhlmann et al. | 364/900 |
| 5,038,296 | 8/1991 | Sano | 364/513 |
| 5,067,072 | 11/1991 | Talati et al. | 395/650 |
| 5,075,847 | 12/1991 | Fromme | 395/700 |
| 5,081,577 | 1/1992 | Hatle | 364/200 |
| 5,089,958 | 2/1992 | Horton et al. | 395/575 |
| 5,165,018 | 11/1992 | Simor | 395/300 |
| 5,168,566 | 12/1992 | Kuki et al. | 395/650 |
| 5,515,538 | 5/1996 | Kleiman | 395/733 |

FOREIGN PATENT DOCUMENTS 93 12619  6/1993  WIPO.

OTHER PUBLICATIONS

IBM Technical Disclosure Bulletin, *Multiple Pattern Recognition Using Finite STATE Automation*, Mar. 1987, vol. 29, NR 10, pp. 4430–4431.

Software—Practice and Experience, *Experiences Structuring Software in a Periodic Real–time Environment*, Jul. 1990, vol. 20(7), pp. 707–718.

*Primary Examiner*—Dennis M. Butler
*Attorney, Agent, or Firm*—Jenkens & Gilchrist, PC

[57] ABSTRACT

The present invention discloses a method and system for providing a Finite State Machine (FSM) which is implemented within a telecommunications application program with the ability to transition from one state to another. The control of the transition being implemented by an Input/Output (I/O) Event Manager subsystem of a preemptive multi-tasking operating system.

Additionally, the present invention discloses a method and system for providing a FSM which is implemented within a telecommunications application program with event driven control of physical devices having input and output capabilities. The event driven control being implemented by the I/O Event Manager subsystem.

68 Claims, 33 Drawing Sheets

GETEVQ

RELEVQ

EVDIS

EVENB

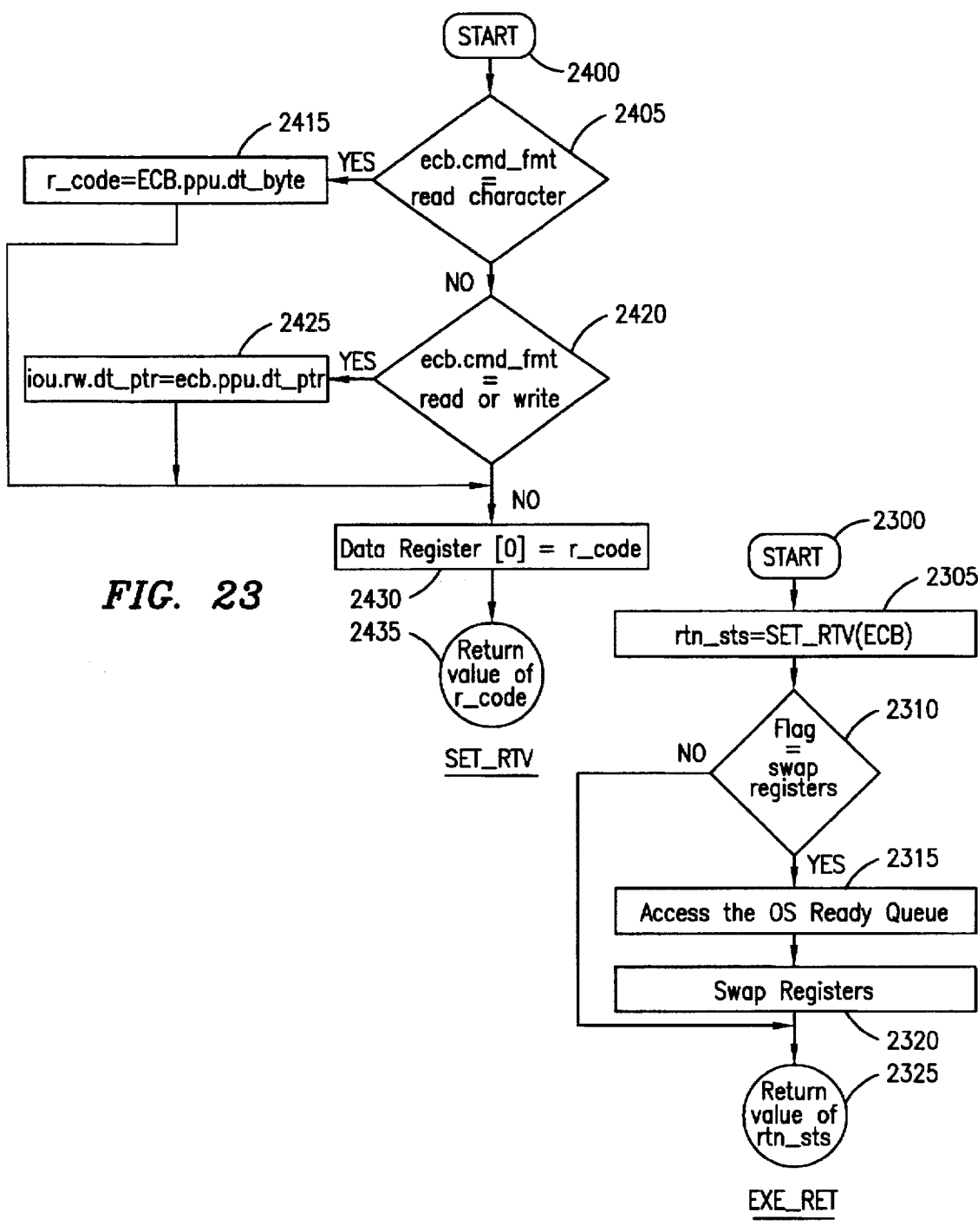

EV_DVN

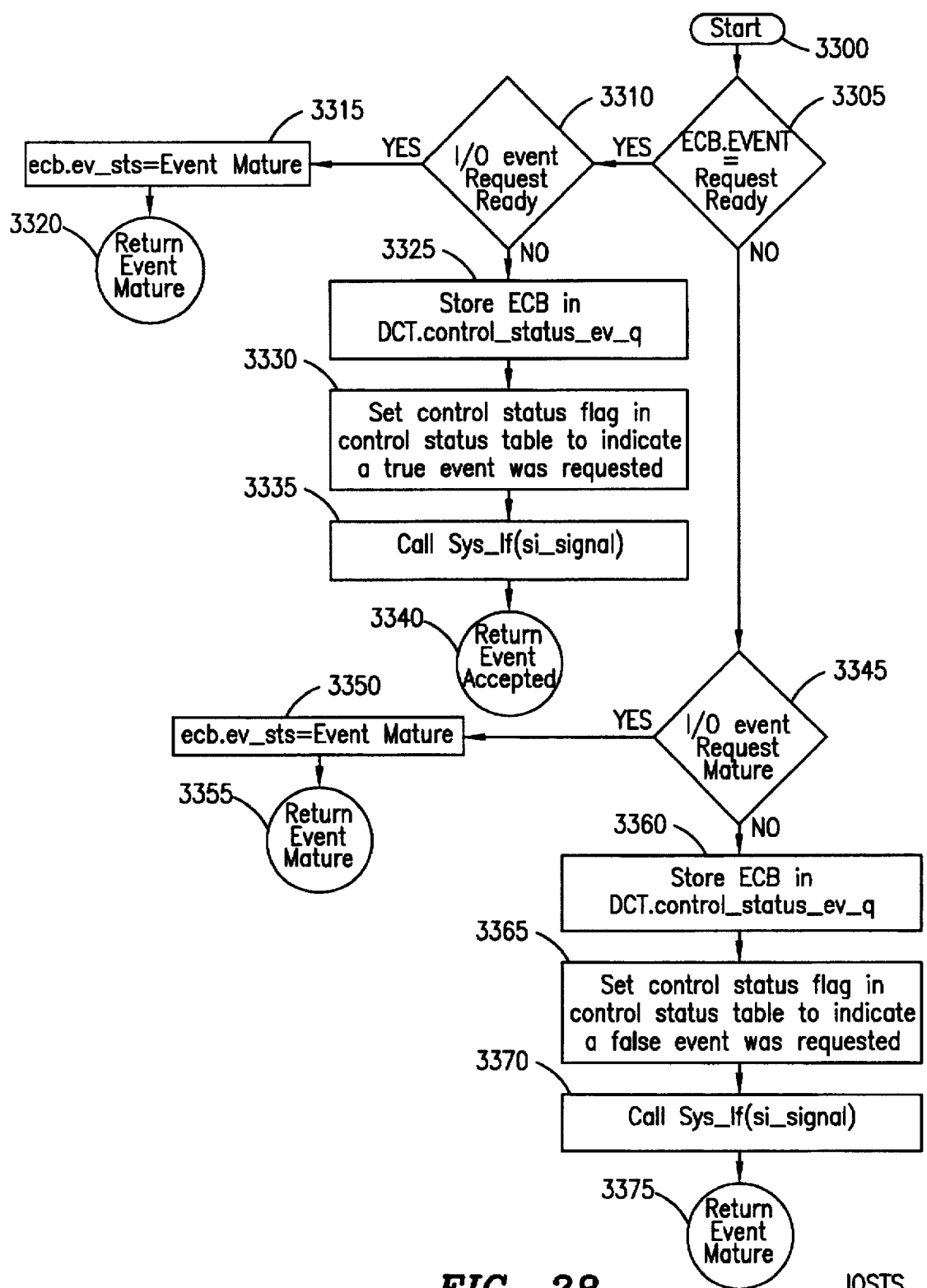
FIG. 28    IOSTS

5,721,920

METHOD AND SYSTEM FOR PROVIDING A STATE ORIENTED AND EVENT DRIVEN ENVIRONMENT

BACKGROUND

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

1. Field of the Present Invention

The present invention relates generally to a preemptive multi-tasking operating system, and more particularly, to a subsystem of the operating system which supports state oriented and event driven control of hardware devices having input/output (I/O) capabilities.

2. History of Related Art

The telecommunication industry is in a period of rapid expansion which has resulted from increases in consumer demand for telecommunication services. The rapid expansion has required the telecommunication industry to become more efficient and cost effective in the implementation of telecommunication services.

A telecommunication service is typically represented by a state diagram illustrating the various states and events that collectively implement the service. These state diagrams, also known as finite state machines (FSMs), can be implemented in a conventional computer programming language. When a FSM representing a telecommunication service is implemented, or written, in a conventional programming language, it is referred to as PFSMs. Presently, it is difficult to implement PFSMs in conventional programming languages because they lack specific methods and systems tailored for PFSMs. Furthermore, the telecommunication industry has not established a standard for implementing PFSMs using conventional programming languages. Because of the absence of a standard and the lack of specific methods and systems for implementing PFSMs using a conventional programming language, FSM implementations are often complex and redundant. As a result, the workload of designers responsible for updating and maintaining PFSMs increases because they must learn about all the methods and systems required to design each PFSM individually before they can be implemented together as a system.

Typically, PFSMs are designed to communicate with physical devices (hardware) in order to implement a particular telecommunication service. Currently, the telecommunication industry has not established a standard for implementing the communication protocol within a PFSM. The absence of such a standard results in further inconsistencies and complexity in trying to implement communication to the PFSM and the hardware. Because PFSMs uniquely depend on the hardware with which they communicate, the designer must rewrite the program for each PFSM operating on a different physical device. This again increases the designer's workload resulting in greater expense because of time loss.

It would be a distinct advantage to have methods and systems which implement the PFSMs independent of the hardware in a consistent fashion. The method and system would provide a PFSM with the ability to perform transitions from state-to-state, process I/O events for physical devices in real-time, and communicate with the physical devices at the operating system level. Additionally, the methods and systems would support existing implementations of PFSMs so that upgrades thereto would also utilize the new systems and methods. The present invention provides such systems and methods.

SUMMARY

An object of the present invention is to provide a consistent method and system for the implementation of PFSMs in conventional programming languages.

Another object of the present invention is to provide a consistent method and system for communication practical between a PFSM and a physical device.

A further object of the present invention is to support and provide new and existing PFSMs with the ability to perform transitions from state-to-state, real-time processing of events, and communication with physical devices at the operating system level.

BRIEF DESCRIPTION OF THE DRAWING

The present invention will be better understood and its numerous objects and advantages will become more apparent to those skilled in the art by reference to the following drawings, in conjunction with the accompanying specification, in which:

FIG. 22 is a flow chart of the operations which comprise the EXE_RETURN function in the event driven coordination portion of FIG. 4C in the preferred embodiment of the present invention;

FIG. 23 is a flow chart of the operations which comprise the SET_RTV function in the event driven coordination portion of FIG. 4C in the preferred embodiment of the present invention;

FIG. 28 is a flow chart of the operations which comprise the IOSTS function in the device driver of FIG. 1 in the preferred embodiment of the present invention;

DETAILED DESCRIPTION

Figure 1:
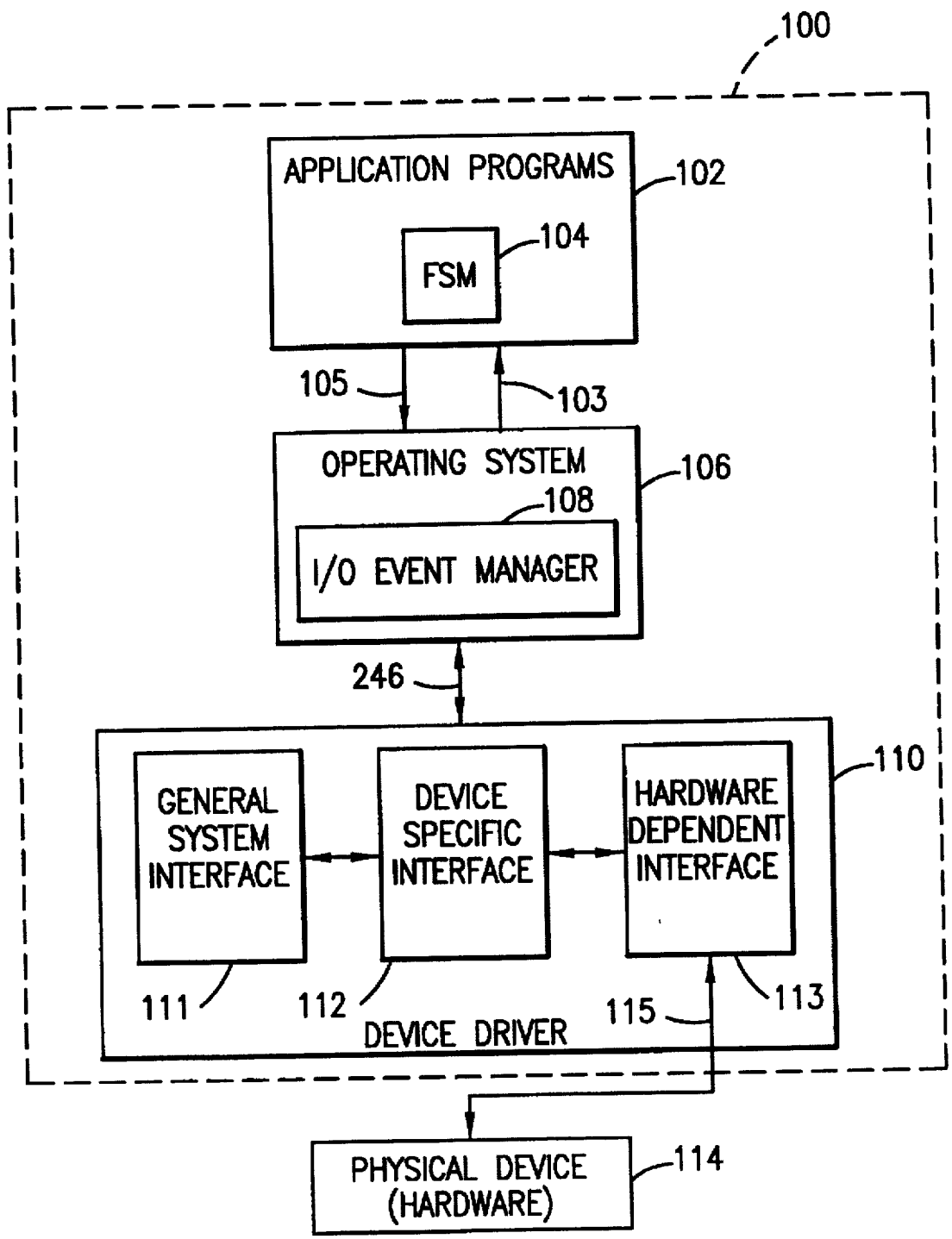
FIG. 1 is a block diagram of a computer system implementing a preferred embodiment of the present invention.

FIG. 1 is a block diagram of a computer system 100 which employs a preferred embodiment of the present invention. The computer system 100 comprises an application program 102 having FSM 104, a pre-emptive multi-tasking Operating System (OS) 106 having an Input/Output Event Manager Subsystem (I/O Event Manager) 108, and a Device Driver 110. The FSMs 104 communicate with physical devices such as, for example, Physical Device 114 via the I/O Event Manager 108 and the device driver 110. The I/O Event Manager 108 provides the FSM 104 with support for state transitions and event driven control over communications with the physical device 114 via logic paths 103 and 105. The device driver 110 is employed by the I/O Event Manager 108 to coordinate the event driven control via bi-directional logic path 246. The OS 106 can be, for example, a MICROS® operating system which is produced by Ericsson Business Communications in Cypress, Calif. One function of the OS 106 is to maintain registers, data and a return address (environment) for each process (task) created therein. The OS 106 maintains the environment of each process by storing the environment on a selected stack. The OS 106 also keeps track of the state of a process and its environment by utilizing a data structure such as, for example, the Task Control Block (hereinafter "TCB") data structure employed by the MICROS operating system.

Figure 2:
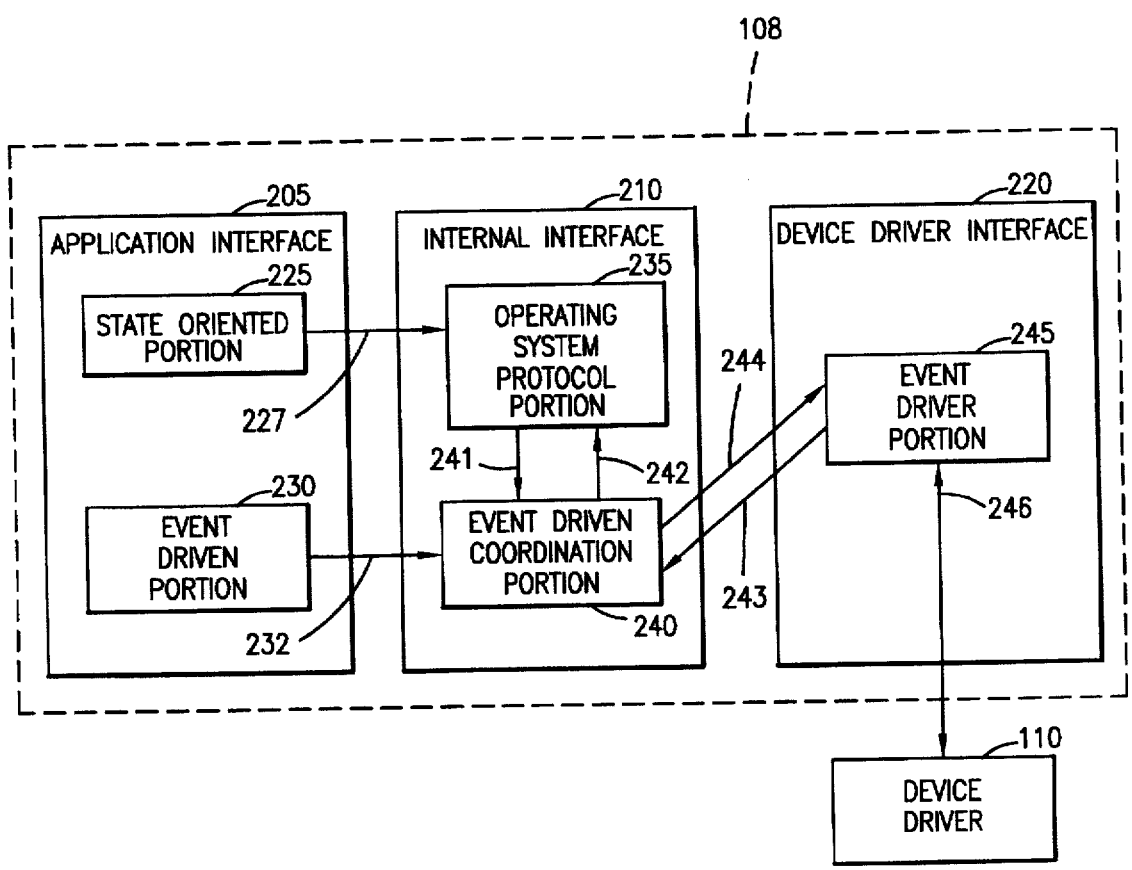
FIG. 2 is a block diagram which further illustrates the components of the I/O Event Manager of the computer system in FIG. 1 according to the preferred embodiment of the present invention.

FIG. 2 is a block diagram which further illustrates the components of the I/O Event Manager 108 of FIG. 1 in the preferred embodiment of the present invention. The I/O event manager 108 comprises the following three interfaces: an application interface 205, an internal interface 210, and a device driver interface 220. An example of how the I/O Event Manager 108 of the preferred embodiment of the present invention may be implemented in the computer programming language C++, hereinafter referred to as "C++", is illustrated in Appendix 1. The application interface 205 comprises a state oriented portion 225 and an event driven portion 230, each of which are described in separate sections below.

Application Interface/State Oriented Portion

Still referring to FIG. 2, the state oriented portion 225 communicates with the internal interface 210 via a logic path 227, and provides the FSMs 104 (FIG. 1) with the ability to perform a transition from one state to another (state transition) at the operating system level. Performing state transitions at the operating system level promotes consistency in the implementation of FSMs 104. In order for the FSMs 104 to utilize the state oriented portion 225, it must implement each one of its associated states within a main state processing function. A main state processing function is analogous to the functions defined for a class in C++ and similar to the procedures and functions declared in conventional programming languages. The main state processing function can be comprised of numerous nested functions or procedures. However, the scope for the implementation of an individual state must be limited to the main state processing function and its related nested functions or procedures. In other words, there must be only one main state processing function for each individual state of a FSM.

Figure 3A:
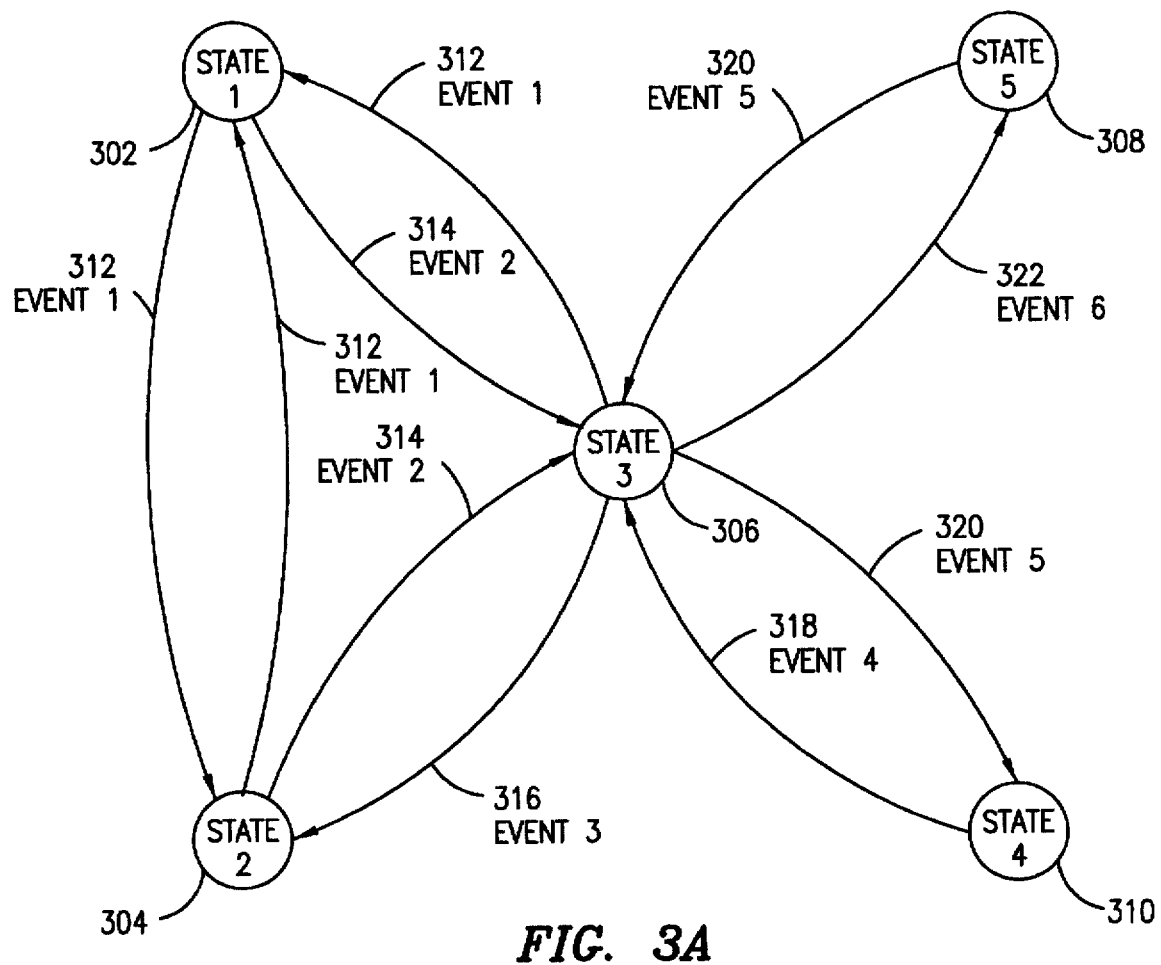
FIG. 3A is a state transition diagram for an FSM running on the computer system of FIG. 1 according to the preferred embodiment of the present invention.

FIG. 3A is a state transition diagram for one of the FSMs 104 of FIG. 1 in the preferred embodiment of the present invention. The FSM comprises state 1 302, state 2 304, state 3 306, state 4 310, and state 5 308. The transition from one state to another within the FSM is precipitated by either event 1 312, event 2 314, event 3 316, event 4 318, event 5 320, or event 6 322. Each state of the FSMs 104 is implemented in a main state processing routine. For example, each state of the FSMs 104 can be implemented in C++ as illustrated below in Table I.

TABLE I

```
void sta.fn1( )
{
/*The computer code which implements state 1 302 would
reside here. */
}
    .
    .
    .
void sta.fn5( )
{
/*The computer code which implements state 5 308 would
reside here. */
}
```
© 1993 Telefonaktiebolaget L M Ericsson It should be noted that although the FSM 104 does not use nested FSMs, the preferred embodiment of the present invention provides support for the nesting of FSMs.

Referring back to FIG. 2, the state oriented portion 225 allows a specified process within the OS 106 to transition from one state to another by manipulating an associated TCB data structure. The information required for the state oriented portion 225 to manipulate a specified TCB data structure can be acquired and stored in numerous ways. For example, in the preferred embodiment of the present invention, the required information is stored in a State Control Block (SCB) data structure and a State Vector Table (SVT) data structure. A predetermined number of SCB data structures are dynamically allocated (created) during the initialization of the I/O Event Manager 108. A linked list structure can be used to determine the locations of the dynamically allocated SCB data structures within the memory of an associated computing system.

Figure 3B:
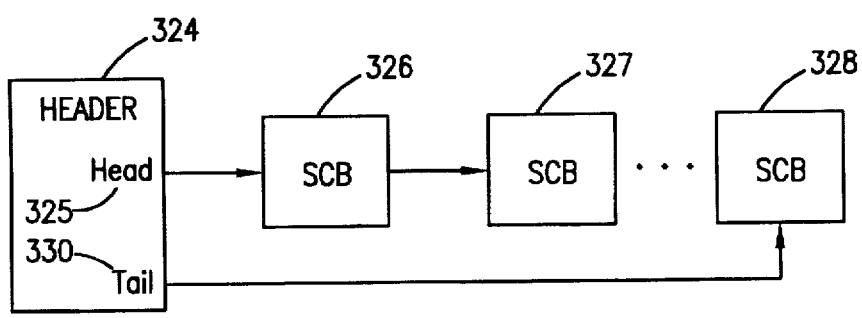
FIG. 3B is a block diagram which illustrates a linked list (sub_arry) structure used for linking SCB data structures which are dynamically allocated within the I/O Event Manager of FIG. 2 in the preferred embodiment of the present invention.

FIG. 3B is a block diagram illustrating such a link list (scb_arry) data structure linking the dynamically allocated SCB data structures 326–328 within the I/O Event Manager 108 of FIG. 2 in the preferred embodiment of the present invention. The scb_arry includes a header data structure 324 having pointers head 325 and tail 320 which indicate the location of the first SCB 326 and last SCB 328, respectively within the scb_arry.

An SVT data structure may be, for example, a single dimensional array comprising a plurality of elements. Each element within the array being used to store the physical address of a main state processing function. The storing of the physical addresses is sequenced so that the location of each element within the array has a one-to-one correspondence with a particular state of a specified FSM. For example, the SVT data structure for the FSM 104 of FIG. 1 is illustrated in C++ in Table II below.

TABLE II

SFV SVT[ ] = {sta_fn1, sta_fn2, sta_fn3, sta_fn4, sta_fn5}

© 1993 Telefonaktiebolaget L M Ericsson

The five state variables sta_fn1–sta_fn5 within array SVT represent the physical locations (addresses) of state 1 302, state 2 304, state 3 306, state 4 310, and state 5 308, respectively of FSM 104 (FIG. 1).

An example of a dynamically allocated SCB data structure according to preferred embodiment is illustrated in C++ in Table III below.

TABLE III

```
typedef struct
{
    QUE_MBS    link;           /* SCB linked list structure*/
    WORD       scb_id;         /* SCB ID */
    WORD       scb_sts;        /* status */
    WORD       sta;            /* current state */
    WORD       pre_sta;        /* previous state */
    WORD       total_sta;      /* total number of states */
    WORD       pid;            /* process ID */
    WORD       *loc_tos;       /* local top of stack */
    WORD       *us_reg_ptr;    /* user register block */
    WORD       *svt_ptr;       /* state vector table */
}SCB
```
© 1993 Telefonaktiebolaget L M Ericsson The variable link (scb. link) is a component of the scb_arry which interconnects the previously allocated list of SCBs together. The variable scb_id (scb. scb_id) identifies the SCB data structure within the scb_arry. Variable scb_sts (scb. scb_sts) indicates whether the SCB is available for use. Variable sta (scb. sta) contains the current state of an associated FSM. The variable pre_sta (scb. pre_sta) contains the previous state of the FSM. The variable total_sta (scb. total_sta) indicates the total number of states within the FSM, and is used for accessing an SVT data structure associated with the FSM. Variable pid (scb. pid) identifies a process associated with the FSM. Variable loc_tos (scb. loc_tos) is a pointer to the local top of stack for the identified process. Variable us_reg_ptr (scb. us_reg_ptr) is a pointer to the user register block associated with the identified process. The variable svt_ptr (sub. svt_ptr) is a pointer to the SVT data structure.

Figure 4A:
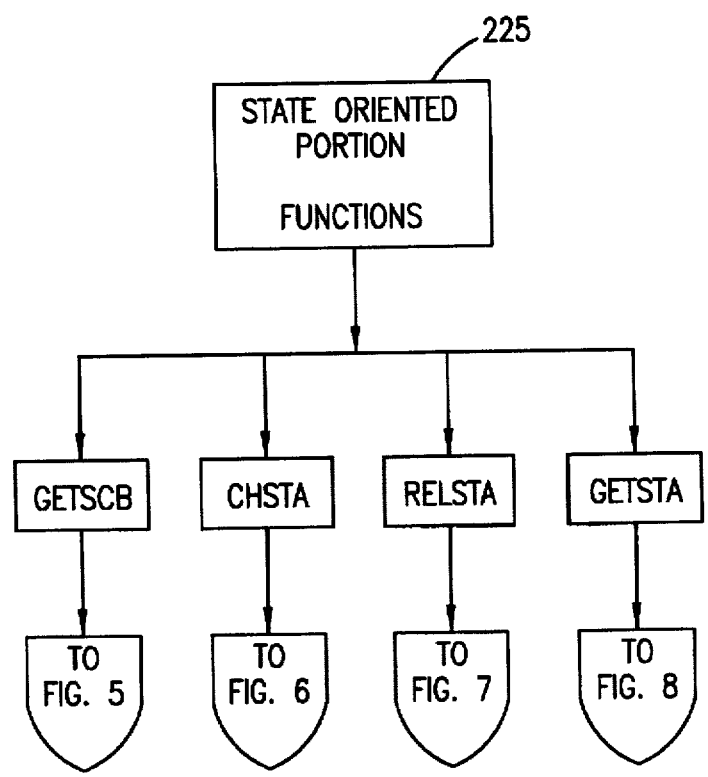
FIG. 4A is a block diagram illustrating in greater detail the functions comprising the state oriented portion of the I/O Event Manager in FIG. 2 according to the preferred embodiment of the present invention.
Figure 4C:
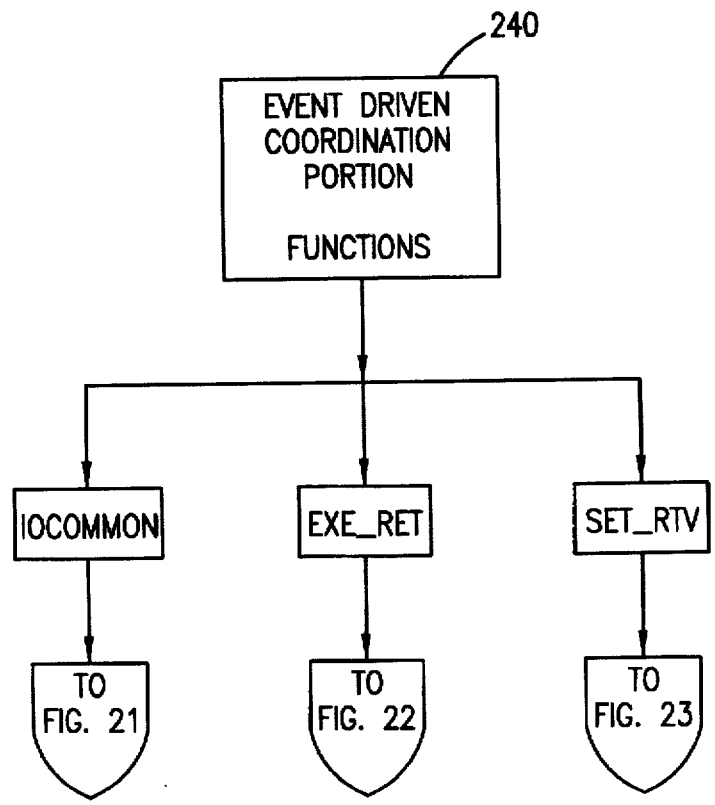
FIG. 4C is a block diagram illustrating in greater detail the functions of the event driven coordination portion of the I/O Event Manager in FIG. 2 according to the preferred embodiment of the present invention.

FIG. 4A is a block diagram illustrating in greater detail the functions comprising the state oriented portion 225 of FIG. 2 in a preferred embodiment of the present invention. The state oriented portion 225 comprises the following four functions: get scb (GETSCB), change state (CHSTA), release scb (RELSCB) and get state (GETSTA). The GETSCB, CHSTA, RELSCB, and GETSTA functions are illustrated in greater detail in FIGS. 5, 6, 7 and 8, respectively, and described in detail in connection therewith.

The GETSCB function of the state oriented portion of 225 must be invoked before any state transitioning occurs within a FSM. If an SCB data structure is available, the GETSCB function retrieves the SCB from the scb_arry and then initializes it with information received from FSM 104 and the OS 106. The following information is provided by FSM 104: the total number of states in the FSM, any default parameter required to be passed to a transitioned state, the top of stack for a parent FSM if the current FSM is nested, and a way to access the SVT data structure associated with the FSM. In the preferred embodiment of the present invention a state table (STB) data structure is used to provide the required information to the GETSCB function. An example of how the STB data structure can be implemented in C++ is illustrated in Table IV below:

TABLE IV

```
typedef struct
{
    word    total_sta;
    int     deft_prm;
    word    *loc_tos;
    SFV     *svt_adr;
} STA_TBL
```

© 1993 Telefonaktiebolaget L M Ericsson

The variable total_sta (STB. total_sta) identifies the total number of states within the FSM. Variable deft_prm (STB. deft_prm) identifies a parameter to be passed to a transitioned state. The variable loc_tos (STB. loc_tos) is a pointer to the local top of stack of a process associated with the FSM. Variable svt_adr (STB. svt_adr) is a pointer to a SVT data structure associated with the FSM.

Figure 5:
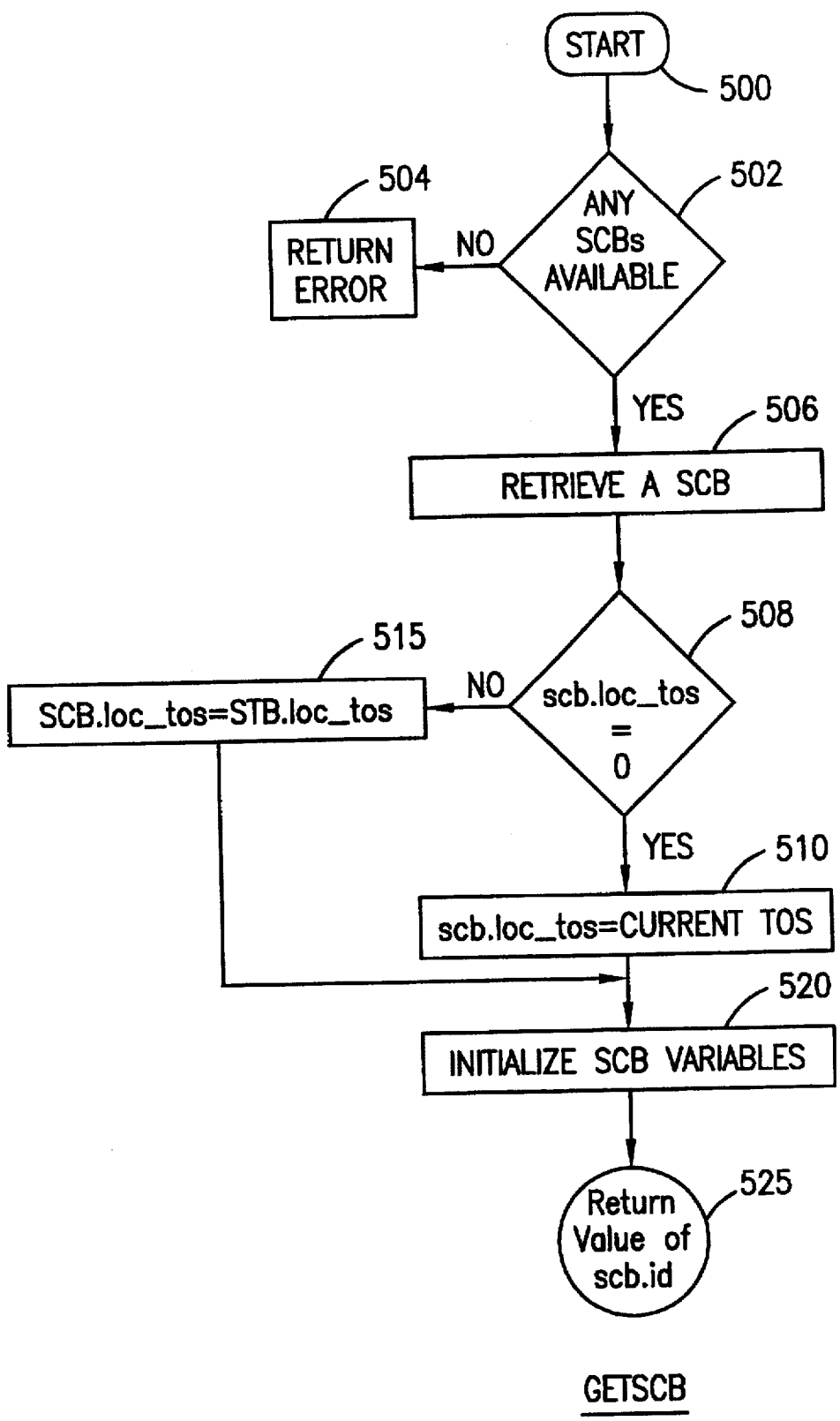
FIG. 5 is a flow chart of the operations which comprise the GETSCB function in the state oriented portion of FIG. 4A in the preferred embodiment of the present invention.

FIG. 5 is a flow chart of the operations which comprise the GETSCB function of the state oriented portion 225 of FIG. 2 in the preferred embodiment of the present invention. The GETSCB function is provided with a STB data structure from a FSM. The GETSCB function begins at step 500 and proceeds to step 502 by determining whether any SCB data structures available. If no SCB data structures are available, then the function proceeds to return. If SCB data structures are available, then the function proceeds to step 504, an error, at step 504, which indicates that no SCB data structures are currently available, and the function proceeds to end. At step 506, an SCB data structure is retrieved from the scb_arry, and the function proceeds to step 508.

At step 508, the value of variable scb. loc_tos is compared to zero to determine whether the function was requested by a nested FSM. If the value of variable scb. loc_tos equals zero (i.e., the function was requested from a nested FSM), then the function proceeds to step 515; otherwise the function proceeds to step 510 where variable scb. loc_tos is set equal to the current executing process's top of stack, and the function proceeds to step 520. At step 515, the variable scb. loc_tos is set equal to the variable STB. loc_tos, and the function proceeds to step 520. At step 520, the variables of the SCB data structure are initialized with information from the current executing process and the STB data structure. The function then proceeds to return the value of variable scb. id at step 525, and the function proceeds to end. The value of variable scb_id is used by FSM 104 (FIG. 1) to identify the SCB data structure which is associated with it.

Figure 6:
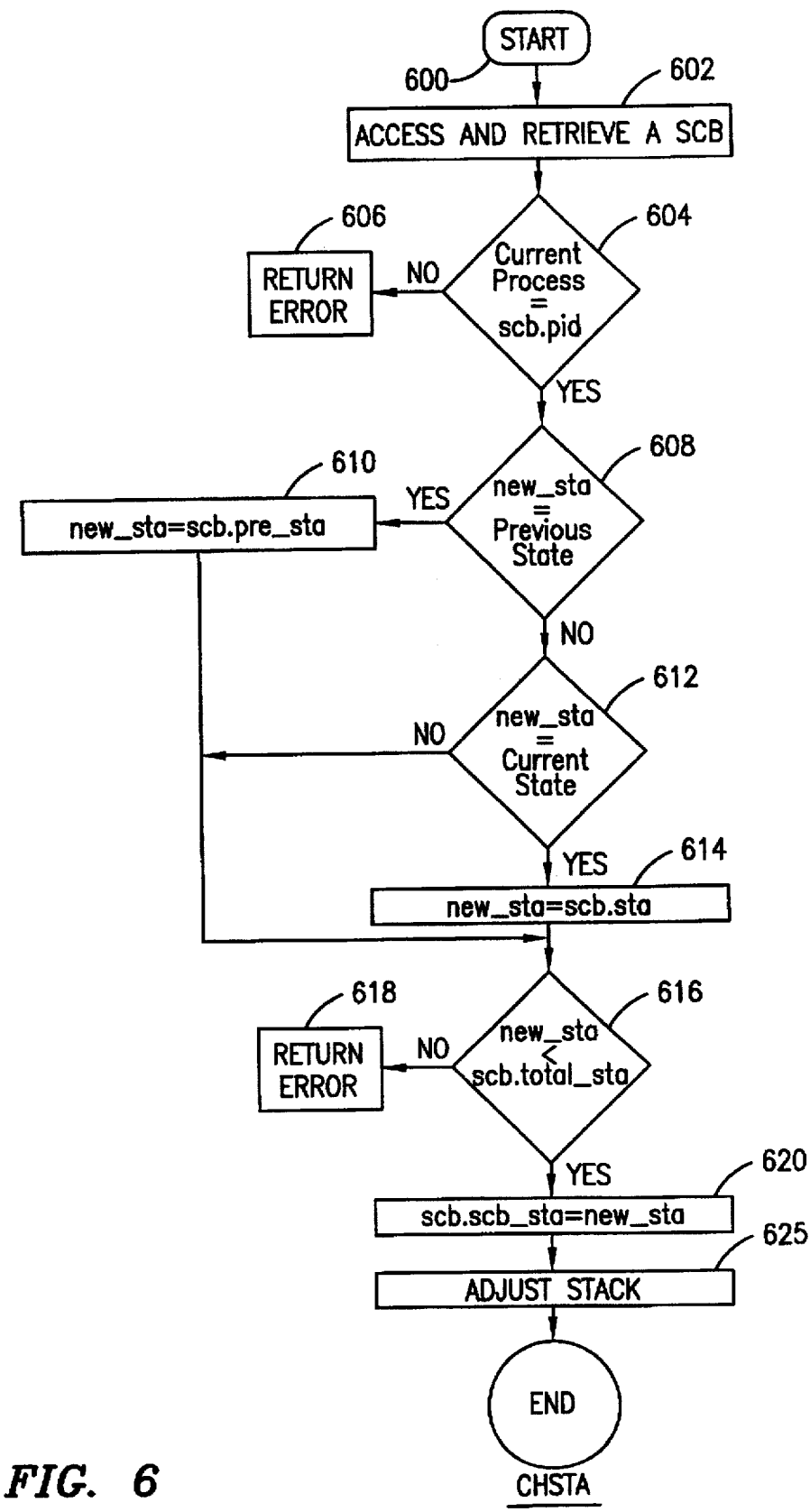
FIG. 6 is a flow chart of the operations which comprise the change state function (CHSTA) in the state oriented portion of FIG. 4A in the preferred embodiment of the present invention.

The CHSTA function of the state oriented portion 225 (FIG. 2) provides FSM 104 (FIG. 1) with the ability to transition from one state to another. FIG. 6 is a flow chart of the operations which comprise the change state function (CHSTA) in the preferred embodiment of the present invention. The CHSTA function is provided with the following information from a FSM: the identification of a SCB data structure (scb_id), an identification of a new state (new_sta) to which FSM 104 is to transition and a parameter (prm) which is to be passed to the new state. The CHSTA function begins at step 600 and proceeds to step 602 where the scb_arry 305 is accessed with the value of variable scb_id and an SCB data structure which is identified by the variable scb_id is retrieved. The function then proceeds to determine whether the current executing process is the same process identified by the variable scb. pid at step 604. If the executing process is the same process as identified by variable scb. pid, then the function proceeds to step 608; Otherwise, the function proceeds to return an error indicating that the SCB data structure identified by variable scb. id is invalid, and the function proceeds to end. At step 608, a determination of whether the variable new_sta indicates a request for a previous state is made. If variable new_sta indicates that a request for a previous state is made, then the function proceeds to step 610. If variable new_sta indicates that a request for a previous state was not made, then the function proceeds to step 612.

At step 610, variable new_sta is set equal to variable scb. pre_sta, and the function proceeds to step 616. At step 612, a determination of whether a request for the current state is made. If variable new_sta equals a request for the current state, then the function proceeds to step 614. If variable new_sta does not equal a request for the current state, then the function proceeds to step 610 where the variable new_sta is set equal to variable scb. pre_sta, and the function proceeds to step 616. At step 614, variable new_sta is set equal to variable scb. sta, and the function proceeds to step 616 where variable new_sta is analyzed to determine whether a valid transition state was specified. If the value of variable new_sta is less than the value of variable scb. total_sta, then the function proceeds to step 620. Otherwise, the function proceeds to step 618 where an error is returned indicating that an invalid state was requested, and the function proceeds to end.

At step 620, variable scb. pre_sta is set equal to variable new_sta, and the function proceeds to step 625 where variable scb. loc_tos is used to adjust a specified FSM's stack so that variable prm, variable scb. deft_prm, and the memory address of the main state processing function for the identified new state may be pushed onto the stack. The memory address of the main state processing function for the identified new state is acquired by accessing the associated SVT data structure with the value of variable new_sta. Variable prm, variable scb. deft_prm and the memory address of the main state processing function for the new state are all pushed onto the adjusted FSM's stack, and the function proceeds to end.

Once a FSM has successfully performed its required state transitions, the previously retrieved SCB data structure must be released. If the retrieved SCB is not released after the FSM has completed its operation, a dead SCB will result. A sufficient number of dead SCBs will eventually result in the failure of I/O event manager 108.

Figure 7:
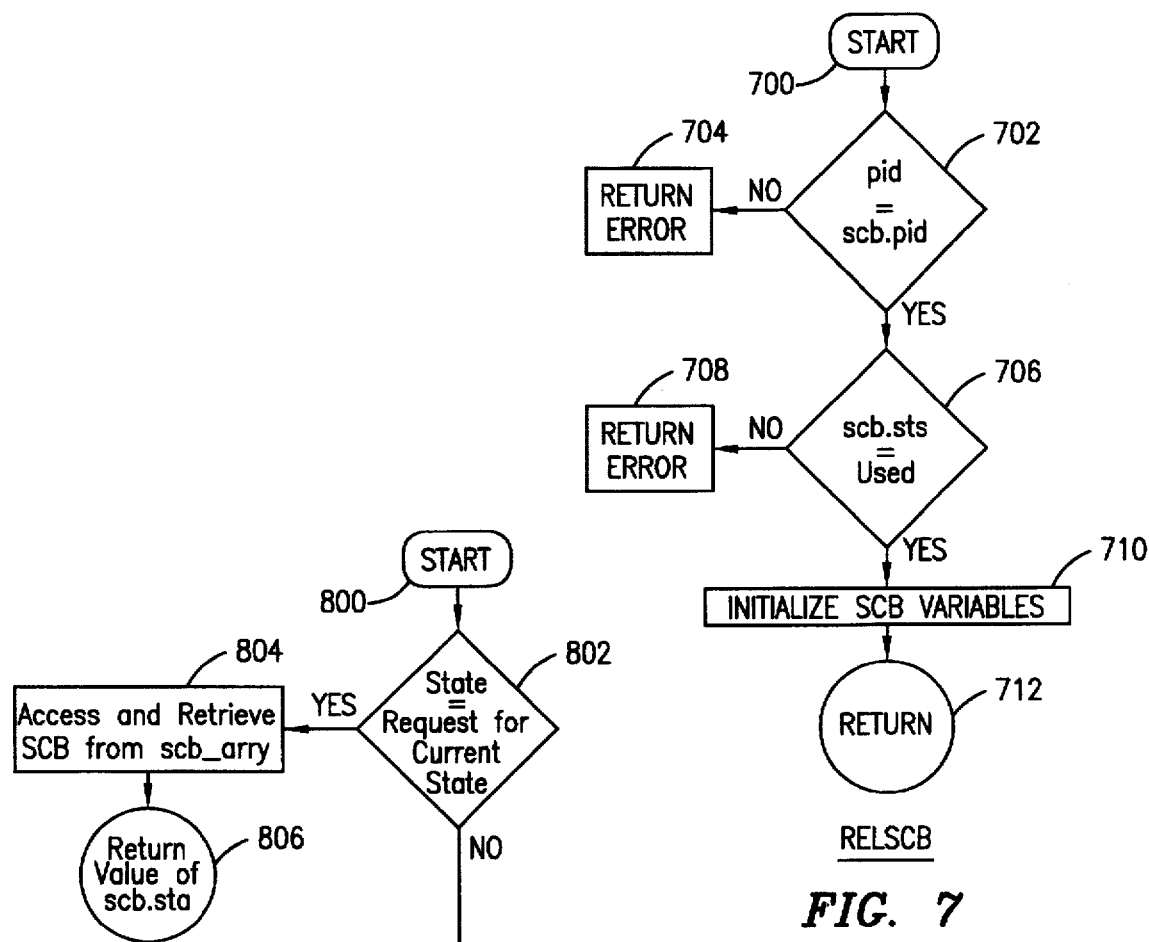
FIG. 7 is a flow chart of the operations which comprise the RELSCB function in the state oriented portion of FIG. 4A in the preferred embodiment of the present invention.

The RELSCB function of the state oriented portion 225 (FIG. 2) releases a previously retrieved SCB data structure. The RELSCB function is provided with the following information from a FSM: a variable identifying the retrieved SCB data structure (scb_id) and a variable identifying the current process (pid). FIG. 7 is a flow chart of the operations which comprise the RELSCB function in the preferred embodiment of the present invention. The RELSCB function begins at step 700 and proceeds to step 702 where a determination of whether the process (task) identified by the retrieved SCB (scb. pid) is equal to the current executing process (pid) is made. If variable pid does not equal variable scb. pid (i.e., the current process≠identified process), then the function proceeds to step 704. Otherwise, the function proceeds to step 706. At step 704, an error is returned indicating that the process identified by variable scb. pid is not the current executing process and the function proceeds to end. At step 706 the identified SCB data structure is verified to have been used. If variable scb. sts indicates that the SCB has been used, then the function proceeds to step 708 where an error is returned indicating that the SCB data structure was not used, and the function proceeds to end. If variable scb. sts indicates that the scb is not in use, then the function proceeds to step 710 where the SCB data structure is initialized to default values, and the function proceeds to end at step 712.

Figure 8:
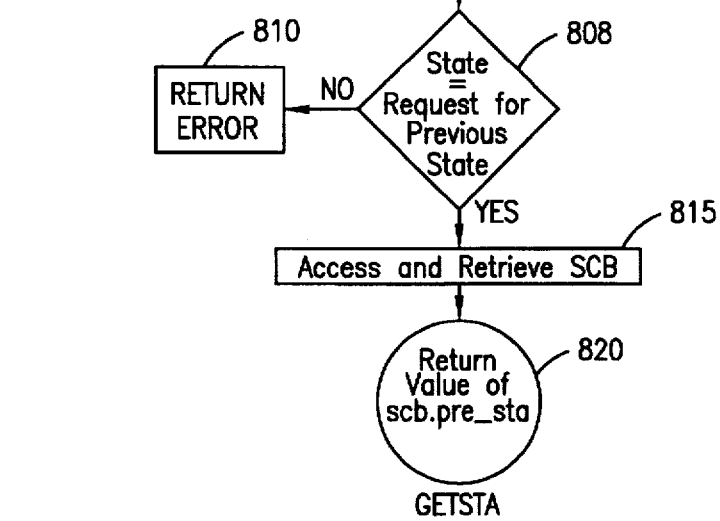
FIG. 8 is a flow chart of the operations which comprise the GETSTA function in the state oriented portion of FIG. 4A in the preferred embodiment of the present invention.

The GETSTA function of the state oriented portion 225 (FIG. 2) is used to determine the current or previous state of FSM 104. FIG. 8 is a flow chart of the operations which comprise the GETSTA function in the preferred embodiment of the present invention. The GETSTA function is provided with the following information from a FSM: a variable identifying the retrieved SCB data structure (scb. Id) and a variable indicating whether the current or previous state is requested (state). The GETSCB function begins at step 800 and proceeds to step 802 where the variable state is analyzed to determine whether a request for the current state is made. If the request is for the current state, then the function proceeds to step 804. Otherwise, the function proceeds to step 806. At step 804, the scb__arry is accessed by using the value of variable scb__id, and a SCB data structure identified by variable scb__id is retrieved, and the function proceeds to step 806. At step 806, the value of variable scb. sta is returned, and the function proceeds to end.

At step 808, a determination whether the request was for the previous state is made. If the request was for the previous state, then the function proceeds to step 815. Otherwise, the function proceeds to step 810. At step 810, an error is returned indicating that an invalid state was requested, and the function proceeds to end. At step 815, the scb__arry is accessed by using the value of variable scb__id and a SCB data structure identified by the variable scb__id is retrieved, and the function proceeds to step 820. At step 820, the value of variable scb. pre__sta is returned, and the function proceeds to end.

Application Interface/Event Driven Portion

Referring again to FIG. 2, the event driven portion 230 of application interface 205 communicates with the internal interface 210 via a logic path 232, and provides FSM 104 of FIG. 1 with the ability to have event driven control of the I/O capabilities of physical device 114. Control of the I/O capabilities includes controlling the reading and writing of information to and from the physical device 114, and the ability to determine the status of a particular event within the physical device 114. The following types of event driven control are provided by the event driven portion 230 (FIG. 2): no waiting, passive waiting, active waiting and redirection waiting. Passive, active, no, and redirection waiting are defined below in connection with their use by a FSM.

A FSM which makes an I/O request specifying passive waiting is suspended until the I/O request has matured, at which time, the FSM is reactivated. A FSM which makes an I/O request specifying active waiting continues to execute until the I/O request has matured, at which time, the FSM is returned to the location where the I/O request was originally made. An I/O request by a FSM which specifies redirection waiting continues to execute until the I/O request has matured, at which time, the FSM is redirected to a specified state. The event driven control is provided by the event driven portion 230 (FIG. 2) in conjunction with the event driven coordination portion 240 (FIG. 2) of the internal interface 210 (via logic path 232) and the event driven driver portion 245 of the device driver interface 220 via logic paths 244 and 245.

The information required by the event driven portion 230 can be provided and stored in numerous ways. For example, in the preferred embodiment of the present invention an Event Control Block (ECB) data structure is employed. Each I/O requested must have an ECB data structure associated with it. Since numerous I/O requests occur within an application program, a predetermined number of ECB data structures are dynamically allocated (created) within the I/O Event Manager 108 (FIG. 1) during the initialization of the OS 106 (FIG. 1). In order to determine the locations of the allocated ECB data structure within the memory of an associated computing system a linked list data structure such as a queue is used. For example, in the preferred embodiment of the present invention a linked list structure (ecb__arry) is used to contain the allocated ECB data structures.

Figure 9:
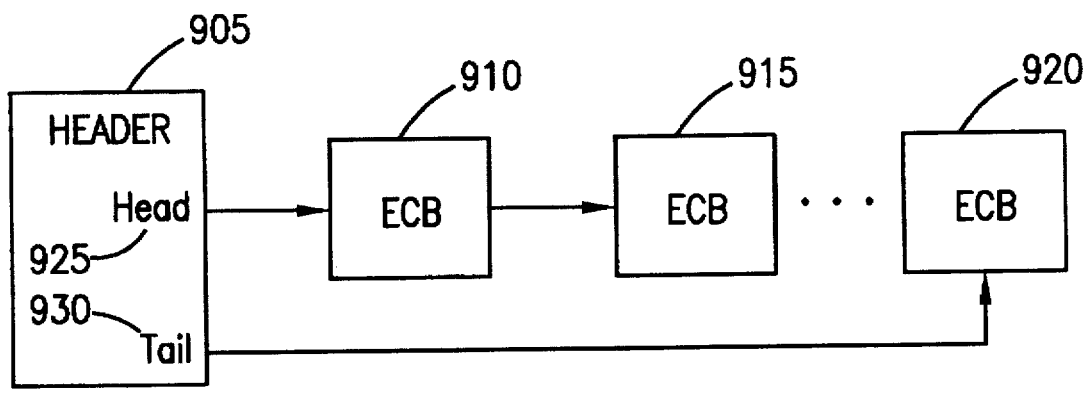
FIG. 9 is a block diagram which illustrates a linked list (ecb_arry) used for linking the dynamically allocated ECB data structures within the I/O Event Manager of FIG. 2 in the preferred embodiment of the present invention.

FIG. 9 is a block diagram which illustrates a linked list data structure (ecb__arry) used for linking the allocated ECB data structures within the I/O event manager 108 of FIG. 1 in the preferred embodiment of the present invention. The ecb__arry includes a header data structure 905 having pointers head 925 and tail 930 for indicating the locations of a first ECB 910 and a last ECB 920, respectively within the ecb__arry. An example of an allocated ECB data structure is illustrated in C++ in Table V below:

TABLE V

```
typedef struct
{
    QUE_MB   link;         /* ECB linked list structure */
    WORD     ecb_id;       /* ECB ID */
    WORD     mevq_id;      /* associated matured event queue */
    WORD     cmd_fmt;      /* command or read, write format */
    WORD     rc;           /* response code or action if event
                              matured */
    WORD     pid;          /* user task (process ID) */
    WORD     dev_id;       /* device ID */
    WORD     event;        /* event code */
    WORD     ev_sts;       /* status of the requested event */
    union
    {
        void    *dt_ptr;   /* I/O data pointer */
        WORD    dt_word;   /* I/O data word, 16 bit */
        BYTE    dt_byte;   /* I/O data byte, 8 bit */
    } ppu;                 /* I/O parameter data type union */
    US_REG   *us_reg_ptr;  /* user registers pointer */
    IOU      *iou_ptr;     /* IOU pointer */
} ECB;
```

© 1993 Telefonaktiebolaget L M Ericsson

The variable link is a component of the ECB__arry (queue) which interconnects the previously dynamically allocated list of ecb's together. Variable ecb__id (ecb. ecb__id) is used to identify the ECB data structure within the ecb__arry. The variable mevq__id (ecb. mevq. id) identifies an associated matured event queue. Variable cmd__fmt (ecb. cmd__fmt) represents a requested operation of the device driver (e.g. read or write). Variable pid (ecb. pid) identifies the process associated with the FSM making the I/O request. The variable dev__id (ecb. dev__id) identifies the device driver from which the I/O request is to be collected. Variable event (ECB. EVENT) identifies the type of event waiting requested (e.g. active or passive). The variable ev__sts (ecb. ev__sts) indicates the status of the requested event. The data structure ppu (ecb. ppu) is used to record and transmit data from a requested event. The ppu data structure includes the following pointers for accessing data: dt__ptr (ecb. ppu. d__ptr), dt__word (ecb. ppu. dt__word) and dt__byte (ecb. ppu. dt__byte). Variable us__reg__ptr (ecb. us__reg__ptr) is a pointer to the associated process's register location. The variable iou__ptr (ecb. iou__ptr) is a pointer to an associated IOU data structure and is used to access an IOU data structure.

Referring once again to FIG. 2, the event driven portion 230 (FIG. 2) supports multiple active and redirection I/O requests within a FSM. In active and redirection event waiting the maturing of multiple I/O requests may occur simultaneously with the execution of a matured previous active or redirection I/O request. Therefore, a data structure is required for storing matured I/O requests (i.e., ECB data structures) during multiple active or redirection I/O requests. In the preferred embodiment of the present invention a Matured Event Queue (MEVQ) data structure is used for storing associated ECB data structures during multiple active or redirection I/O requests. The I/O event manager 108 (FIG. 2) dynamically allocates a predetermined number of MEVQ data structures during its initialization. In order to determine the locations of the dynamically allocated MEVQ data structure within the memory of an associated computing system a linked list structure such as a queue is used.

Figure 10:
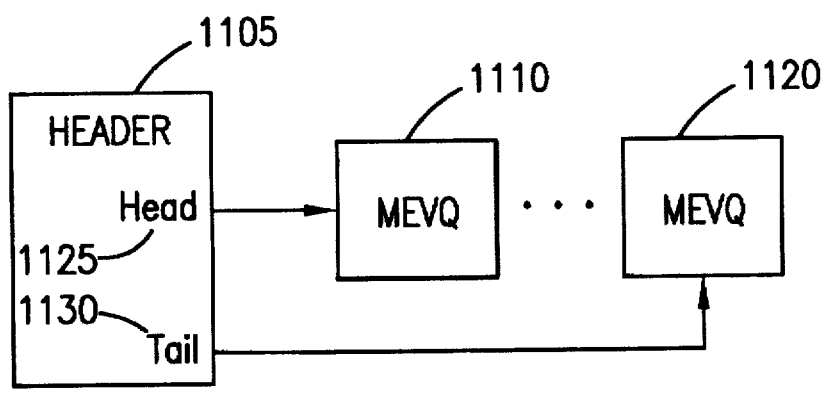
FIG. 10 is a block diagram which illustrates a linked list (mevq_arry) used for linking MEVQ data structures which are dynamically allocated within I/O Event Manager of FIG. 2 in the preferred embodiment of the present invention.

FIG. 10 is a block diagram which illustrates a linked list (mevq_arry) employed for containing MEVQ data structures which are dynamically allocated within I/O event manager 108 of FIG. 2 in the preferred embodiment of the present invention. The mevq_arry may contain a plurality of dynamically allocated MEVQ data structures 1110 through 1120. The mevq_arry includes a header data structure 1105 having pointers head 1125 and tail 1130 for indicating the locations of a first MEVQ 1110 and a last MEVQ 1120 respectively within the mevq_arry. A dynamically allocated MEVQ data structure is illustrated in C++ in Table VI below:

TABLE VI

```
typedef struct
{
    QUE_MBS    link;       /* link list structure */
    WORD       pid;        /* User task ID that owned this
                              queue */
    WORD       mevq_id;    /* matured event queue id */
    WORD       q_sts;      /* Queue status */
    EV_LIST    mq;         /* Queue */
} MEVQ
```

© 1993 Telefonaktiebolaget L M Ericsson

The variable link (mevq. link) is a component of the mevq_arry (queue) which interconnects the previously dynamically allocated mevqs together. Variable pid (mevq. pid) identifies an associated process. The variable mevq_id (mevq. mevq_id) identifies the MEVQ data structure within the mevq_array. Variable q_sts (mevq. q_sts) is used to enable and disable the MEVQ during multiple execution of active and redirection I/O requests. The variable mq (mevq. mq) is a linked list for ECB data structures that have matured I/O requests for the process identified by variable mevq. pid.

Figure 4B:
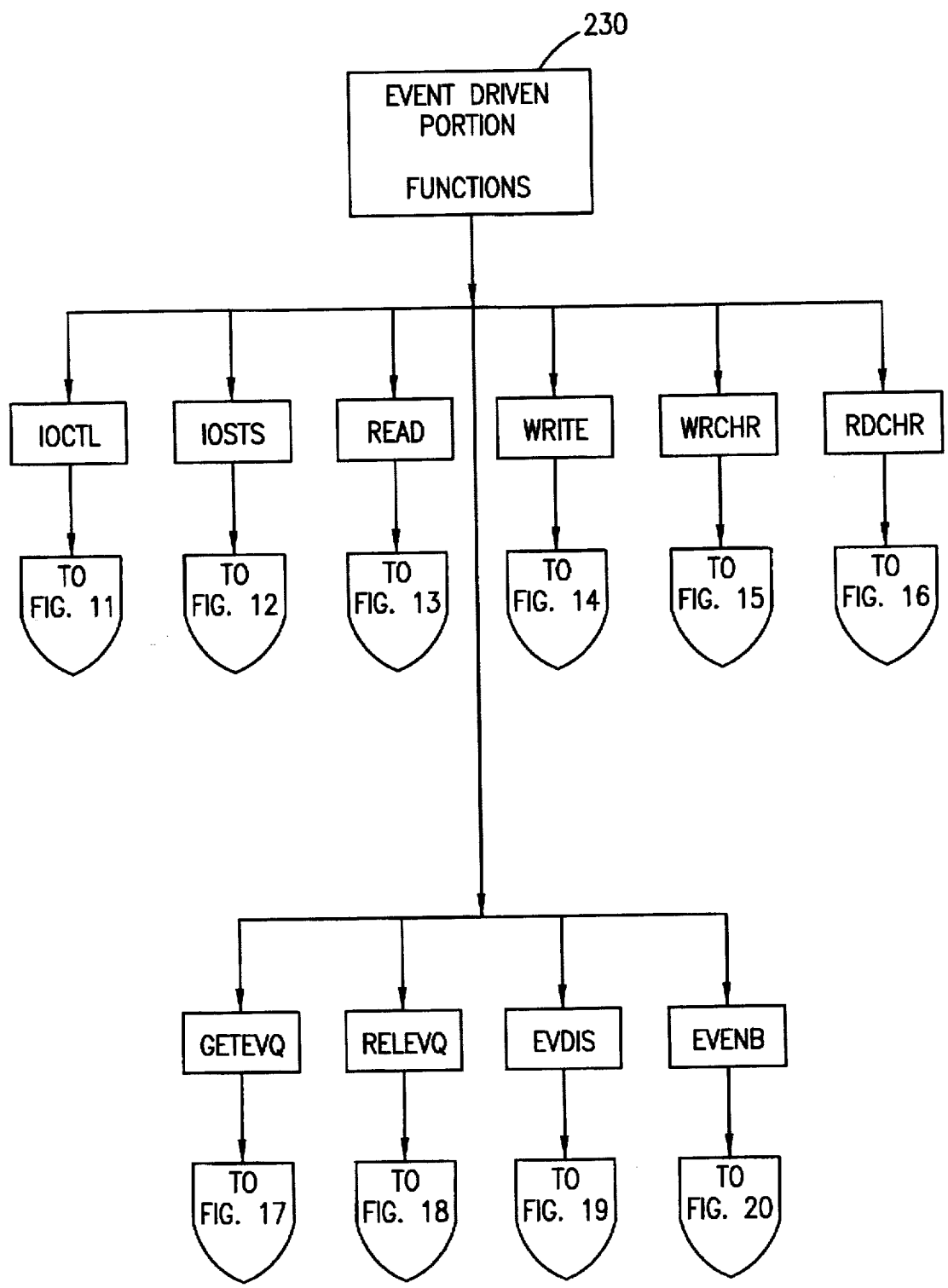
FIG. 4B is a block diagram illustrating in greater detail the functions of the event driven portion of the I/O Event Manager in FIG. 2 according to the preferred embodiment of the present invention.

FIG. 4B is a block diagram illustrating in greater detail the functions of the event driven portion 230 of FIG. 2 in a preferred embodiment of the present invention. The event driven portion 230 comprises the following functions: initializing the physical device (IOCTL), determining the status of a requested I/O event from the physical device (IOSTS), reading information from the physical device (read and RDCHR) and writing information to the hardware device (write and WRCHR). All of the above functions call associated functions within the event driven coordination portion 240 (FIG. 2) via logic path 232 (FIG. 2).

The event driven portion 230 functions require certain information to be provided by a FSM. The required information varies depending upon the particular function invoked. Therefore, in the preferred embodiment of the present invention an IOU data structure is used in order to provide the necessary information for each of the event driven portion 230 functions. An example of how the IOU data structure may be implemented in C++ is illustrated in Table VII below.

TABLE VII

```
typedef union
{
    CTL_STRU    ctl;    /* parameter struct. for IOCTL */
    STS_STRU    sts;    /* parameter struct. for iosts */
    RW_STRU     rw;     /* parameter struct. for read.write
*/
} IOU
```

© 1993 Telefonaktiebolaget L M Ericsson

The IOCTL function is invoked by application programs such as application program 102, to configure and control a physical device such as physical device 114 via device driver 110. The IOCTL function allows an application program 102 to open and close a specified device driver. An individual device driver is specified to the IOCTL function by a device driver identification variable (Id) which indicates whether the device driver is to be opened exclusively or generally.

The IOCTL function is provided with the following information from an application program: the device driver identification, the type of operation to be performed (e.g. open or close), the device driver type, the device driver mode, and an associated FSM's parameter table. The IOCTL function uses the CTL_STRU data structure within the IOU data structure. The CTL_STRU data structure may be implemented in C++ as illustrated in Table VIII below:

TABLE VIII

```
typedef struct
{
    Word    cmd;         /* control command */
    Byte    d_type;      /* device type */
    Byte    d_mode;      /* device mode */
    void    *table;      /* user's parameter table addr
*/
    Byte    tbl_idx;     /* index to parameter table */
    Byte    para_val;    /* byte value of the indicated
entry */
}CTL_STRU
```

© 1993 Telefonaktiebolaget L M Ericsson

Variable cmd (iou. ctl. cmd) indicates the type of operation to be performed (e.g. open or close). Variable d_type (iou. ctl. d_type) indicates the device driver type. Variable d_mode (iou. ctl. d_mode) represents the device driver mode. Variable table (iou. ctl. table) indicates a pointer to the FSM's parameter table address. Variable para_val (iou. ctl. para_val) represents the current position within the FSM's parameter table.

Figure 11:
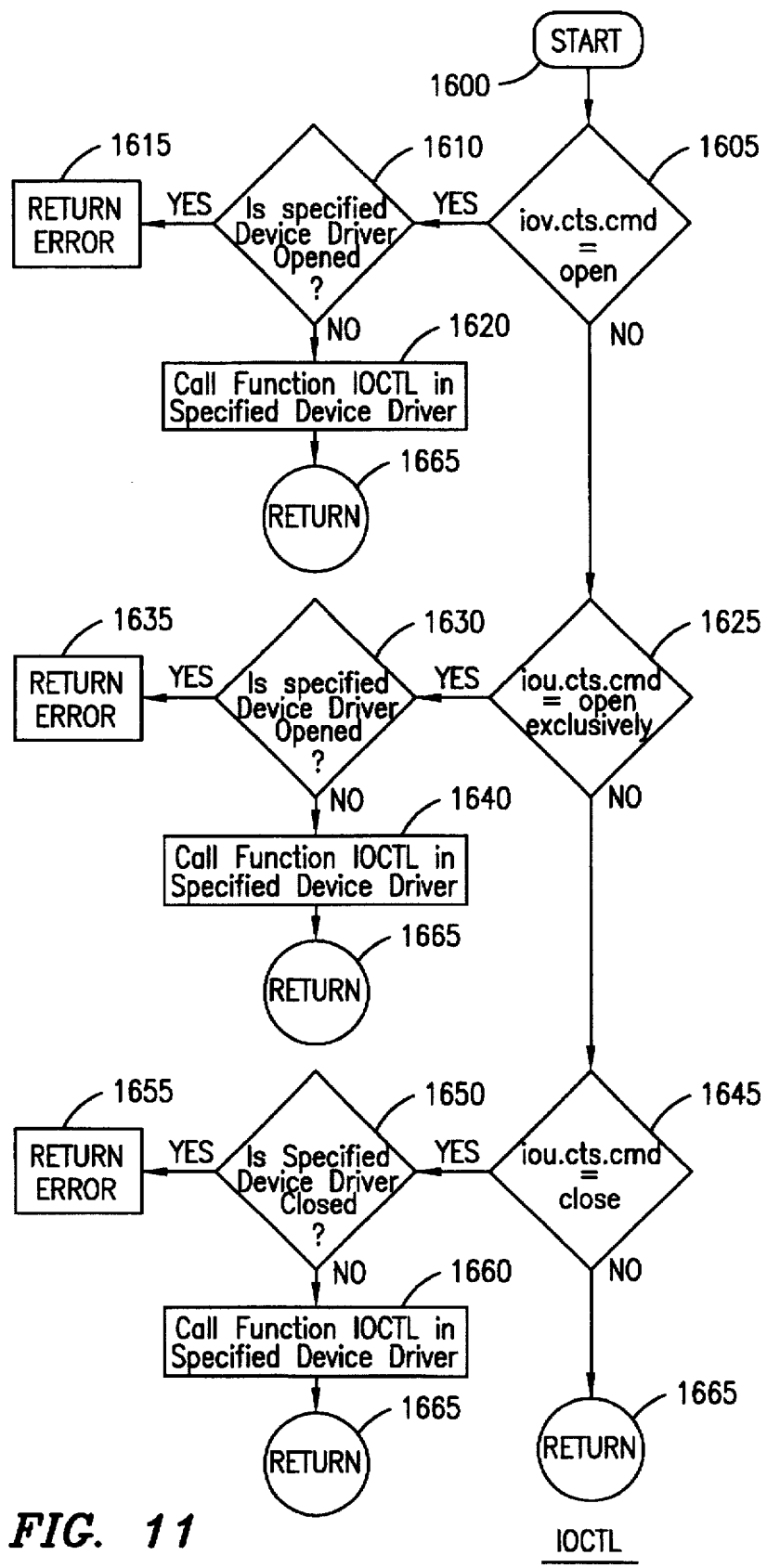
FIG. 11 is a flow chart of the operations which comprise the IOCTL function in the event driven portion of FIG. 4B in the preferred embodiment of the present invention.

FIG. 11 is a flow chart of the operations which comprise the IOCTL function of the event driven portion 230 of FIG. 2 in a preferred embodiment of the present invention. The IOCTL function is provided with the following information from an application program: a variable specifying a device driver (device_id), and an IOU data structure (iou_ptr). The IOCTL function begins at step 1600 and proceeds to step 1605 where a determination of whether the specified device driver is to be opened generally is made. If variable iou. ctl. cmd specifies a request for opening the device driver generally, then the function proceeds to step 1610. Otherwise, the function proceeds to step 1625. At step 1610, the specified device driver is checked to verify that it is not already opened. If the specified device driver is already open, then the function proceeds to step 1615. Otherwise, the function proceeds to step 1620.

At step 1615, an error is returned indicating that the specified device driver is already open, and the function proceeds to end at step 1665. At step 1620, the function IOCTL in the specified device driver is invoked, and variables IOU and device_id are passed, and the function proceeds to end at step 1665. At step 1625, a determination of whether the specified device driver is to be opened exclusively is made. If variable iou. sts. cmd equals a request to open the specified device driver exclusively, then the function proceeds to step 1630. Otherwise, the function proceeds to step 1645. At step 1630, the specified device driver is checked to verify that it is not already opened. If the specified device driver is already opened the function proceeds to step 1635. Otherwise, the function proceeds to step 1640. At step 1635, an error is returned indicating that the specified device driver is already opened, and the function proceeds to end at step 1665. At step 1640, the function IOCTL in the specified device driver is invoked and variables IOU and device_id are pass ed and the function proceeds to end at step 1665.

At step 1645, a determination of whether the specified driver is to be closed is made. If variable iou. cts. cmd equals a request to close the device driver, then the function proceeds to step 1650. Otherwise, the function proceeds to end at step 1665. At step 1650, the specified device driver is checked to see if it is already closed. If the specified device driver is already closed the function proceeds to step 1655. Otherwise, the function proceeds to step 1660. At step 1655, an error is returned indicating that the specified device is already closed, and the function proceeds to end. At step 1660, the function IOCTL in the specified device driver is invoked and variables IOU and device_id are passed, and the function proceeds to end at step 1665.

Still referring to FIG. 4B, the IOSTS function of the event driven portion 230 (FIG. 2) provides an application program with the ability to poll the occurrence or non-occurrence of an I/O event within a specified physical device, and to specify the action to be taken once the polled I/O event occurs or ceases to occur. The IOSTS function is provided with the following information by an application program: the event requested, the type of event waiting, identification of a matured event queue associated with the requested event, and a function address for redirection event waiting. In the preferred embodiment of the present invention the IOSTS function employs the STS_STU data structure within the IOU data structure for the transfer of the required information from the application program. The STS_STU data structure may be implemented in C++ as illustrated in Table IX below:

TABLE IX

```
typedef struct
{
    WORD    cmd;        /* status command */
    WORD    ev;         /* event code */
    WORD    rc;         /* response code or action if */
                        /* event matured */
    WORD    mevq_id;    /* matured event queue ID, */
    void    *fn_addr;   /* function address for REDIR */
} STS_STRU
```

© 1993 Telefonaktiebolaget L M Ericsson

Variable cmd (iou. sts. cmd) indicates the type of I/O event request. Variable ev (iou. sts. ev) indicates the type of event waiting requested. Variable rc (iou. sts. rc) indicates the response code or action to be taken once the I/O event requested matures. Variable mevq_id (iou. sts. mevq_id) identifies a MEVQ data structure. Variable fn_addr (iou. sts. fn_addr) contains the function address for redirection.

Figure 12:
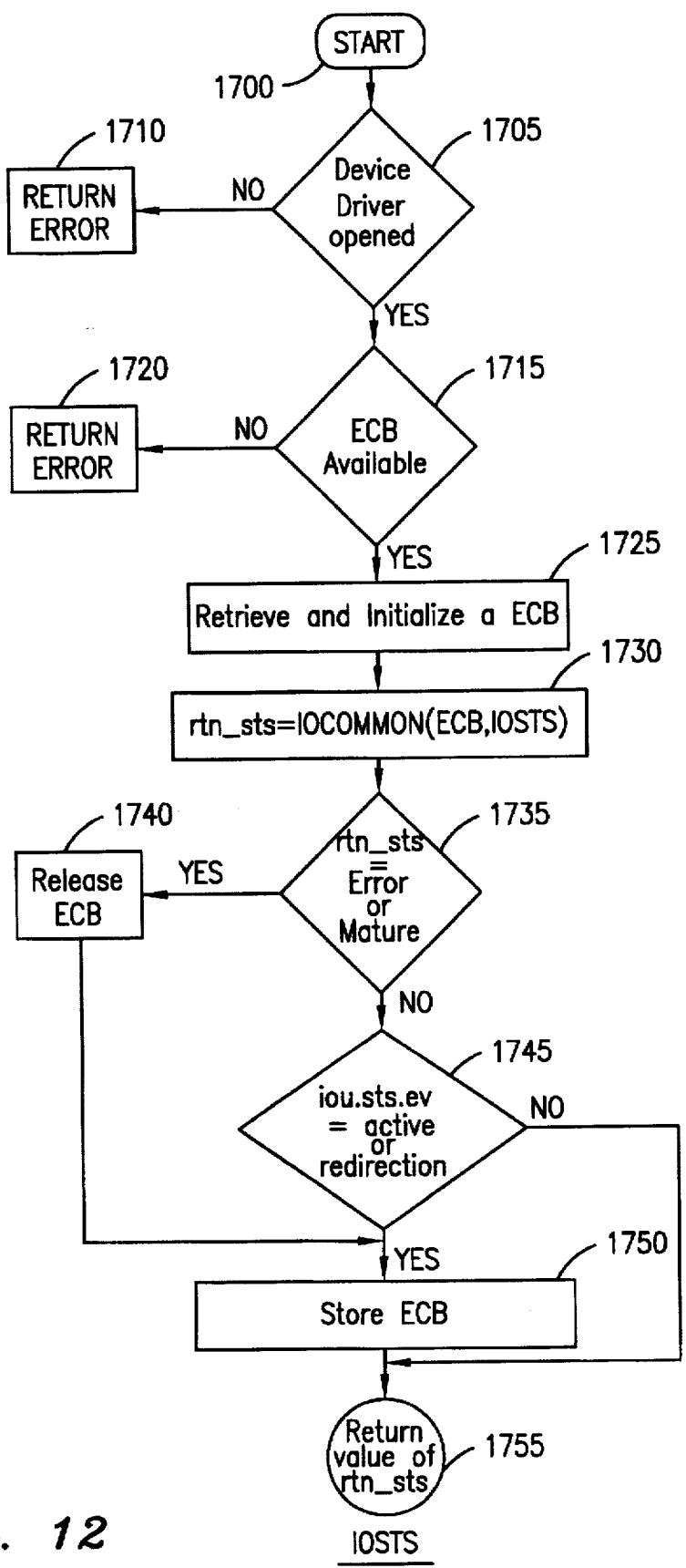
FIG. 12 is a flow chart of the operations which comprise the IOSTS function in the event driven portion of FIG. 4B in the preferred embodiment of the present invention.

FIG. 12 is a flow chart of the operations which comprise the IOSTS function in the event driven portion 230 of FIG. 2 in the preferred embodiment of the present invention. The iosts function is provided with the following information by an application program: a variable for specifying the device driver for collecting the requested I/O event (dev_id) and a variable pointing to the IOU data structure (iou_ptr). The iosts function begins at step 1700 and proceeds to 1705 where the specified device driver (dev_id) is checked to verify that it is currently open. If the specified device driver is already open, then the function proceeds to step 1715. Otherwise, the function proceeds to step 1710 where an error is returned indicating that the specified device driver is closed, and the function proceeds to end. At step 1715, a determination of whether an ECB data structure is available within the ecb_array is make. If an ECB data structure is available within the ecb_array, then the function proceeds to retrieve the ECB data structure from the ecb_array, and the function proceeds to step 1725. Otherwise, the function proceeds to step 1720 where an error is returned indicating that there are no ECB data structures currently available, and the function proceeds to end.

At step 1725, the variables in the retrieved ECB data structure are initialized with information from the iou. sts data structure and the current executing process. The function then proceeds to step 1730 where the IOCOMMON function in the event driven coordination portion 240 (FIG. 2) is invoked and passed the ECB data structure and the specified device driver function for iosts. The value of variable rtn_sts is also set equal to the value returned by the IOCOMMON function and the function proceeds to step 1735 where the value of rtn_sts is analyzed to determine if an error has occurred or if the requested I/O event is mature. If the rtn_sts variable indicates than an error has occurred or that the requested I/O event is mature, then the function proceeds to step 1740. Otherwise, the function proceeds to step 1745.

At step 1740, the ECB data structure is released to the ecb_arry, and the function proceeds to step 1755. At step 1745, the variable iou. sts. ev pointed to by iou_ptr is analyzed to determine if active or redirection event waiting is requested. If variable iou. sts. ev indicates that redirection or active event waiting is requested, then the function proceeds to step 1750. Otherwise, the function proceeds to step 1755. At step 1750, the ECB data structure is stored in the MEVQ data structure identified by variable ecb. mevq. id, and the function proceeds to step 1755. At step 1755, the value of variable rtn_sts is returned, and the function proceeds to end.

The READ function provides an application program with the ability to read data from a specified physical device with event driven control. The data which is read from the specified physical device is returned to the application program in a specified format. The READ function is provided with the following information from the application program: the type of format for data output, the type of event waiting, an identification of an associated matured event queue, and a pointer to a function address if redirection event waiting is specified. The READ function utilizes the data structure rw_STU within the IOU data structure to provide the above information. The rw_STU data structure is used for both reading and writing to a specified physical device (via a device driver). The rw_STU data structure may be implemented in C++ as illustrated in Table X below:

TABLE X

```
typedef struct
{
    WORD    format;     /* Data input/output format */
    WORD    ev;         /* event code */
    WORD    rc;         /* response code or actin if */
                        /* event matured */
    WORD    mevq_id;    /* matured event queue ID, */
    void    *dt_ptr;    /* associated pointer for I/O
                           data */
    BYTE    bc;         /* byte counter for STRING/
                           LINE */
    BYTE    wr_dlm;     /* delimiter used for write
                           to */
                        /* indicate end of string */
    void    *fn_addr;   /* function address for REDIR */
} rw_STRU
```

© 1993 Telefonaktiebolaget L M Ericsson

The variable format (rw. format) indicates the requested data output format (e.g. string). Variable ev (rw. ev) indicates the type of event waiting requested. Variable rc (rw. rc) indicates the response code or action to be taken once the requested I/O event has matured. Variable mevq_id (rw. mevq_id) identifies a matured event queue associated with the RW data structure. The variable dt_ptr (rw. dt_ptr) is a pointer to a buffer for storing the I/O request data. The variable bc (rw. bc) is a counter used if string or line format is specified for storing the I/O event data. Variable wr_dlm (rw. wr_dlm) is used to indicate a specified delimiter for an end of string if the string format is specified. The variable fn_addr (rw. fn_addr) is a pointer for a function if redirection event waiting is specified.

Figure 13:
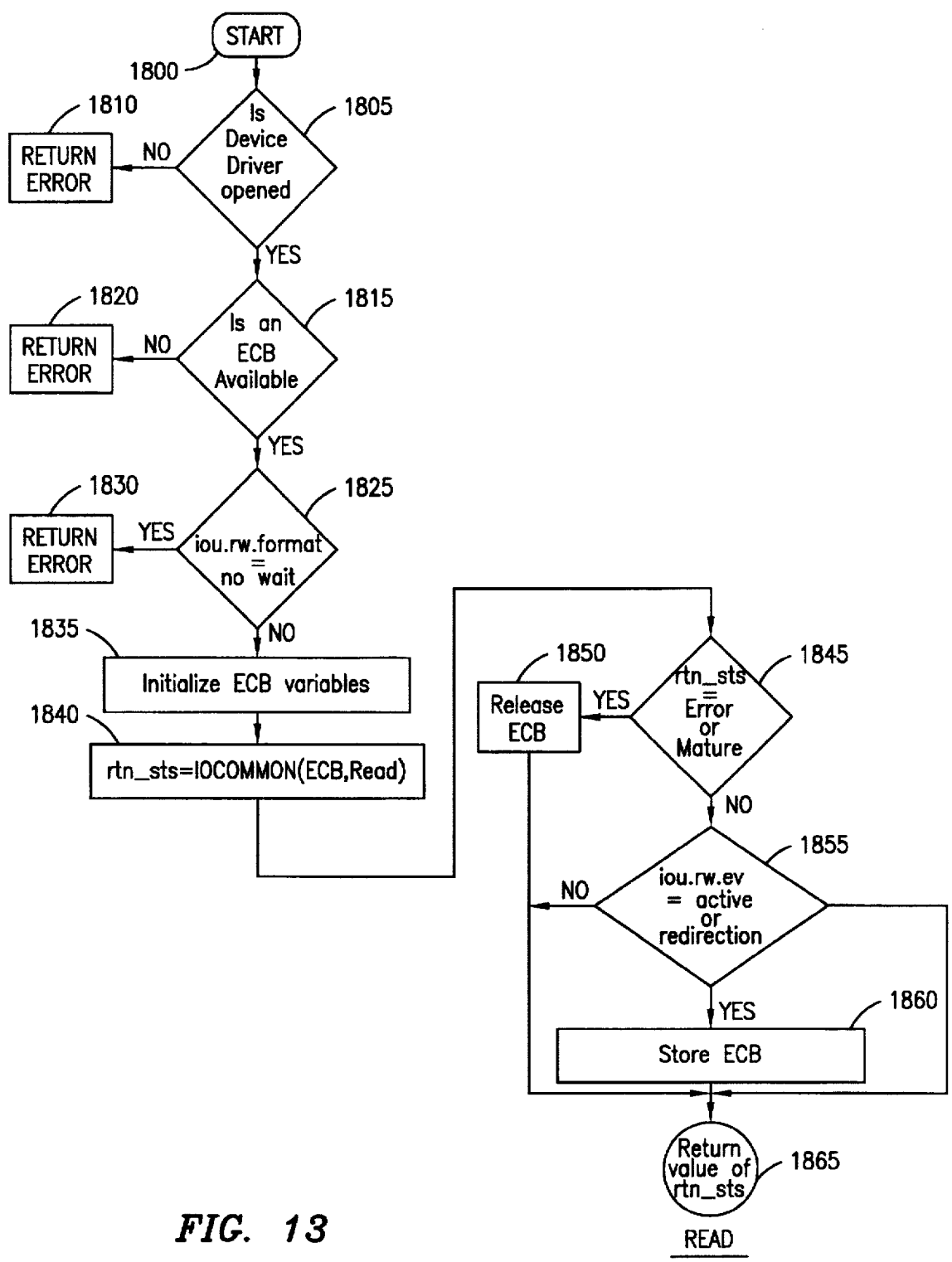
FIG. 13 is a flow chart of the operations which comprise the READ function in the event driven portion of FIG. 4B in the preferred embodiment of the present invention.

FIG. 13 is a flow chart of the operations which comprise the READ function in the event driven portion 230 of FIG. 2 in the preferred embodiment of the present invention. The following variables are provided to the READ function by an application program: a variable specifying the device driver for collecting the requested I/O event (dev_id) and a variable pointing to the IOU data structure (iou_ptr). The READ function begins at step 1800 and proceeds to step 1805 where a determination of whether the specified device driver (dev_id) is open is made. If the specified device driver is already open, then the function proceeds to step 1815. Otherwise, the function proceeds to step 1810 where an error is returned indicating that the specified device driver is closed, and the function proceeds to end. At step 1815, a determination of whether an ECB data structure is available within the ecb_arry is made. If an ECB data structure is available, then the function retrieves the ECB data structure from the ecb_arry and proceeds to step 1825. Otherwise, the function proceeds to step 1820 where an error is returned indicating that there are no ECB data structures currently available, and the function proceeds to end. At step 1825, a determination of whether no event waiting was specified is made. If variable iou. rw. format does not specify no event waiting, then the function proceeds to step 1830. Otherwise, the function proceeds to step 1835 where an error is returned indicating that the function does not support no event waiting, and the function proceeds to end.

At step 1835, the variables in the retrieved ECB data structure are initialized with information from the iou. rw data structure and the current process identification. The function then proceeds to step 1840 where the IOCOMMON function in the event driven coordination portion 240 (FIG. 2) is invoked and passed the ECB data structure and the specified device driver function for read. The value of variable rtn_sts is also set equal to the value returned by the IOCOMMON function. The function then proceeds to step 1845 where the value of variable rtn_sts is analyzed to determine if an error has occurred or if the I/O request is mature. If variable rtn_sts indicates than an error has occurred or that the I/O request is mature, then the function proceeds to step 1850. Otherwise, the function proceeds to step 1855. At step 1850, the ECB data structure is released to ecb_arry, and the function proceeds to step 1865. At step 1855, a determination of whether active or redirection event waiting is requested by the application program is made. If variable iou. sts. ev pointed to by iou_ptr indicates that redirection or active event waiting is requested, then the function proceeds to step 1860. Otherwise, the function proceeds to step 1865. At step 1860, the ECB data structure is stored in the MEVQ data structure which is identified by variable ecb. mevq. id, and the function proceeds to step 1865. At step 1865, the value of variable rtn_sts is returned, and the function proceeds to end.

An application program requires the ability to transmit data (output data) to a hardware device. The write function of the event driven portion 230 provides an application program with the ability to transmit output data to a specified physical device (via a device driver). The write function is provided with the following information by an application program: the type of output format for the output data, the type of event waiting requested, an identifier for a matured event queue, an end of string indicator for output data which uses strings, and a pointer to a function address for redirection event waiting. The write function also employs the RW data structure within the IOU data structure.

Figure 14A:
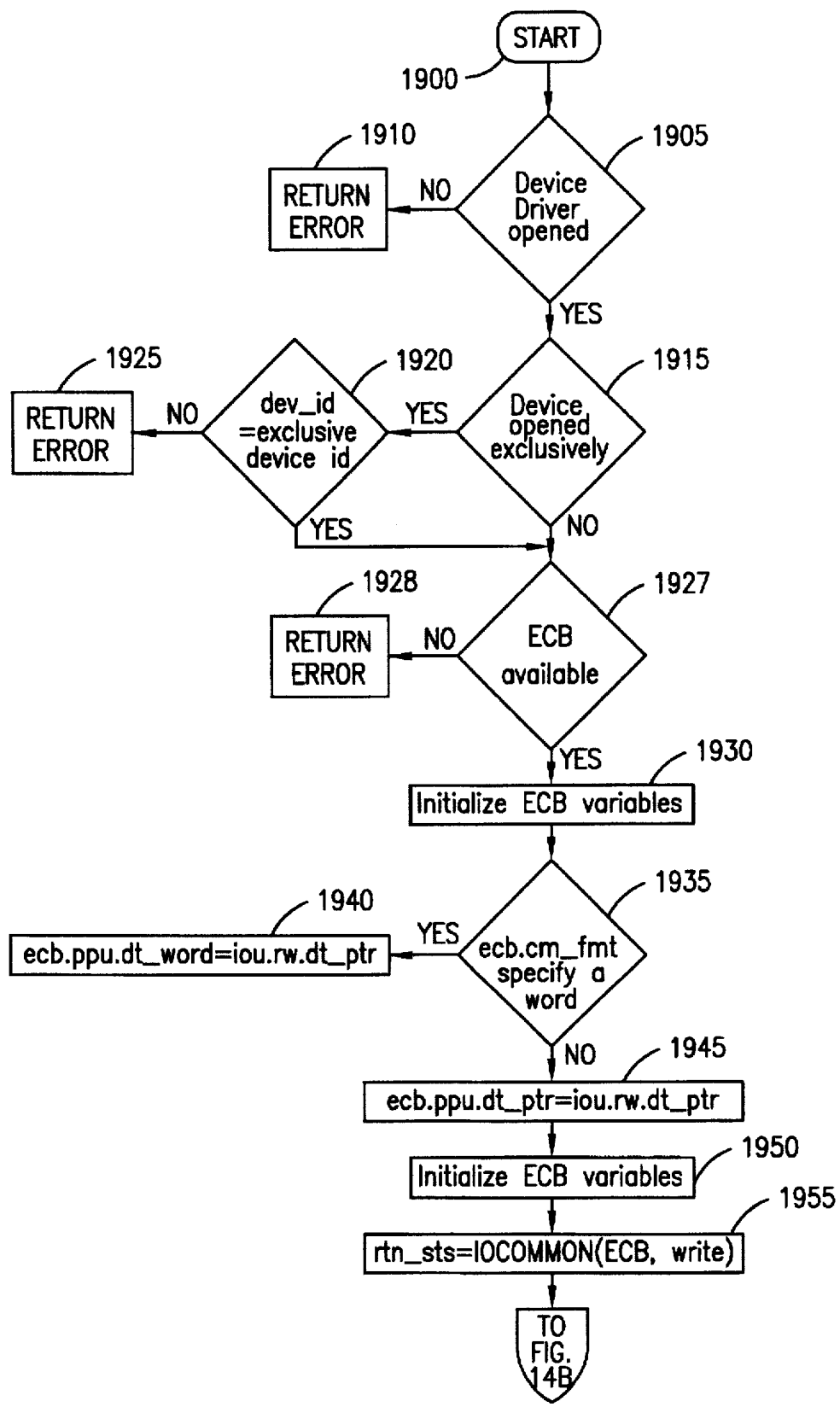
FIGS. 14A–14B are flow charts of the operations which comprise the write function in the event driven portion of FIG. 4B in the preferred embodiment of the present invention.
Figure 14B:
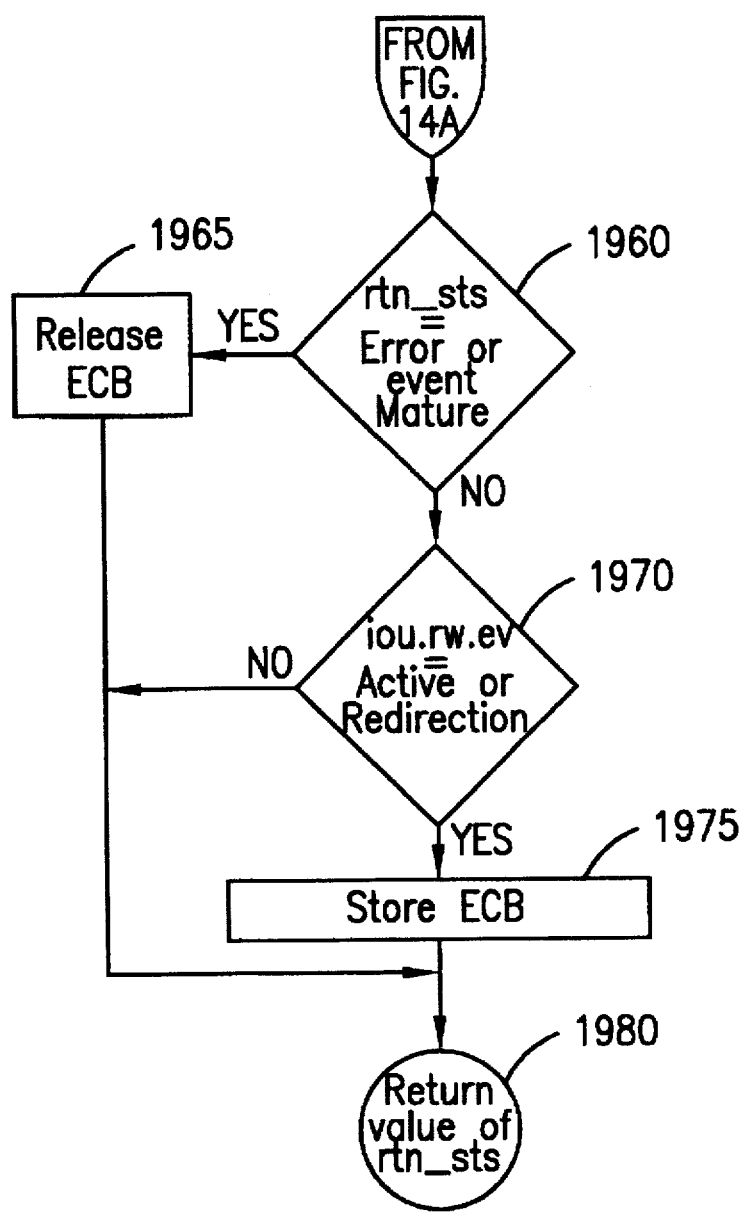

FIGS. 14A–14B are flow charts of the operations which comprise the write function in the event driven portion 230 of FIG. 2 in the preferred embodiment of the present invention. The following information is provided by an application program: a variable for specifying the device driver for collecting the requested I/O event (dev_id) and a variable pointing to the IOU data structure (iou_ptr). The write function begins at step 1900 and proceeds to step 1905 where a determination of whether the specified device driver (dev_id) is open is made. If the specified device driver is already open, then the function proceeds to step 1915. Otherwise, the function proceeds to step 1910 where an error is returned indicating that the specified device driver is closed and the function proceeds to end. At step 1915, a determination of whether the device driver was opened exclusively is made. If the device driver was opened exclusively, then the function proceeds to step 1920. Otherwise, the function proceeds to step 1927. At step 1920, variable dev_id is compared to the exclusive device ID for the device driver. If variable dev_id equals the exclusive device driver Id, then the function proceeds to step 1927. Otherwise, the function proceeds to step 1925 where an error is returned indicating that the variable dev_id does not equal the exclusive device driver Id, and the function proceeds to end.

At step 1927, a determination of whether an ECB data structure is available within the ecb_arry is made. If an ECB data structure is available within the ecb_arry, then the function retrieves the ECB data structure from the ecb_arry and proceeds to step 1930. Otherwise, the function proceeds to step 1928 where an error is returned indicating that there are no ECB data structures currently available, and the function proceeds to end. At step 1930, the variables in the retrieved ECB data structure are initialized with information from the iou. rw data structure and the current process. The function then proceeds to step 1935 where a determination of whether a word is to be written to the device driver (i.e., the physical device) is made. If variable ecb. cm__fmt specifies writing a word to the device driver, then the function proceeds to step 1940. Otherwise, the function proceeds to step 1945. At step 1940, variable ecb. ppu. dt__ptr is set equal to the value of variable iou. rw. dt__ptr pointed to by iou__ptr (type casted as a word), and the function proceeds to step 1950. At step 1945, the variable ecb. ppu. dt__ptr is set equal to variable iou. rw. dt__ptr, pointed to by iou__ptr, and the function proceeds to step 1950. At step 1950, the ECB data structure variables are initialized with information from the iou. rw and iou. pw data structures, and the function proceeds to step 1955 where the IOCOMMON function in the event driven coordination portion 240 (FIG. 2) is invoked and passed the ECB data structure and the specified device driver function for write. The value of variable rtn__sts is also set equal to the value returned by the IOCOMMON function and the function proceeds to step 1960 at FIG. 14B.

Referring now to FIG. 14B, at step 1960, the value of rtn__sts is analyzed to determine whether an error has occurred or if the I/O request is mature. If variable rtn__sts indicates that an error has occurred or that the I/O request is mature, then the function proceeds to step 1965. Otherwise, the function proceeds to step 1970. At step 1965, the ECB data structure is released to the ecb__arry, and the function proceeds to step 1980. At step 1970, a determination of whether active or redirection event waiting is requested by the application program is made. If variable iou. rw. ev pointed to by iou__ptr indicates that redirection or event waiting is requested, then the function proceeds to step 1975. Otherwise, the function proceeds to step 1980. At step 1975, the ECB data structure is stored in the MEVQ identified by variable ecb. mevq. id, and the function proceeds to step 1980 where the value of rtn__sts is returned, and the function proceeds to end.

Figure 15:
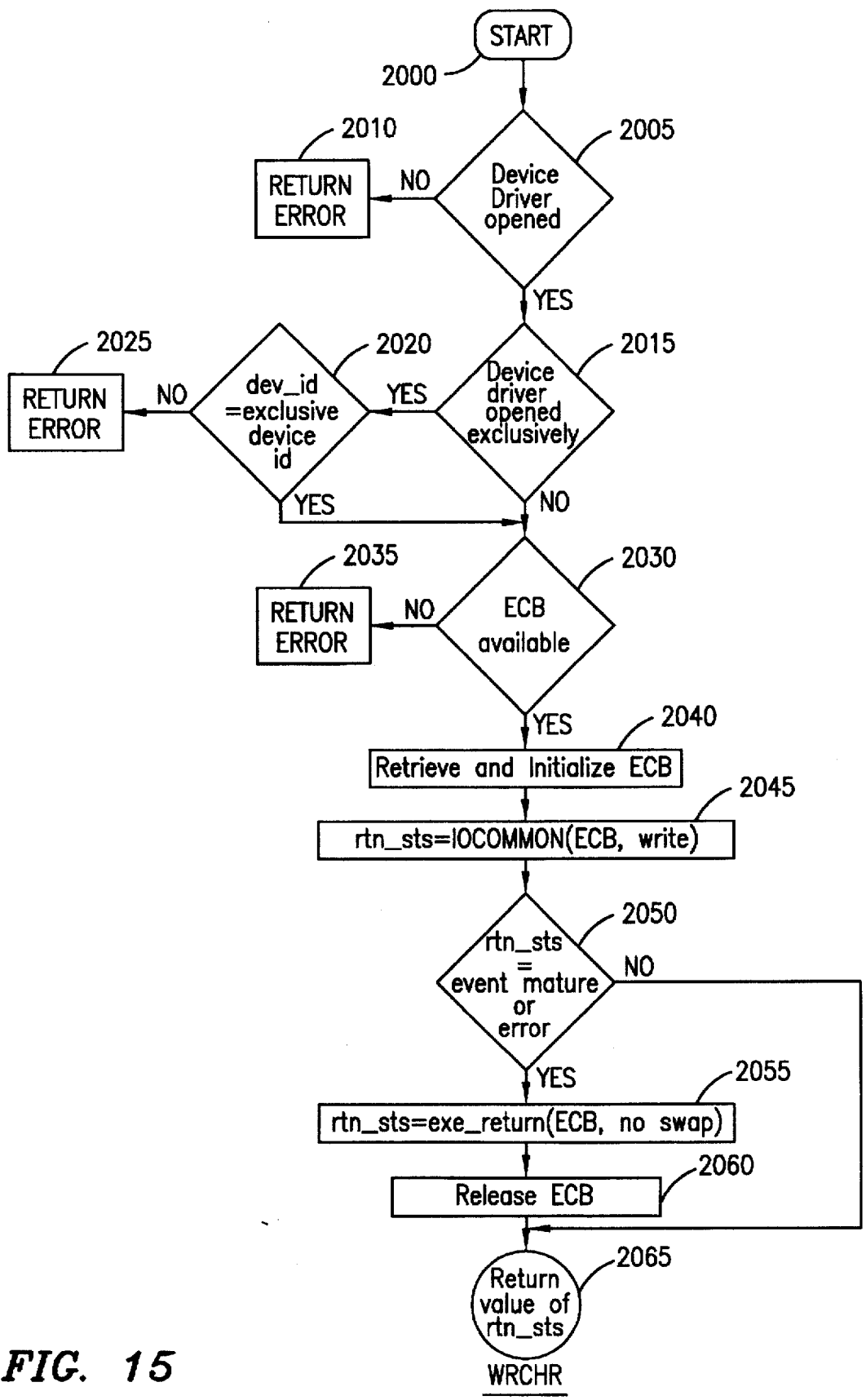
FIG. 15 is a flow chart of the operations which comprise the WRCHR function in the event driven portion of FIG. 4B in the preferred embodiment of the present invention.

Referring again to FIG. 4B, the WRCHR function of the event driven portion 230 (FIG. 2) provides an application program with the ability to write characters to character type physical devices. The WRCHR function, however, only supports no event waiting. FIG. 15 is a flow chart of the operations which comprise the WRCHR function in the preferred embodiment of the present invention. The following variables are provided by an application program to the WRCHR function: a variable specifying the device driver for collecting the I/O request (dev__id) and a variable specifying the character to be written to the device driver (i.e., the physical device).

The WRCHR function begins at step 2000 and proceeds to step 2005 where a determination of whether the specified device driver (dev__id) is currently open is made. If the specified device driver is already open, then the function proceeds to step 2015. Otherwise, the function proceeds to step 2010 where an error is returned indicating that the specified device driver is closed, and the function proceeds to end. At step 2015, a determination of whether the device driver was opened exclusively is made. If the device driver was opened exclusively, then the function proceeds to step 2020. Otherwise, the function proceeds to step 2030.

At step 2020, a determination of whether the variable dev__id is equal to the exclusive device driver Id is made. If variable dev__id equals the exclusive device driver Id, then the function proceeds to step 2030. Otherwise, the function proceeds to step 2025 where an error is returned indicating that the specified device driver is currently opened exclusively and that the variable dev__id does not have access to it, and the function proceeds to end. At step 2030, a determination of whether an ECB data structure is available within the ecb__arry is made. If an ECB data structure is available within the ecb__arry, then the function retrieves the ECB data structure from the ecb__arry and proceeds to step 2040. Otherwise, the function proceeds to step 2035 where an error is returned indicating that there are no ECB data structures currently available, and the function proceeds to end.

At step 2040, the variables in the retrieved ECB data structure are initialized and the function proceeds to step 2045 where the IOCOMMON function in the event driven coordination portion 240 (FIG. 2) is invoked and passed the ECB data structure and the specified device driver function for WRCHR. The value of variable rtn__sts is also set equal to the value returned by the IOCOMMON function, and the IOCOMMON function proceeds to step 2050 where variable rtn__sts is analyzed to determine if an error has occurred or if the I/O request is mature. If variable rtn__sts indicates that an error has occurred or that the I/O request is mature, then the function proceeds to step 2055. Otherwise, the function proceeds to step 2065. At step 2055, the exe__return function in the event driven coordination portion 240 (FIG. 2) is invoked and passed the ECB data structure and a variable which indicates that no register swapping is to be performed. The WRCHR function then proceeds to step 2060 where the ECB data structure is released to the ecb__arry, and the function proceeds to step 2065. At step 2065, the value of variable rtn__sts is returned and the function proceeds to end.

Figure 16:
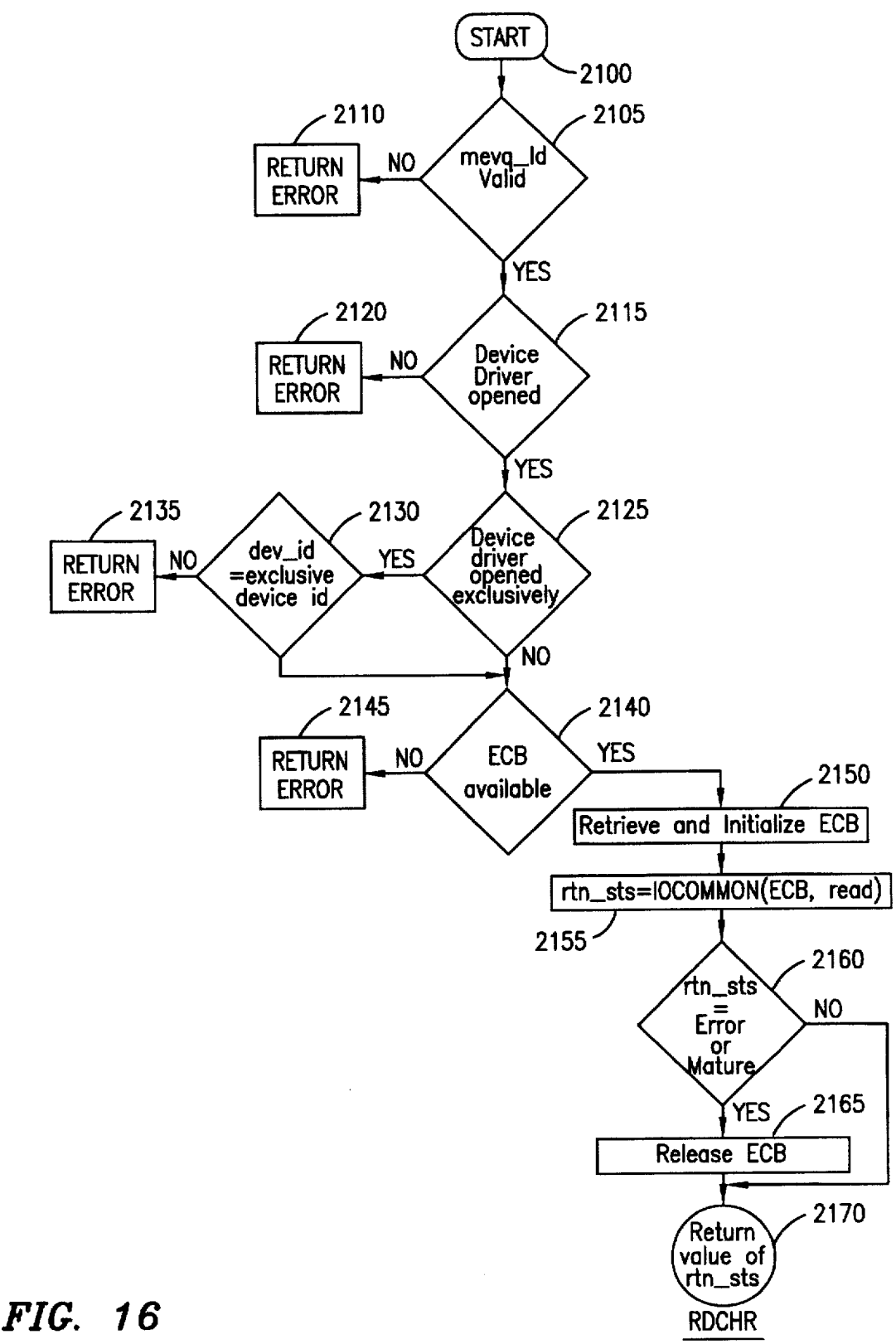
FIG. 16 is a flow chart of the operations which comprise the RDCHR function in the event driven portion of FIG. 4B in the preferred embodiment of the present invention.

Referring again to FIG. 4B, the RDCHR function of the event driven portion 230 provides an application program with the ability to read characters from physical character devices. The RDCHR function is provided with the following information by the application program: the identification of the device driver to perform the data input and the identification of a matured event queue for recording the input data. FIG. 16 is a flow chart of the operations which comprise the RDCHR function in the preferred embodiment of the present invention. The RDCHR function begins at step 2100 and proceeds to step 2105 where a determination of whether the MEVQ data structure is valid is made. If the MEVQ data structure is valid, then the function proceeds to step 2115. Otherwise, the function proceeds to step 2110 where an error is returned indicating that the MEVQ data structure is invalid, and the function proceeds to end. At step 2115, a determination of whether the specified device driver (dev__id) is currently open is made. If the specified device driver is already open, then the function proceeds to step 2125. Otherwise, the function proceeds to step 2120 where an error is returned indicating that the specified device driver is closed, and the function proceeds to end.

At step 2125, a determination of whether the specified device driver was opened exclusively is made. If the specified device driver was opened exclusively, then the function proceeds to step 2130. Otherwise, the function proceeds to step 2140. At step 2130, variable dev__id is compared to the exclusive device driver Id. If variable dev__id is equal to the exclusive device driver. id, then the function proceeds to step 2140. Otherwise, the function proceeds to step 2135 where an error is returned indicating that the variable dev__id does not have access to the specified device driver, and the function proceeds to end. At step 2140, a determination of whether an ECB data structure is available within the ecb__arry is made. If an ECB data structure is available within the ecb__arry, then the function retrieves the ECB data structure from the ecb__arry and proceeds to step 2150. Otherwise, the function proceeds to step 2145 where an error is returned indicating that there are no ECB data structures currently available, and the function proceeds to end.

At step 2150, the variables in the retrieved ECB data structure are initialized, and the function proceeds to step 2155 where the IOCOMMON function in the event driven coordination portion 240 is invoked and passed the ECB data structure and the specified device driver function for RDCHR. The function then proceeds to step 2160 where the value of rtn_sts is analyzed to determine if an error has occurred or if the I/O requested is mature. If variable rtn_sts indicates that an error has occurred or that the I/O request is mature, then the function proceeds to step 2165. Otherwise, the function proceeds to step 2170. At step 2165, the ECB data structure is released to the ecb_arry, and the function proceeds to step 2170. At step 2170, the value of variable rtn_sts is returned, and the function proceeds to end.

Referring again to FIG. 4B, the event driven portion 230 of the application interface 205 is further comprised of the following functions for controlling MEVQ data structures: get an available MEVQ (GETEVQ), release a MEVQ (relevq), enable a MEVQ (evenb) and disable a MEVQ (evdis). The above functions for controlling MEVQ data structures are only used during multiple active or redirection waiting I/O requests.

Figure 17:
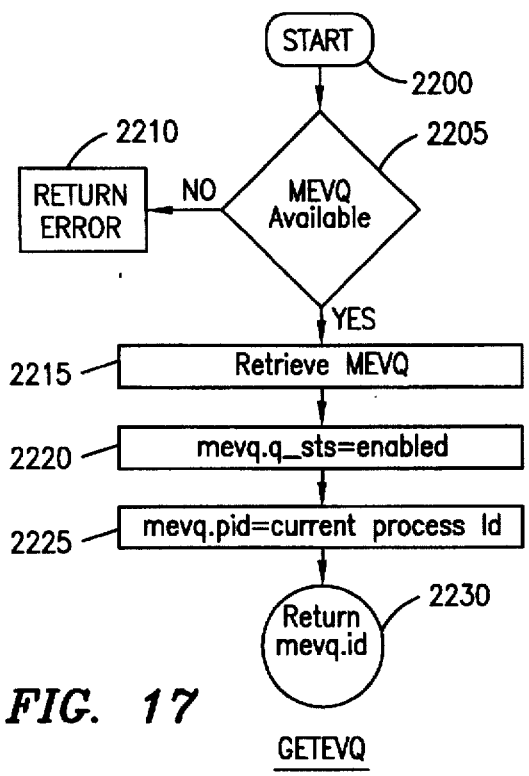
FIG. 17 is a flow chart of the operations which comprise the GETEVQ function in the event driven portion of FIG. 4B in the preferred embodiment of the present invention.

The GETEVQ function of the event driven portion 230 determines if one of the previously dynamically allocated MEVQ data structures is currently available. FIG. 17 is a flow chart of the operations which comprise the GETEVQ function in the preferred embodiment of the present invention. The GETEVQ function begins at step 2200 and proceeds to step 2205 where a determination of whether any available MEVQ data structures within the mevq_arry are available is made. If there are any available MEVQ data structures within the mevq_arry, then the function proceeds to step 2215. Otherwise, the function proceeds to step 2210 where an error is returned indicating that there are no MEVQ data structures currently available, and the function proceeds to end. At step 2215, an MEVQ data structure is retrieved from the mevq_arry, and the function proceeds to step 2220 where variable mevq. q_sts is set to indicate that the MEVQ data structure is enabled, and the function proceeds to step 2225. At step 2225, variable mevq. pid is set equal to the identification of the current process, and the function proceeds to step 2230 where the value of variable mevq. id is returned, and the function proceeds to end.

Figure 18:
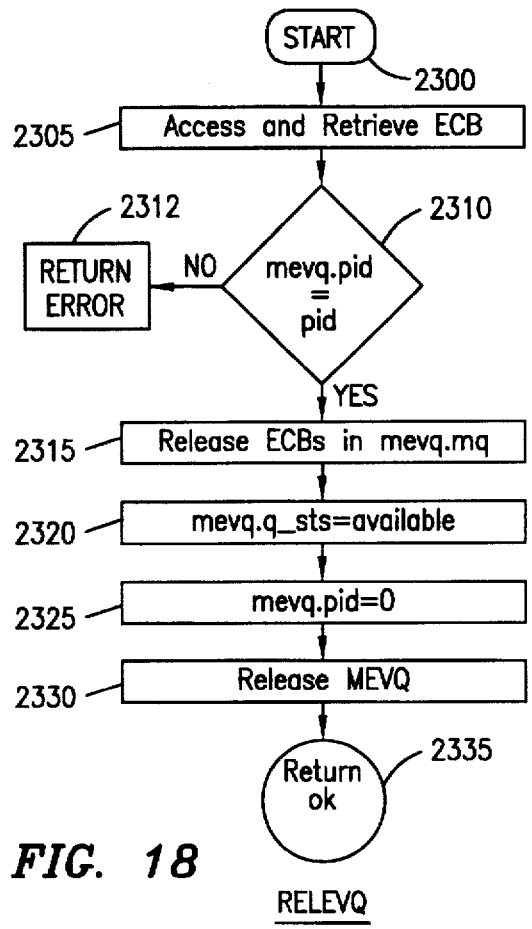
FIG. 18 is a flow chart of the operations which comprise the RELEVQ function in the event driven portion of FIG. 4B in the preferred embodiment of the present invention.

Referring again to FIG. 4B, the relevq function of the event driven portion 230 (FIG. 2) is responsible for releasing a previously used MEVQ to the mevq_arry. FIG. 18 is a flow chart of the operations which comprise the relevq function in the preferred embodiment of the present invention. The relevq function requires the following information to be provided by an application program: the identification of the MEVQ data structure to be made available again (mevq_id) and an identification of a process associated with the MEVQ (pid).

The relevq function begins at step 2300 and proceeds to step 2305 where the mevq_arry is accessed with the value of variable mevq_id and the MEVQ data structure identified by variable mevq_id is retrieved, and the function proceeds to step 2310. At step 2310, a determination of whether the process identified by variable mevq. pid equals the process identified by variable pid is made. If the process identified by variable mevq. pid equals the process identified by variable pid, then the function proceeds to step 2315. Otherwise, the function proceeds to step 2312 where an error is returned indicating that the process identified by variable pid does not equal the process identified by variable mevq. pid, and the function proceeds to end.

At step 2315, all ECB data structures contained within the linked list identified by variable mevq. mq are released, and the function proceeds to step 2320 where variable mevq. q_sts is set equal to available, and the function proceeds to step 2325. At step 2325, variable mevq. pid is set equal to zero, and the function proceeds to step 2330 where the MEVQ data structure is released to the mevq_arry, and the function proceeds to step 2335. At step 2335, a value is returned indicating the function executed the request, and the function proceeds to end.

Referring again to FIG. 4B, the EVDIS function of the event driven portion 230 is used whenever more than one multiple active or redirection I/O request matures for an identified process. The EVDIS function disables the MEVQ associated with an identified process until the process associated with a previously matured active or redirection I/O request has finished executing. It is the responsibility of an application program to re-enable the MEVQ once the associated process has finished executing.

Figure 19:
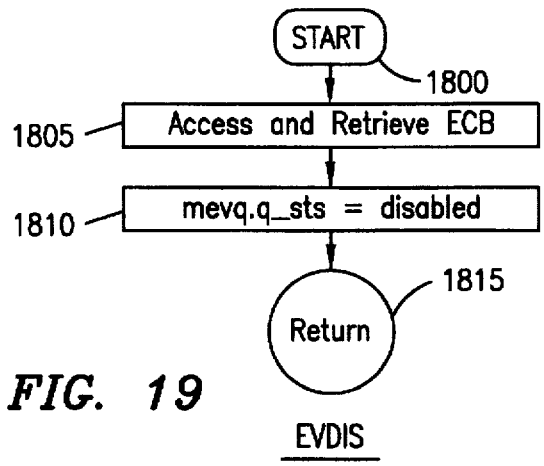
FIG. 19 is a flow chart of the operations which comprise the EVDIS function in the event driven portion of FIG. 4B in the preferred embodiment of the present invention.

FIG. 19 is a flow chart of the operations which comprise the EVDIS function in the event driven portion 230 of FIG. 2 in the preferred embodiment of the present invention. The EVDIS function is provided with an identification of a MEVQ data structure (mevq_id) by an application program. The EVDIS function begins at step 1800 and proceeds to step 1805 where the mevq_arry is accessed with the value of variable mevq-id and the MEVQ data structure identified by variable mevq_id is retrieved, and the function proceeds to step 1810. At step 1810, variable mevq. q_sts is set to indicate that the MEVQ data structure is disabled, and the function proceeds to end at step 1815.

An application program which makes a plurality of active or redirection I/O requests is responsible for reactivating the MEVQ data structure associated with those requests. The EVENB function enables an identified MEVQ data structure. The EVENB function is provided with an identification of a MEVQ data structure which is to be enabled (mevq_id) by an application program.

Figure 20:
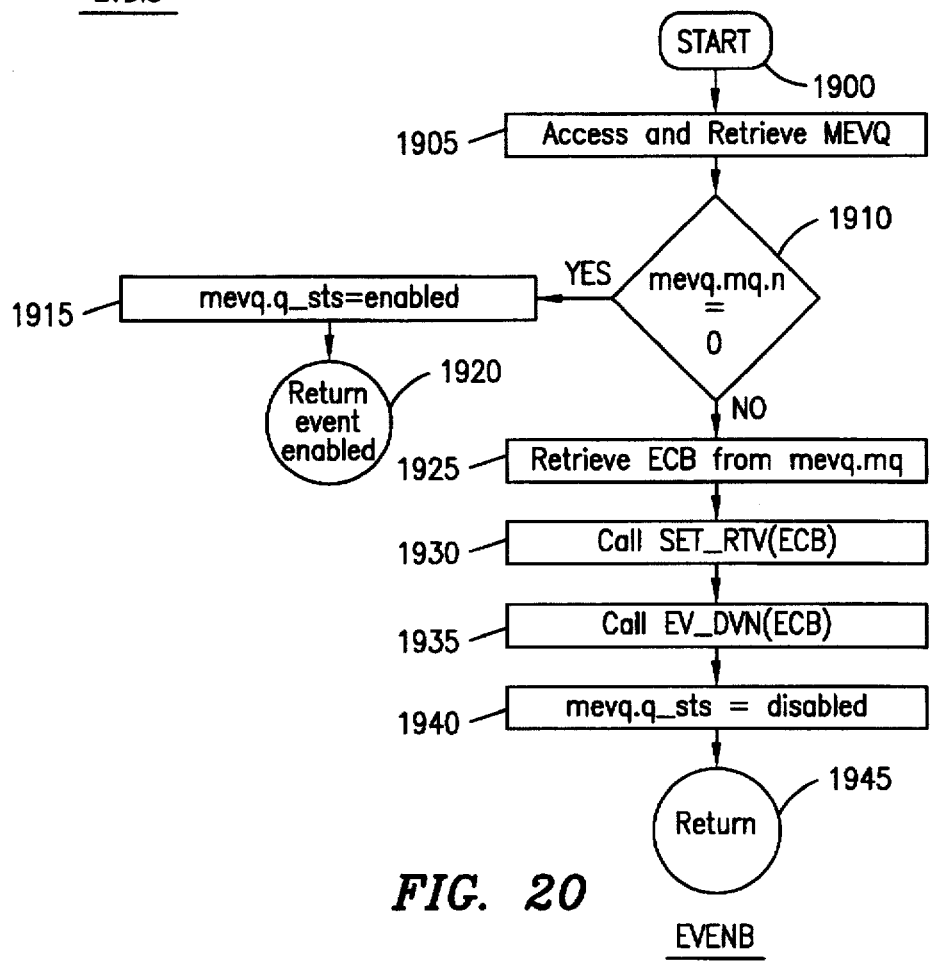
FIG. 20 is a flow chart of the operations which comprise the EVENB function in the event driven portion of FIG. 4B in the preferred embodiment of the present invention.

FIG. 20 is a flow chart of the operations which comprise the EVENB function in the event driven portion 230 of FIG. 2 in the preferred embodiment of the present invention. The EVENB function begins at step 1900 and proceeds to step 1905 where the mevq_arry is accessed with the value of variable mevq_id, and the MEVQ data structure identified by variable mevq_id is retrieved, and the function proceeds to step 1910. At step 1910, a determination of whether the linked list identified by variable mevq. mq contains any matured ECB data structures. If variable mevq. mq. n indicates that no ECB data structures remain in the linked list, then the function proceeds to step 1915. Otherwise, the function proceeds to step 1925. At step 1915, variable mevq. q_sts is set to indicate that the MEVQ data structure is enabled, and the function proceeds to step 1920 where a value is returned indicating that the MEVQ data structure is enabled, and the function proceeds to end.

At step 1925, a matured ECB data structure is retrieved from the linked list which is identified by variable mevq. mq, and the function proceeds to step 1930 where the SET_RTV function of the event driven coordination portion 240 is invoked and the ECB data structure is passed. The function then proceeds to step 1935 where the EV_DVN function of the event driven coordination portion 240 is invoked and the ECB data structure is passed. The function then proceeds to step 1940 where variable mevq. q_sts is set to indicate that the MEVQ data structure is disabled, and the function proceeds to end at step 1945.

INTERNAL INTERFACE/EVENT DRIVEN COORDINATION PORTION

The internal interface 210 of the I/O event manager 108 provides the event driven capabilities of the I/O requests. The internal interface 210 implements the event driven capabilities through the utilization of an event driven coordination portion 240 in conjunction with an operating system protocol portion 235 via logic paths 241 and 242 respectively. The logic paths 227 and 232 provide direct input to the operating system protocol portion 235 and the event driven coordination portion 240, respectively. The event driven coordination portion 240 incorporates and coordinates the event driven capabilities of the I/O manager 108. The event driven coordination portion 240 comprises the following functions: I/O common (IOCOMMON), execution return (exe__return) and set return value (set__rtv).

Figure 21A:
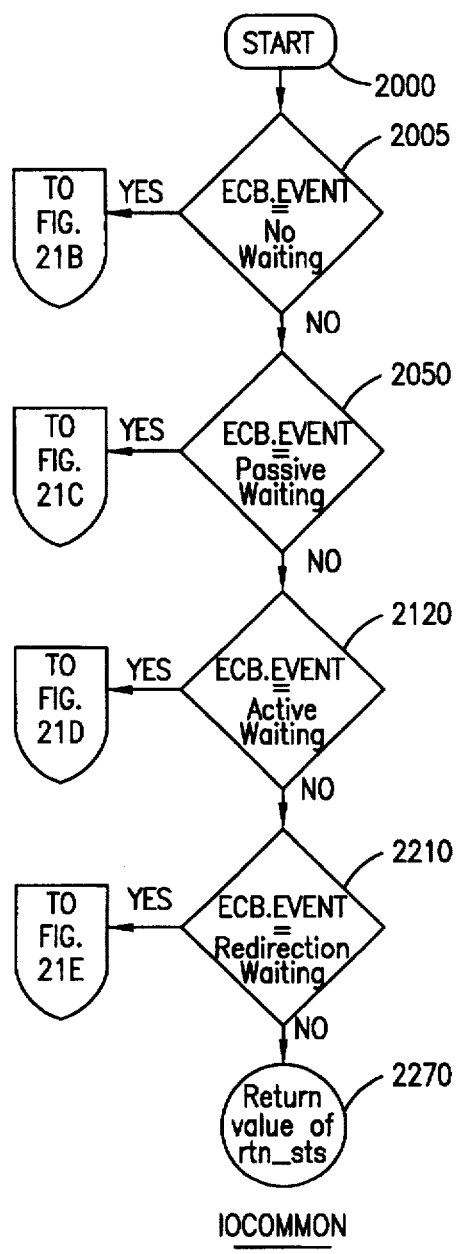
FIGS. 21A–21E are flow chart of the operations which comprise the IOCOMMON function of the event driven coordination portion of FIG. 4C in the preferred embodiment of the present invention.

The IOCOMMON function of the event driven coordination portion 240 initiates the I/O request with the specified device driver and manipulates the associated OS 206 process in order to provide the specified event waiting. FIGS. 21A through 21E are a flow chart of the operations which comprise the IOCOMMON function of FIG. 2 in the preferred embodiment of the present invention. The IOCOMMON function is provided with an ECB data structure and a pointer to a function in a specified device driver (fp) by the event driven portion 230. FIG. 21A begins at step 2000 and proceeds to step 2005 where a determination of whether no waiting is specified is made. If variable ECB. EVENT specifies no waiting, then the function proceeds to step 2015 in FIG. 21B. Otherwise, the function proceeds to step 2050.

Figure 21B:
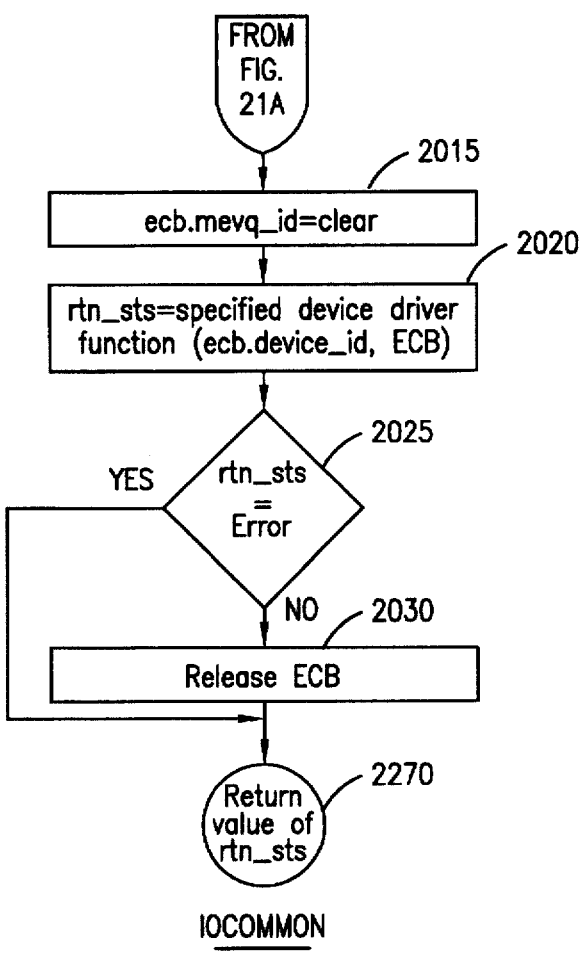

Referring now to FIG. 21B, at step 2015, variable ecb. mevq__id is set to a status of clear, and the function proceeds to step 2020 where the function of a specified device driver is invoked and passed the ECB data structure and the value of variable ecb. device__id. The variable rtn__sts is also set equal to the value returned by the specified function. The IOCOMMON function then proceeds to step 2025 where the variable rtn__sts is analyzed to determine whether an error has occurred. If variable rtn__sts equals an error, then the function proceeds to step 2030. Otherwise, the function proceeds to step 2270 in FIG. 21A. At step 2030, the ECB data structure is released to the ecb__arry, and the function proceeds to end at step 2270.

Figure 21C:
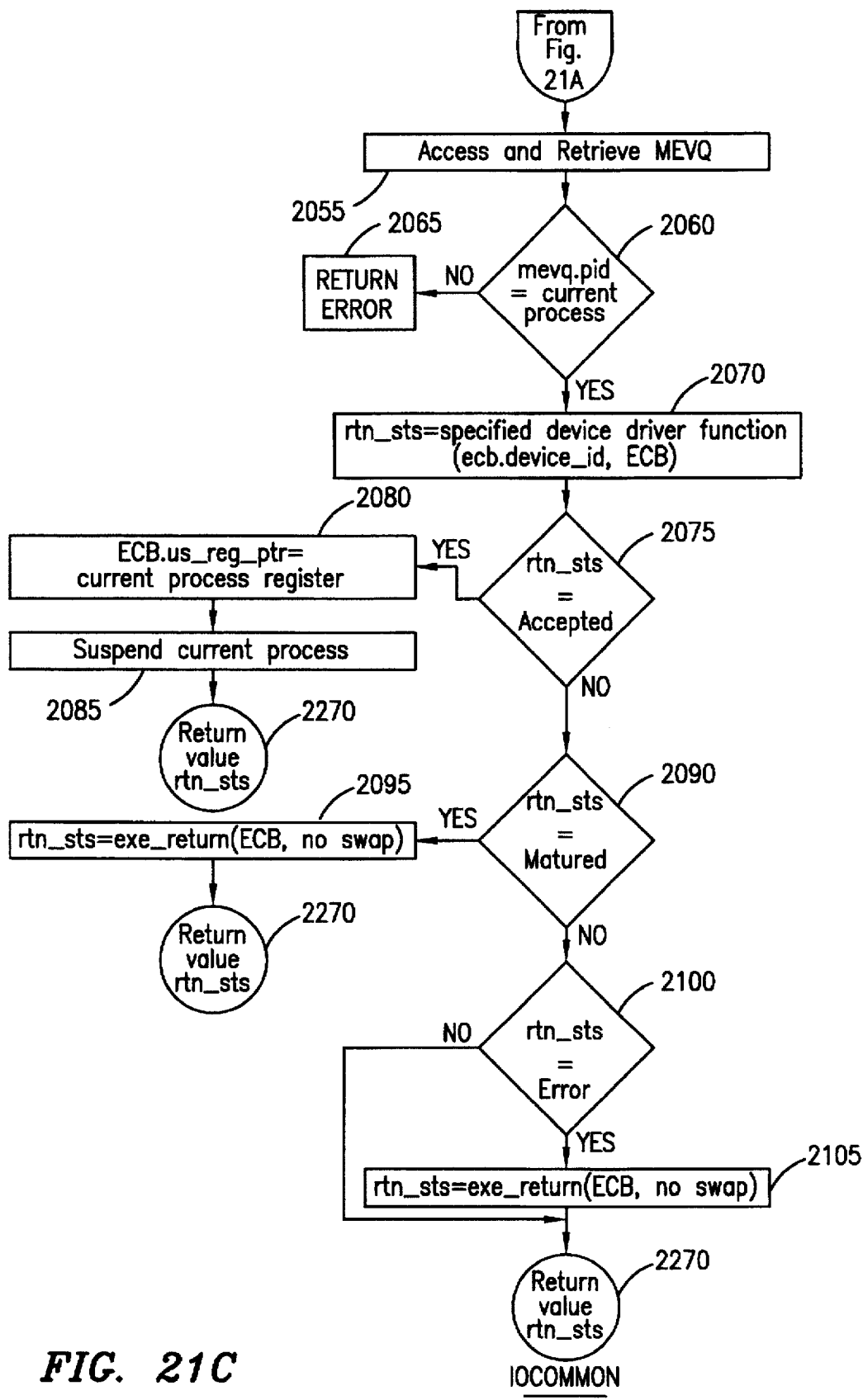
Figure 21E:
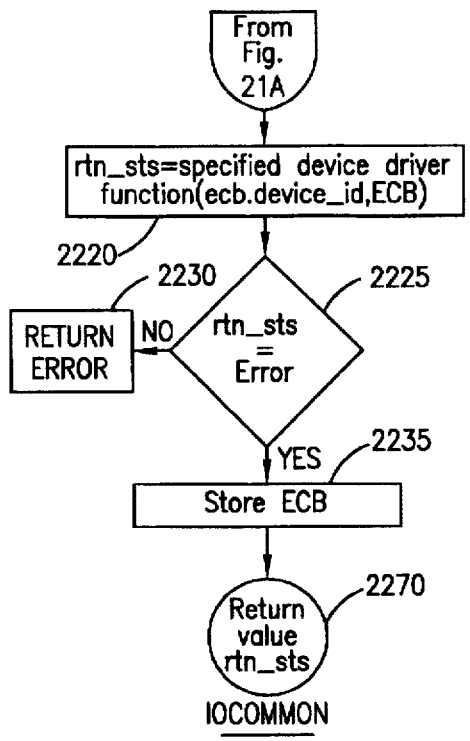

Referring back to FIG. 21A, at step 2050, a determination of whether passive event waiting is specified is made. If variable ECB. EVENT specifies passive event waiting, then the function proceeds to step 2055 in FIG. 21C. Otherwise, the function proceeds to step 2120. Referring now to FIG. 21C, at step 2055 the mevq__arry is accessed using the value of variable ecb. mevq__id and the MEVQ data structure identified by variable ecb. mevq__id is retrieved. The function then proceeds to step 2060 to determine whether the retrieved MEVQ data structure is valid by comparing its associated process to the current process. If variable mevq. pid equals the current process Id, then the function proceeds to step 2070. Otherwise, the function proceeds to step 2065 where an error is returned indicating that an invalid MEVQ was specified by variable mevq__id, and the function proceeds to end.

At step 2070, the specified device driver function is invoked using variable fp and passed the ECB data structure and the value of variable ecb. device__id. The variable rtn__sts is also set equal to the value returned by the specified function. The IOCOMMON function then proceeds to step 2075 to analyze he variable rtn__sts to determine whether the device driver accepted the I/O request. If the device driver accepted the I/O request, then the function proceeds to step 2080. Otherwise, the function proceeds to step 2090. At step 2080, a pointer to the current process's register is stored in variable ecb. us__reg__ptr, and the function proceeds to step 2085 where an OS 206 function is invoked to suspend the current process, and the function proceeds to end at step 2270. Variable rtn__sts is analyzed at step 2090 to determine whether the I/O request is mature. If variable rtn__sts indicates that the I/O request is mature, then the function proceeds to step 2095. Otherwise, the function proceeds to step 2100. The exe__return function is invoked at step 2095 to receive both the ECB data structure and an indication not to swap registers. The variable rtn__sts is also set equal to the value returned by the exe__return function, and the function proceeds to end at 2270.

The variable rtn__sts is analyzed at step 2100 to determine whether the specified device driver indicated that an error has occurred. If variable rtn__sts specifies that the specified device driver has indicated that an error has occurred, then the function proceeds to step 2105. Otherwise, the function proceeds to end at step 2270. The exe__return function is invoked at step 2105 and receives both the ECB data structure and an indication that no register swapping is to occur. The variable rtn__sts is also set equal to the value returned by the exe__return function, and the IOCOMMON function proceeds to end at step 2270.

Figure 21D:
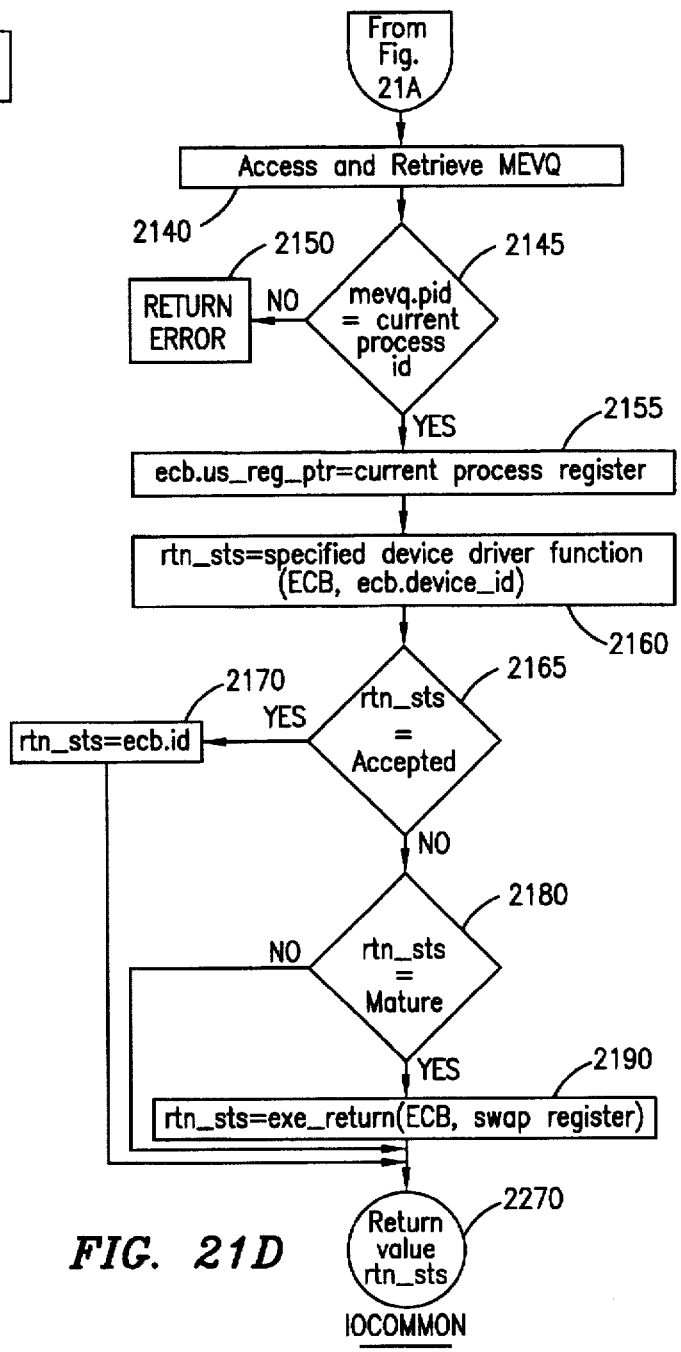

Referring again to FIG. 21A, at step 2120, variable ECB. EVENT is analyzed to determine whether active event waiting is specified. If variable ECB. EVENT indicates that active event waiting is specified, then the function proceeds to step 2140 at FIG. 21D. Otherwise, the function proceeds to step 2210. Referring now to FIG. 21D, at step 2140, the mevq__arry is accessed using the value of the variable ecb. mevq__id and the MEVQ data structure identified by variable ecb. mevq__id is retrieved. The function then proceeds to step 2145 where the retrieved MEVQ data structure is analyzed to verify that it is valid. The MEVQ data structure is valid if the process associated with the MEVQ data structure equals the current process. If variable mevq. pid equals the current process Id, then the function proceeds to step 2155. Otherwise, the function proceeds to step 2150 where an error is returned indicating that the MEVQ data structure identified by variable mevq__id is not valid, and the function proceeds to end. At step 2155, a pointer to the current process's register is stored in variable ecb. us__reg__ptr, and the function proceeds to step 2160.

At step 2160, the specified driver function is accessed by the fp pointer and invoked passing the ECB data structure and the value of variable ecb. device__id. The variable rtn__sts is also set equal to the value returned by the specified driver function. The IOCOMMON function then proceeds to step 2165 where variable rtn__sts is analyzed to determine whether the specified device driver has indicated that it has accepted the I/O request. If variable rtn__sts indicates that the device driver has accepted the I/O request, then the function proceeds to step 2170. Otherwise, the function proceeds to step 2180. At step 2170, variable rtn__sts is set equal to the value of variable ecb. id, and the function proceeds to end at step 2270. At step 2180, variable rtn__sts is analyzed to determine whether the device driver has indicated that an error has occurred, or that the I/O request is mature. If variable rtn__sts specifies that the device driver has indicated that an error has occurred, or that the I/O request is mature, then the function proceeds to step 2190.

Otherwise, the function proceeds to end at step 2270. At step 2190, the exe_return function is invoked and passed the ECB data structure and an indication that the registers are to swapped. The variable rtn_sts is also set equal to the value returned by the exe_return function and the IOCOMMON function proceeds to end at step 2270.

Referring again to FIG. 21A, at step 2210, variable ECB. EVENT is analyzed to determine whether redirection waiting is requested. If variable ECB. EVENT indicates that redirection event waiting is requested, then the function proceeds to step 2220 in FIG. 21E. Otherwise, the function proceeds to end at step 2270. Referring now FIG. 21e, at step 2220, a function of the device driver is invoked, and passed the ECB data structure and the value of variable ecb. device_id. The variable rtn_sts is also set equal to the value returned by the specified device driver function. The IOCOMMON function then proceeds to step 2225 where variable rtn_sts is analyzed to determine if the device driver has indicated that an error has occurred. If variable rtn_sts specifies that the device driver has not indicated that an error has occurred, then the function proceeds to step 2235. Otherwise, the function proceeds to step 2230 where an error is returned and the function proceeds to end. At step 2235, the ECB data structure is stored into a redirection queue or linked list of the OS 206 and the function then proceeds to end at step 2270.

The second function of the event driven coordination portion 240, the exe_return function, accesses an identified process within the OS 206 ready queue or linked list and alters register contents of the queue to correspond to a given ECB data structure. FIG. 22 is a flow chart of the operations comprising the exe_return function in a preferred embodiment of the present invention. The exe_return function is provided with the following information by the event driven portion 230: an ECB data structure and a variable for indicating if register swapping is to occur (flag). The exe_return function begins at step 2300 and proceeds to step 2305 where the SET_RTV function is invoked and passed the ECB data structure. The variable rtn_sts is also set equal to the value returned by the SET_RTV function. The exe_return function then proceeds to step 2310 where variable flag is analyzed to determine whether register swapping is to occur. If variable flag indicates that register swapping is to occur, then the function proceeds to step 2315. Otherwise, the function proceeds to step 2325. At step 2315, the OS 206 process's ready queue or linked list is accessed with the value of variable ecb. pid and the process identified by variable ecb. pid is retrieved. The function then proceeds to step 2320 where the register of the retrieved process is swapped with the register pointed to by variable ecb. us_reg_ptr, and the function proceeds to step 2325 where the value of the variable rtn_sts is returned, and the function proceeds to end.

The third function of the event driven coordination portion 240, the SET_RTV function, passes any data which was transmitted or read from a particular device driver to a specified process. FIG. 23 is a flow chart of the operations comprising the SET_RTV function in a preferred embodiment of the present invention. The SET_RTV function is provided with an ECB data structure by the event driven portion 230. The SET_RTV function begins at step 2400 and proceeds to step 2405 where variable ecb. cmd_fmt is analyzed to determine whether a character was read. If variable ecb. cmd_fmt indicates that a character was read, then the function proceeds to step 2415. Otherwise, the function proceeds to step 2420. At step 2415, variable r_code is set equal to variable ecb. ppu. dt_byte, and the function proceeds to step 2430.

At step 2420, variable ecb. cmd_fmt is analyzed to determine whether data was read or written to a device driver with a message buffer. If variable ecb. cmd_fmt indicates that data was read or written to a device driver with a message buffer, then the function proceeds to step 2425. Otherwise, the function proceeds to step 2430. At step 2425, variable iou. rw. dt_ptr pointed to by variable ecb. iou_ptr is set equal to variable ecb. ppu. dt_ptr, and the function proceeds to step 2430. At step 2430, data register [0] pointed to by variable ecb. us_re_ptr is set equal to variable r_code, and the function proceeds to step 2435 where the value of variable r_code is returned and the function proceeds to end.

INTERNAL INTERFACE/OPERATING SYSTEM PROTOCOL PORTION

Figure 24A:
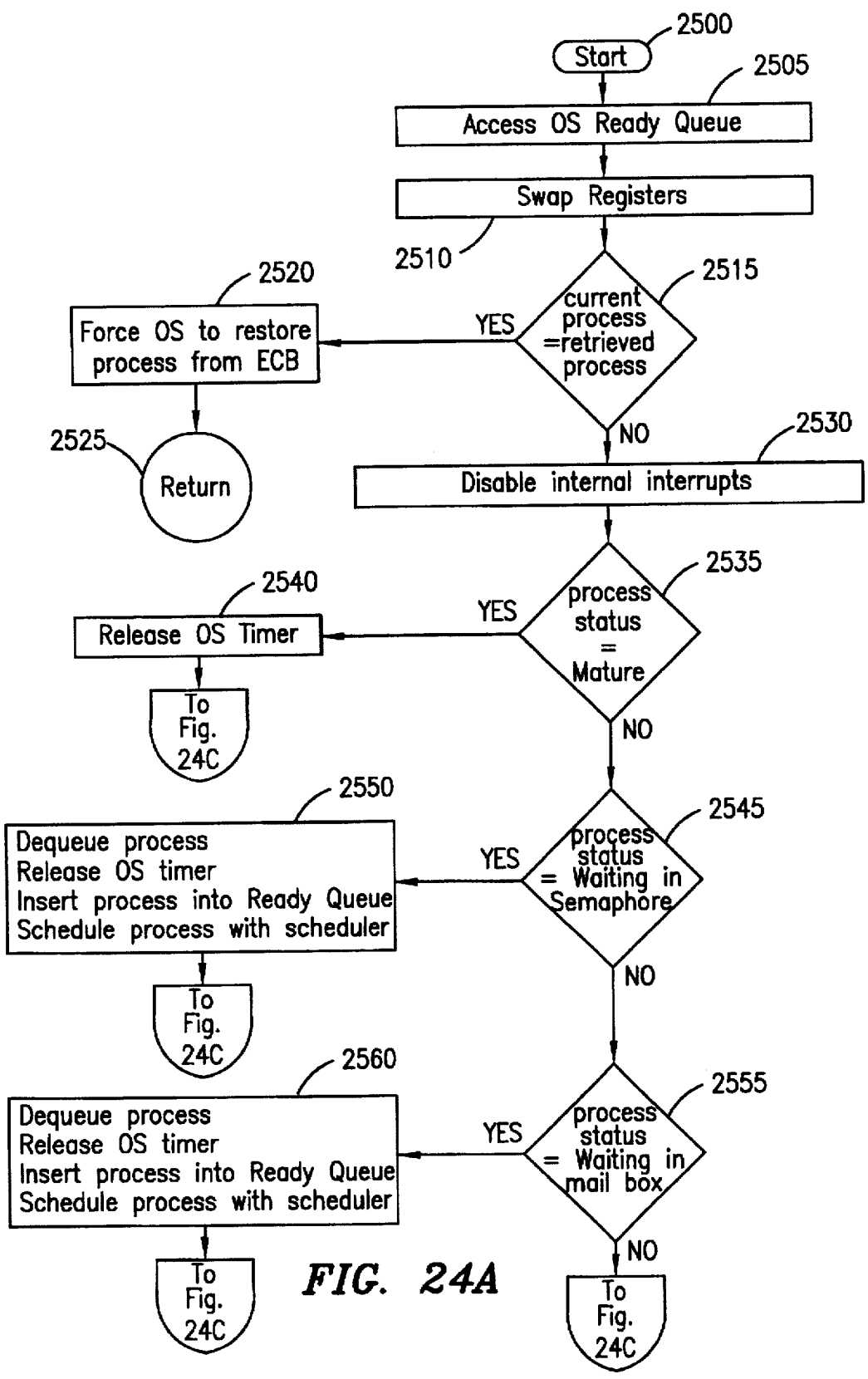
FIGS. 24A–24C are a flow chart of the operations which comprise EV_DVN function in the Operating System Protocol Portion of FIG. 2 in the preferred embodiment of the present invention.

The Operating System protocol portion (hereinafter "OSPP") 235 interacts with the OS 106 to implement event driven I/O requests. The OSPP comprises an event driven function (EV_DVN) which includes the operation shown by the flow charts in FIGS. 24A–24C according to the preferred embodiment of the present invention. The EV_DVN function is provided with an ECB data structure. The EV_DVN function begins at step 2500 and proceeds to step 2505 where the OS 206 ready queue or linked list is accessed with variable ecb. pid, and the process identified by variable ecb. pid is retrieved. The function then proceeds to step 2510 where the user register of the retrieved process is swapped with the user register pointed to by ecb. us_reg_ptr. The function then proceeds to step 2515 where a determination of whether the current process is equal to the process identified by variable ecb. pid is made. If the current process is equal to the process identified by variable ecb. pid, then the function proceeds to step 2520. Otherwise, the function proceeds to step 2530. At step 2520, the OS 106 is forced to restore the process which is identified by the ECB data structure (via ecb. pid), and the function proceeds to end at step 2525.

At step 2530, the external interrupts are disabled with an appropriate OS 206 call, and the function proceeds to step 2535 where the retrieved process status is analyzed to determine whether it is mature. If the retrieved process status is mature, then the function proceeds to step 2540. Otherwise, the function proceeds to step 2545. At step 2540, the OS 206 timer is released, and the function proceeds to step 2575 in FIG. 24C. At step 2545, the retrieved process's status is analyzed to determine whether the process is waiting in an OS 206 semaphore queue or linked list. If the retrieved process's status indicates that the process is waiting in an OS 206 semaphore queue, then the function proceeds to step 2550. Otherwise, the function proceeds to step 2555. At step 2550, the retrieved process is dequed from the OS 206 semaphore queue, the OS timer is released, the retrieved process is inserted into the OS 206 ready queue or linked list, and the retrieved process is scheduled with the OS 206 scheduler. The function then proceeds to step 2575 at FIG. 24C. At step 2555, the retrieved process's status is analyzed to determine whether the process is waiting in a mail box queue. If the retrieved process's status indicates that the process is waiting in a mail box queue, then the function proceeds to step 2560. Otherwise, the function proceeds to step 2565 at FIG. 24B. At step 2560, the retrieved process is dequed from the OS 206 mail box queue, the OS 206 timer associated with the process is released, the retrieved process is inserted into the OS 206 ready queue and the retrieved process is scheduled with the OS 206 scheduler. The function then proceeds to step 2575 at FIG. 24C.

Figure 24B:
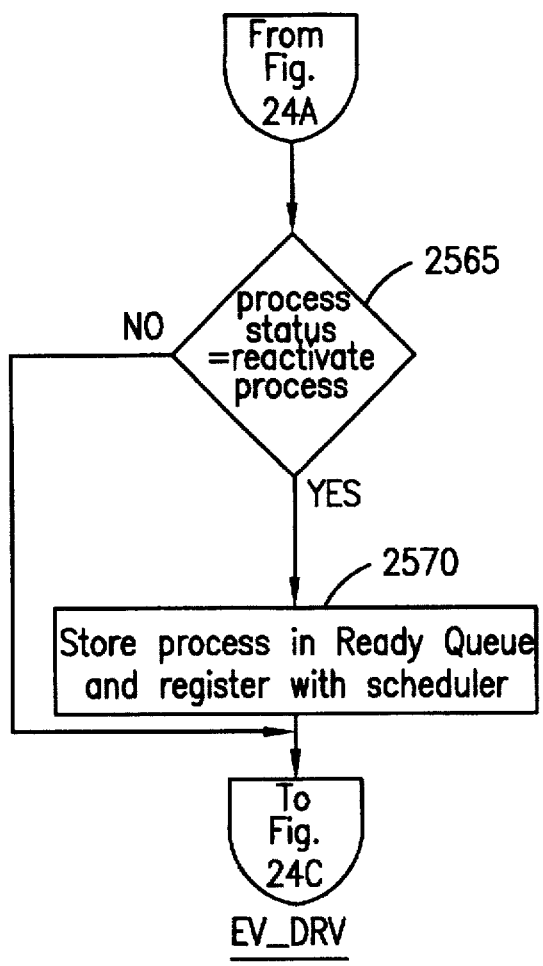

Referring now to FIG. 24B, at step 2565, the retrieved process's status is analyzed to determine whether it indicates that the process was suspended and needs to be reactivated. If the retrieved process's status indicates that the process needs to be reactivated, then the function proceeds to step 2570. Otherwise, the function proceeds to step 2575 in FIG. 24C. At step 2570, the retrieved process is stored into the OS 206 ready queue, and the retrieved process scheduled with the OS 206 scheduler. The function then proceeds to step 2575 at FIG. 24C.

Figure 24C:
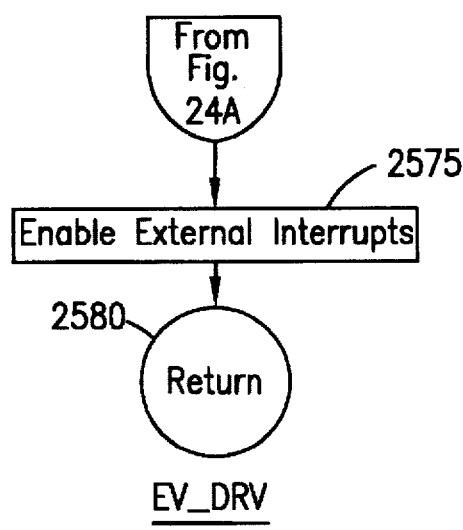

Referring now to FIG. 24C, at step 2575, the external interrupts are enabled with an appropriate OS 206 call, and the function proceeds to end at step 2580.

DEVICE DRIVER INTERFACE/EVENT DRIVER PORTION

Referring back to FIG. 2, the device driver interface 220 comprises an event driven portion 245 for communicating with device drivers 110. The device driver 110 communicates with the event driver portion 245 via logic path 246. The event driver portion 245 comprises an I/O done function (IODONE) and a system interface function (sys_if).

The IODONE function of the event driven portion 245 is invoked by a device driver when the information of an I/O request has been collected and stored in an associated ECB data structure. The IODONE function comprises the operations shown in the flow charts of FIGS. 25A-25B according to the preferred embodiment of the present invention. The IODONE function is provided with an ECB data structure from a device driver.

Figure 25A:
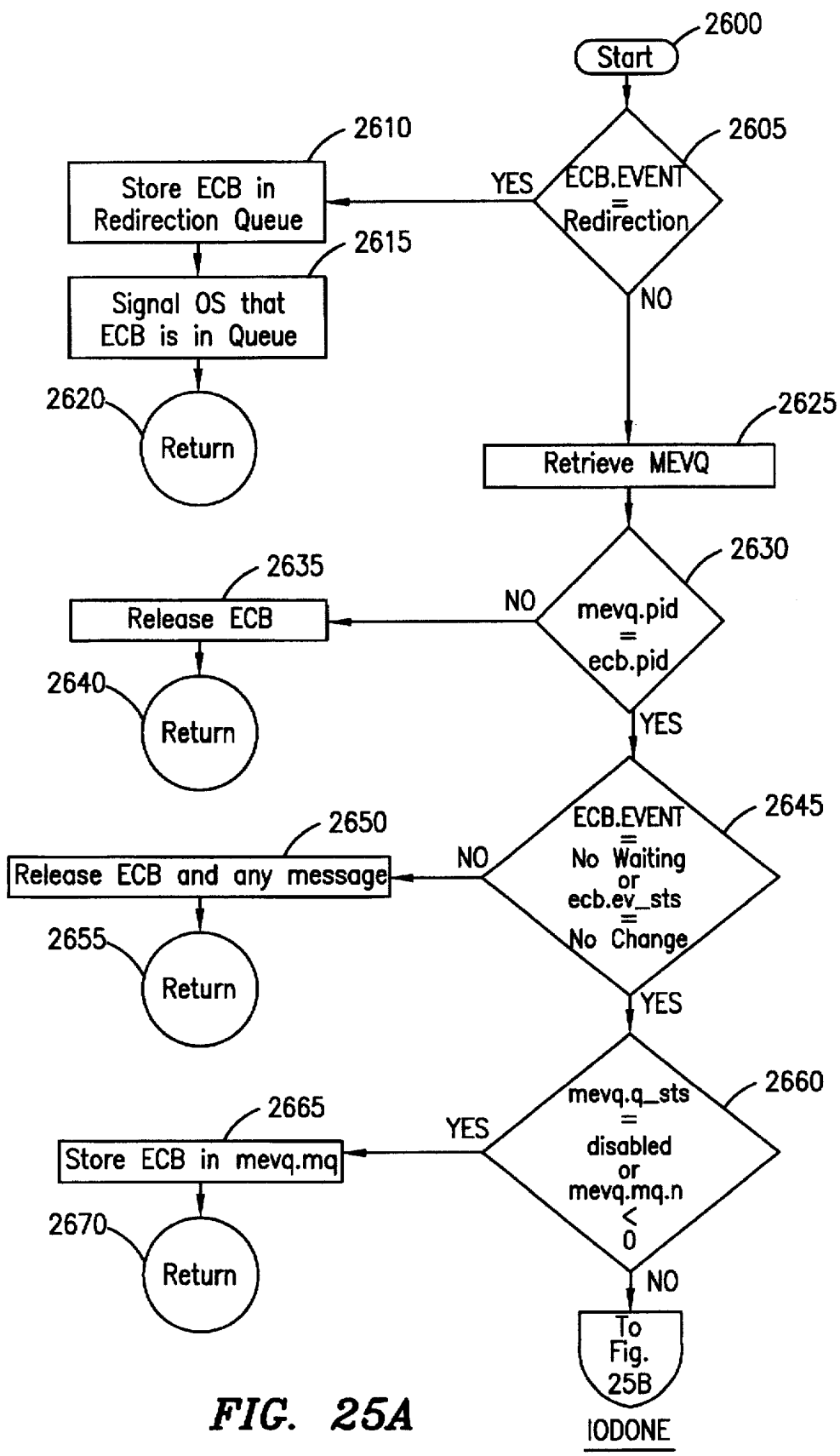
FIGS. 25A–25B are a flow chart of the operations which comprise the IODONE function in the event driver portion of FIG. 2 in the preferred embodiment of the present invention.

Referring now to FIG. 25A, the IODONE function begins at step 2600 and proceeds to step 2605 where a determination is made concerning whether redirection event waiting is specified. If variable ECB. EVENT specified redirection event waiting, then the function proceeds to step 2610. Otherwise, the function proceeds to step 2625. At step 2610, the ECB data structure is stored in the OS's 206 redirection queue, and the function proceeds to step 2615 where the OS 206 is signalled that the ECB data structure is waiting in the redirection queue, and the function proceeds to end at step 2620.

At step 2625, the mevq_arry is accessed with the value of variable ecb. mevq_id, and the MEVQ data structure identified by variable ecb. mevq_id is retrieved. The function then proceeds to step 2630 where the process identified by variable mevq. pid is compared to the process identified by variable ecb. pid. If the process identified by variable mevq. pid is the same process identified by variable ecb. pid, then the function proceeds to step 2645. Otherwise, the function proceeds to step 2635 where the ECB data structure is released, and the function proceeds to end at step 2640.

At step 2645, variable ECB. EVENT is analyzed to determine whether no event waiting is specified, or there has been no change in the status of the I/O request. If variable ECB. EVENT specifies no waiting, or there has been no change in the status of the I/O request, then the function proceeds to step 2650. Otherwise, the function proceeds to step 2660. At step 2650, the ECB data structure is released, and the function proceeds to end at step 2655. At step 2660, variable mevq. q_sts is analyzed to determine whether the retrieved MEVQ data structure is disabled (i.e., that a previously requested active or redirection I/O request is being processed), or if variable mevq. mq. n indicates that the linked list containing the ECB data structure is not empty. If the MEVQ data structure is disabled or the linked list containing the ECB data structure is not empty, then the function proceeds to step 2665. Otherwise, the function proceeds to step 2675 in FIG. 25b. At step 2665, the ECB data structure is stored in the linked list identified by variable mevq. mq, and the function proceeds to end at step 2670.

Figure 25B:
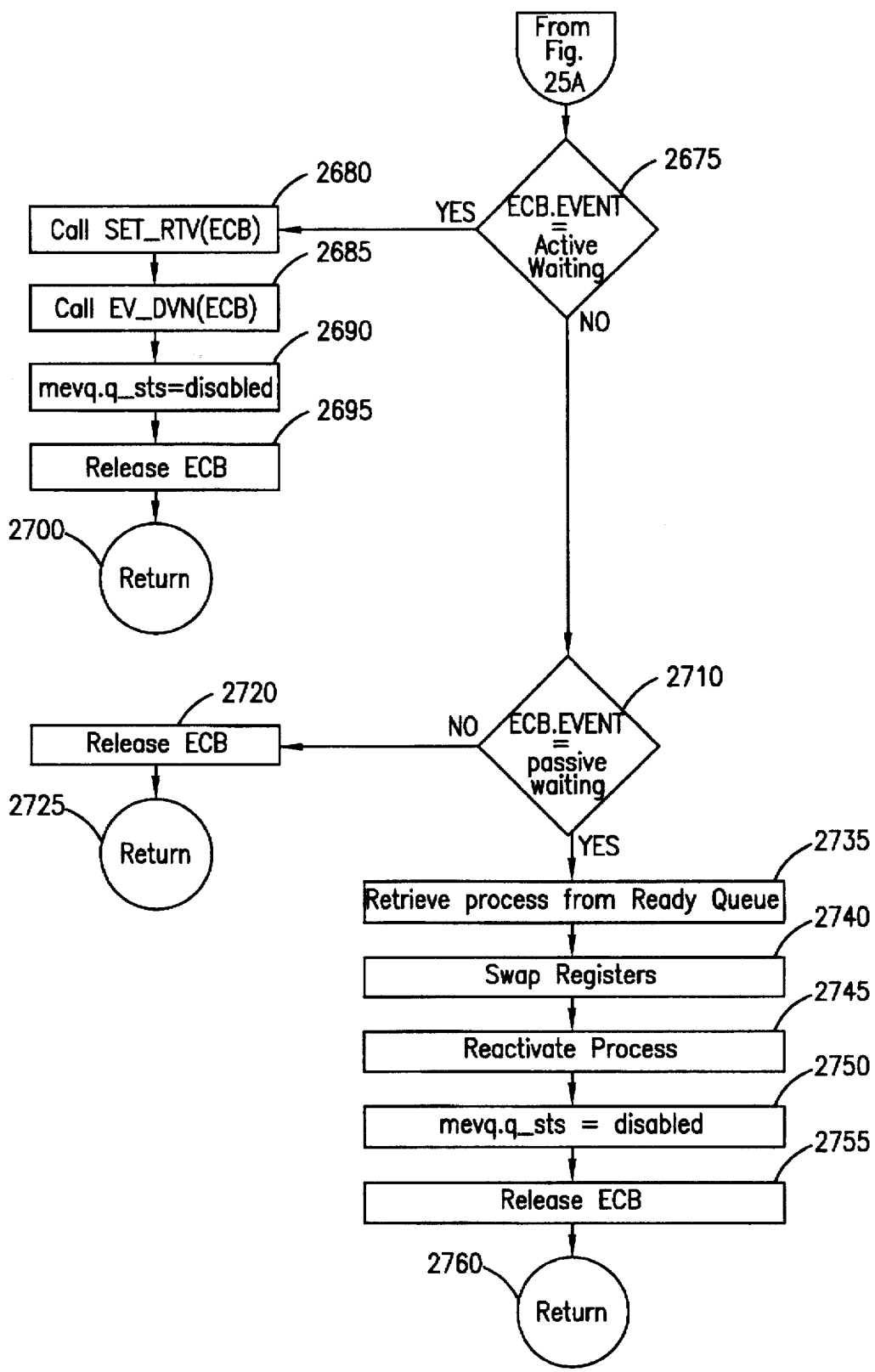

Referring now to FIG. 25B, at step 2675, variable ECB. EVENT is analyzed to determine whether active event waiting is requested. If variable ECB. EVENT indicates that active event waiting is requested, then the function proceeds to step 2680. Otherwise, the function proceeds to step 2710. At step 2680, the SET_RTV function is invoked passing the ECB data structure and the IODONE function proceeds to step 2685 where the EV_DVN function is invoked passing the ECB data structure.

The IODONE function then proceeds to step 2690 where variable mevq. q_sts is set to disabled in order to indicate that the current I/O request which specified active waiting is to be executed before any other active I/O requests are executed by the same process. The IODONE function then proceeds to step 2695 where the ECB data structure is released, and the function proceeds to end at step 2700. At step 2710, variable ECB. EVENT is analyzed to determine whether passive event waiting is requested. If variable ECB. EVENT indicates that passive event waiting is requested, then the function proceeds to step 2720. Otherwise, the function proceeds to step 2735.

At step 2720, the ECB data structure is released, and the function proceeds to end at step 2725. At step 2735, the SET_RTV function is invoked passing the ECB data structure, the OS 106 ready queue is accessed with the value of variable ecb. pid and the process which is identified by variable ecb. pid is retrieved. The function then proceeds to step 2740 where the user register of the retrieved process is swapped with the user register identified by variable ecb. us_reg_ptr. The function then proceeds to step 2745 where the suspended process identified by variable ecb. pid is reactivated with an OS 106 call. The function then proceeds to step 2750 where variable mevq. sts is set to disabled, and the function proceeds to step 2755 where the ECB data structure is released, and the function proceeds to end at step 2760.

Figures 26A, 26B:
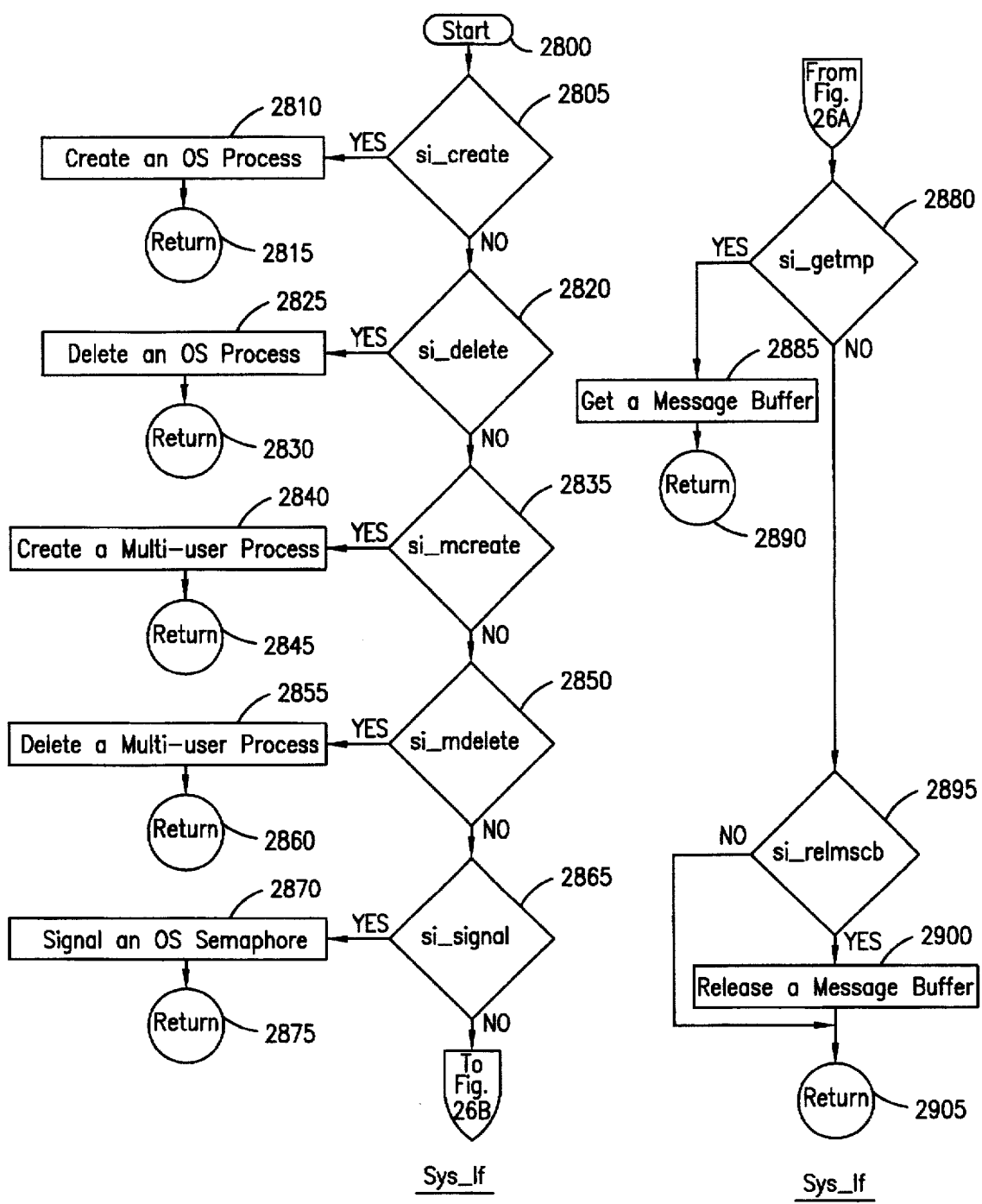
FIGS. 26A–26B are a flow chart of the operations which comprise the SYS_IF function of the event driver portion of FIG. 2 in the preferred embodiment of the present invention.

The sys_if function of the event driven portion 245 is called by a device driver to invoke certain operations of the OS 106 via logic path 246, and comprises the operations shown in the flow charts of FIGS. 26A-26B according to the preferred embodiment of the present invention. The sys_if function begins at step 2800 and proceeds to step 2805 where a determination is made concerning whether the si_create function is specified. If the si_create function is specified, then the sys_if function proceeds to step 2810. Otherwise, the sys_if function proceeds to step 2820. At step 2810, an OS 106 process is created with an appropriate OS 106 call, and the sys_if function proceeds to end at step 2815. At step 2820, a determination of whether the si_delete function is specified is made. If the si_delete function is specified, then the sys_if function proceeds to step 2825. Otherwise, the sys_if function proceeds to step 2835. At step 2825 a specified process is deleted with an appropriate OS 106 call, and the function proceeds to end at step 2830.

At step 2835, a determination of whether the si_mcreate function is specified is made. If the si_mcreate function is specified, then the sys_if function proceeds to step 2840. Otherwise, the sys_if function proceeds to step 2850. At step 2840, a multi-user process is created with an appropriate OS 106 call, and the sys_if function proceeds to end at step 2845. At step 2850, a determination of whether the si_m_delete function is specified is made. If the si_m_ delete function is specified, then the sys_if function proceeds to step 2855. Otherwise, the sys_if function proceeds to step 2865. At step 2855, a specified multi-user process is deleted with an appropriate OS 106 call, and the sys_if function proceeds to end at step 2860. At step 2865, a determination of whether the si_signal function is specified is made. If the sys_if function is specified, the sys_if function proceeds to step 2870. Otherwise, the sys_if function proceeds to step 2880 in FIG. 26B. At step 2870, an OS 106 semaphore is signalled with an appropriate OS 106 call and the sys_if function proceeds to end at step 2875.

Referring now to FIG. 26B, at step 2880, a determination of whether the si_getmp function is specified is made. If the si_getmp function is specified, then the sys_if function proceeds to step 2885. Otherwise, the sys_if function proceeds to step 2895. At step 2895, a message buffer is retrieved with an appropriate OS 106 call, and the sys_if function proceeds to end at step 2890. At step 2895, a determination of whether the si_relmscb function is specified is made. If the si_relmscb function is specified, then the sys_if function proceeds to step 2900. Otherwise, the sys_if function proceeds to end at step 2905. At step 2900, a specified message buffer is released with an appropriate OS 106 call, and the sys_if function proceeds to end at step 2905.

DEVICE DRIVER

Referring back to FIGS. 1 and 2, a device driver 110 manages and controls the I/O requests to the physical device (hardware) 114, performs layer 1 (OSI model) functionalities (e.g. handshaking, synchronization, protocol verification and low level error checking), participates in event driven control, and processes physical device 114 interrupts. The device driver 110 accomplishes these tasks by using the following information: the operating status of the physical device, the identification of the specified physical device from which the I/O requests are to be collected, a queue for read events, a queue for write requests (i.e. write, WRCHR), a buffer queue for matured read requests, and a buffer queue for matured write requests. There are numerous ways in which the above information could be provided and used by the device driver. For example, in the preferred embodiment of the present invention a device control table (DCT) data structure is used. The DCT data structure may be implemented in C++ as illustrated in C++ in Table XI below.

TABLE XI

```
Typedef struct
{
    WORD      dev_id;              /* device ID */
    union {
              WORD d_cls;
              struct
              {
                  BYTE dev_type;
                  BYTE dev_mode;
              } dc;
    } dev_class;                   /* device
                                      classification */
    WORD      operating_status;    /*           */
    EV_LIST   in_event_waiting_q;  /* queue */
    BUF_QUE   in_buffer_q;         /* use by in waiting
                                      events */
    EV_LIST   out_event_waiting_q; /* queue */
    BUF_QUE   out_buffer_q;        /* use by out waiting
                                      events */
    EV_LST    control_status_ev_q; /* queue for status
                                      event */
```

TABLE XI-continued

```
    ADDRESS   cfg_tbl_ptr;         /* waiting only */
                                   /* pointer to specific */
                                   /* configuration table */
    ADDRESS   sts_tbl_tr;          /* pointer to specific */
                                   /* status table */
} DCT                              /* device control
                                      table */
```

© 1993 Telefonaktiebolaget L M Ericsson

Variable dev_id (DCT. dev_id) is used by the device driver to identify a particular physical device under its control. Variable dev_type (DCT. dc. dev_type) identifies the type of physical device specified. The variable dev_mode (DCT. dc. dev_mode) identifies the current operating mode of the physical device (e.g. master or slave). Variable operating_status (DCT. operating_status) indicates the current operating status of the specified physical device. The variable in_event_waiting_q (DCT. in_event_waiting_q) is used to store ecb data structures in connection with a read request. Variable in_buffer_q (DCT. in_buffer_q) is a queue used to store data associated with the read request. Variable out_event_waiting_q (DCT. out_event_waiting_q) is used to store ecb data structures associated with a write request. Variable out_buffer_q (DCT. out_buffer_q) is used to store data associated with the write request. Variable control_status_ev_q (DCT. control_status_ev_q) is used for storing ecb data structures associated with a I/O status request (i.e. a request made via the iosts function).

Referring back to FIG. 1, the device driver 110 comprises a general system interface 111, a device specific interface 111 and a hardware dependent interface 112.

The general system interface 111 is used by the I/O event manager 108 for specific I/O requests from a hardware device which is controlled by the device driver. The general system interface 111 comprises the following functions: initialize the device driver (Init), determine the current status of an I/O event within a specified hardware device (iosts), control the device driver (IOCTL), read information from a specified hardware device (read) and write information to a specified hardware device (write). The functions may be made accessible to the I/O event manager 108 in numerous ways. For example, in the preferred embodiment of the present invention, a device vector table (Dvt) data structure is used. A Dvt data structure may be implemented in C++ as illustrated in Table XII below.

TABLE XII

```
Typedef struct
{
    VOID  (init *)( );      /* initialization vector */
    VOID  (ioctl *)( );     /* io control vector */
    VOID  (read *)( );      /* read vector*/
    VOID  (write *)( );     /* write vector */
    VOID  (iosts *)( );     /* iostatus_xxx vector */
    DCT   (*dct_pt;;        /* device control table pointer */
    int   tbl_id;           /* an indication of valid table. */
} DVT;                      /* device vector table */
```

© 1993 Telefonaktiebolaget L M Ericsson

The Dvt data structure contains the physical addresses for each of the device driven's functions. The Dvt data structure also contains a pointer to an associated DCT data structure, and a variable tbl_id (Dvt. tbl_id) for indicating a valid table.

Figure 27A:
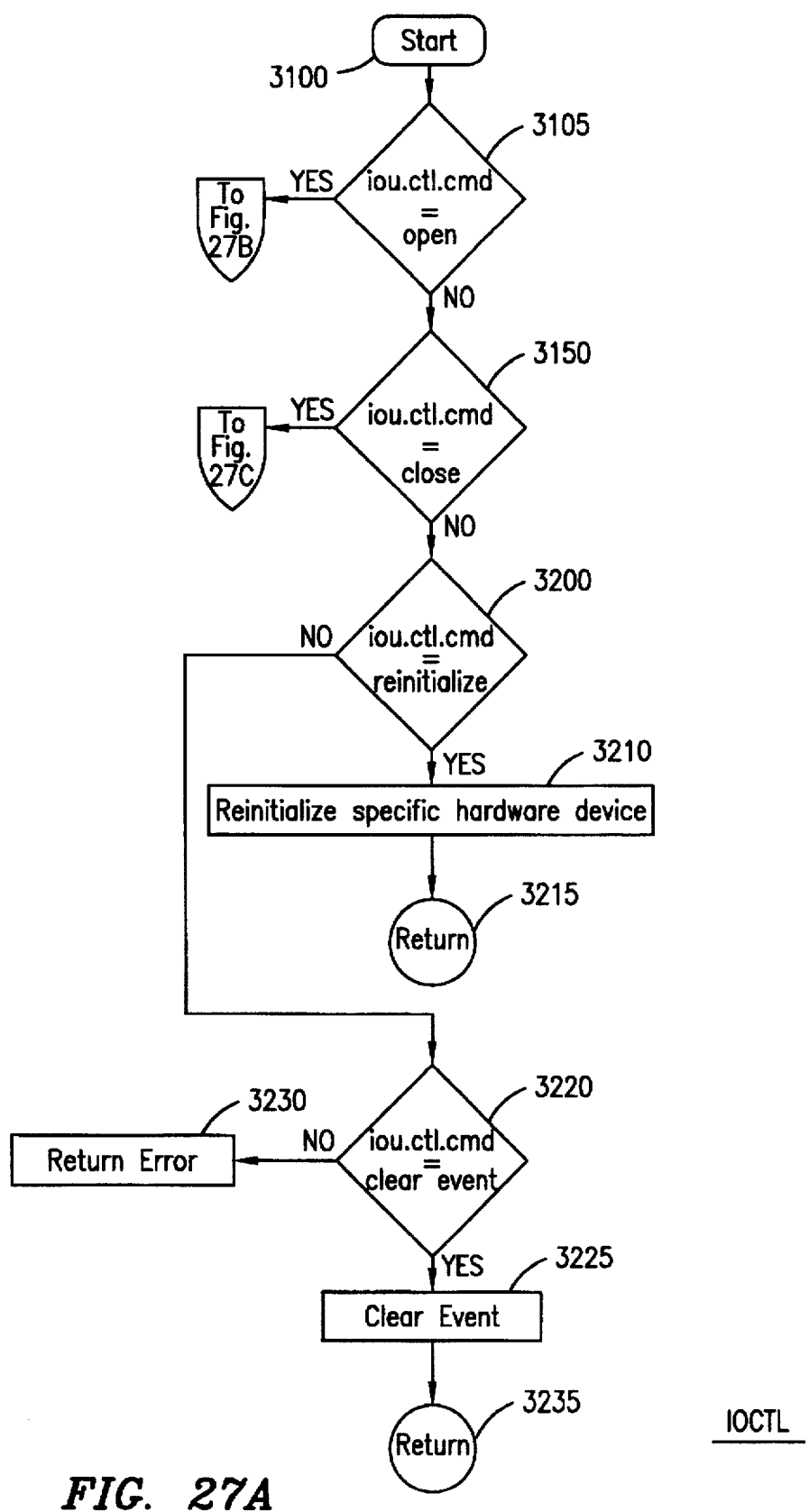
FIGS. 27A–27C are a flow chart of the operations which comprise the IOCTL function for the device driver of FIGS. 1 and 2 in the preferred embodiment of the present invention.
Figure 27B:
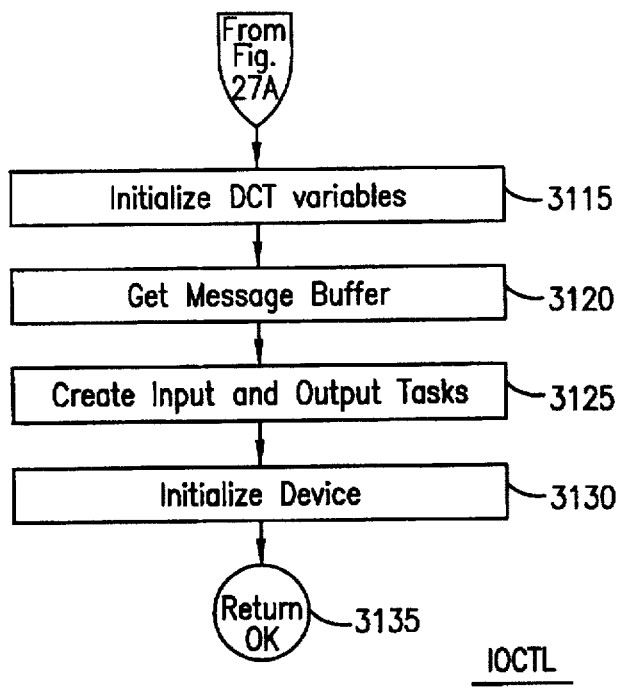
Figure 27C:
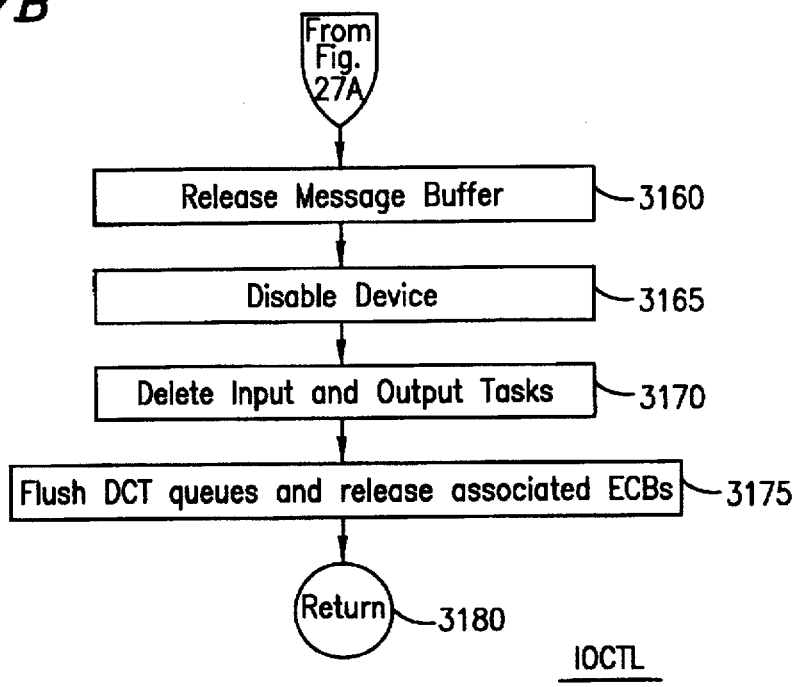

The IOCTL function of the device driven 110 opens, closes and reinitializes a device driver. FIGS. 27A-27C are a flow chart of the operations comprising the IOCTL function according to a preferred embodiment of the present invention. The IOCTL function is provided with an ECB data structure and a variable identifying a particular hardware device (dev). Referring now to FIG. 27A, the IOCTL function begins at step 3100 and proceeds to step 3105 where variable iou. ctl. cmd is analyzed to determine whether a command for opening the device driver is specified. If variable iou. ctl. cmd specifies a command for opening the device driver, then the function proceeds to step 3115 in FIG. 27B. Otherwise, the function proceeds to step 3150.

Referring now to FIG. 27B, at step 3115, the DCT data structure variables are initialized with information from the iou. ctl. cmd data structure to indicate that the specified physical device is open. The function then proceeds to step 3120 where a message buffer is retrieved by invoking the sys_if function in the event driver portion 245 (FIG. 2). The function then proceeds to step 3125 where an OS 106 process is created for each of the input and output tasks of the device driver by calling the sys_if function with an indication to create the processes. The function then proceeds to step 3130 where the specified physical device is initialized with a call to the hardware dependent interface initialization function. The function then proceeds to step 3135 where a value is returned indicating that the requested operation was performed successfully, and the function proceeds to end.

Referring now to FIG. 27C, at step 3160, the previously allocated message buffer is released by calling the sys_if function and specifying the release of the message buffer, and the function proceeds to step 3165. At step 3165, an associated function in the hardware dependent interface is invoked to disable the physical device specified by variable dev, and the function proceeds to step 3170 where the processes associated with the input and output tasks are deleted by calling the sys_if function and the IOCTL function proceeds to step 3175. At step 3175, all the queues in the DCT data structure are flushed and any ECB data structures contained therein are released by calling the sys_if function. The IOCTL function then proceeds to end at step 3180.

Referring again to FIG. 27A, at step 3200, variable iou. ctl. cmd is analyzed to determine whether the specific physical device is to be reinitialized. If the specified hardware device is to be reinitialized, then the function proceeds to step 3210. Otherwise, the function proceeds to step 3220. At step 3210, the initialization function to the hardware dependent interface is invoked, and the function ends at step 3215.

At step 3220, variable iou. ctl. cmd is analyzed to determine whether an I/O request is to be cleared. If an I/O request is to be cleared, then the function proceeds to step 3225. Otherwise, the function proceeds to step 3230 where an error is returned indicating that an invalid request was made, and the function proceeds to end. At step 3225, the I/O request identified by variable iou. ctl. table is cleared, and the function proceeds to end at step 3235.

The iosts function of the general system interface 111 determines the current status of an I/O request. FIG. 28 is a flow chart of the operations comprising the iosts function in a preferred embodiment of the present invention. The iosts function is provided with a variable that identifies a physical device (dev) and an ECB data structure. The iosts function begins at step 3300 and proceeds to step 3305 where the variable ECB. EVENT is analyzed. If the value of variable ECB. EVENT indicates that a non-occurrence of an I/O (false event) event was requested, then the function proceeds to step 3510. Otherwise, the function proceeds to step 3345. At step 3310, a decision of whether the I/O event requested is mature. If the I/O event requested is mature, then the function proceeds to step 3315. Otherwise, the function proceeds to step 3325. At step 3315, variable ecb. ev_sts is set to indicate that the requested I/O event is mature, and the function proceeds to step 3320 where a value is returned indicating that the requested I/O event is mature, and the function proceeds to end.

At step 3325, the ECB data structure is stored in the queue identified by variable DCT. control_status_ev_q, and the function proceeds to step 3330 where the control status flag in the control status table is set to indicate that an occurrence of an I/O event was requested (true event), and the function proceeds to step 3335. At step 3335, the sys_if function is invoked requesting a semaphore to be sent to the task input for the device driver. The function then proceeds to step 3340 where a value is returned indicating that the requested I/O event was accepted, and the function proceeds to end.

At step 3345, a determination of whether the requested I/O event is mature is made. If the requested I/O event is mature, then the function proceeds to step 3350. Otherwise, the function proceeds to step 3360. At step 3350, the variable ecb. ev_sts is set to indicate that the requested I/O event is mature. The function then proceeds to step 3355 where a value is returned indicating that the requested I/O event is mature, and the function proceeds to end. At step 3360, the ECB data structure is stored in the queue identified by variable DCT. control_status_ev_q, and the function proceeds to step 3365. At step 3365, the control status flag in the control status table is set to indicate that the non-occurrence of an I/O event (false event) was requested. The function then proceeds to step 3370 where the sys_if function is invoked requesting a semaphore to be created specifying the task input, and the function proceeds to step 3375. At step 3375, a value is returned indicating that the I/O event requested is mature, and the function proceeds to end.

Figure 29:
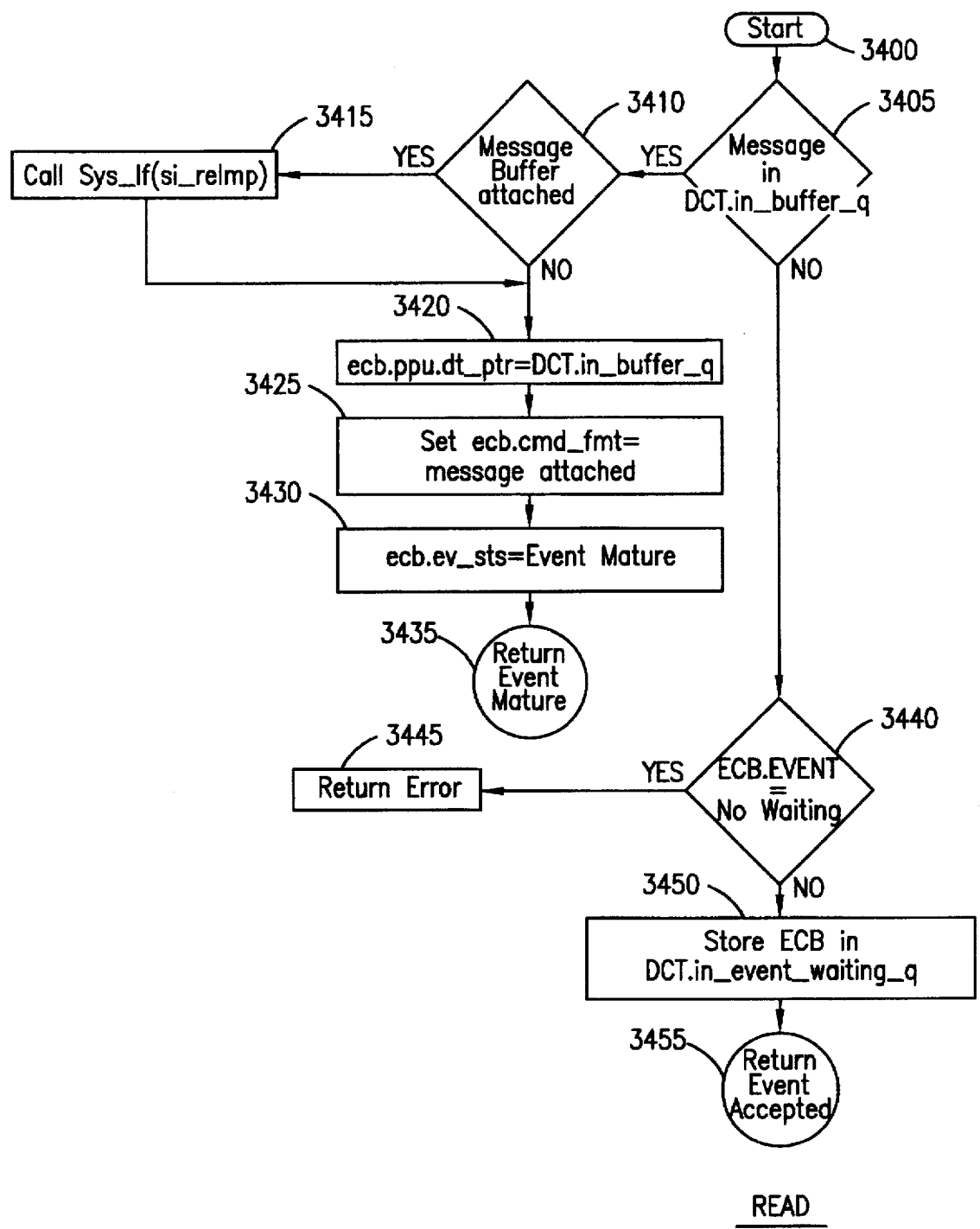
FIG. 29 is a flow chart of the operations which comprise the READ function in the device driver of FIG. 1 in the preferred embodiment of the present invention.

The read function of the general system interface 111 reads data from an identified physical device. FIG. 29 is a flow chart of the operations comprising the read function in the device driver 114 of FIG. 1 in a preferred embodiment of the present invention. The read function is provided with a variable specifying the physical device (dev) and an ECB data structure. The read function begins at step 3400 and proceeds to step 3405 where a determination of whether a message buffer is stored within the buffer identified by variable DCT. in_buffer_q is made. If a message buffer is stored within the buffer, then the function proceeds to step 3410. Otherwise, the function proceeds to step 3420. At step 3410, a decision of whether a message buffer is attached is made. If variable ecb. cmd_fmt indicates that a message buffer is attached, then the function proceeds to step 3415. Otherwise, the function proceeds to step 3420.

At step 3415, the sys_if function is invoked indicating that the message buffer pointed to by variable ecb. cmd_fmt is to be released, and the function proceeds to step 3420. At step 3420, the variable ecb. ppu. dt_ptr is set to point to the message contained in the queue identified by variable DCT. in_buffer_q. The function then proceeds to step 3425 where variable ecb. cmd_fmt is set to indicate that a message is attached, and the function proceeds to step 3430 where the variable ecb. ev_sts is set to indicate that the I/O request is mature, and the function proceeds to step 3435. At step 3435, a value is returned indicating that the I/O request is mature, and the function proceeds to end. At step 3440, a determination of whether no event waiting is specified is made. If variable ECB. EVENT indicates that no event waiting is specified, then the function proceeds to step 3445. Otherwise, the function proceeds to step 3450. At step 3445, an error is returned indicating that no event waiting is not supported, and the function proceeds to end. At step 3450, the ECB data structure is stored in the queue identified by variable DCT. in_event_waiting_q, and the function proceeds to step 3455 where a value is returned indicating that the I/O request was accepted and the function proceeds to end.

Figure 30:
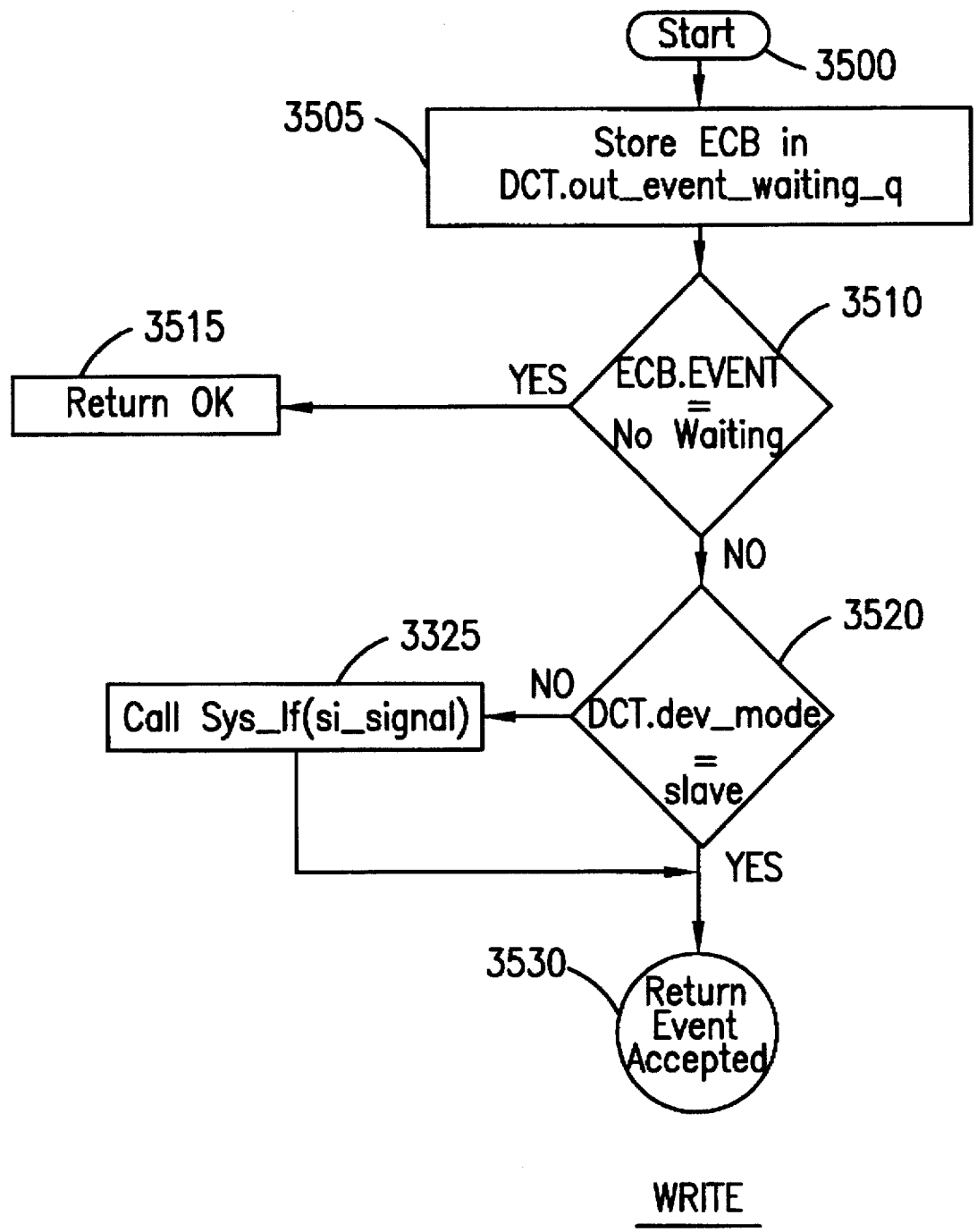
FIG. 30 is a flow chart of the operations which comprise the WRITE function in the device driver of FIG. 1 in the preferred embodiment of the present invention.

The write function of the general system interface 111 writes data to an identified physical device. FIG. 30 is a flow chart of the operations comprising the write function in the device driver 110 of FIG. 1 in the preferred embodiment of the present invention. The write function is provided with a variable identifying the hardware device (dev) and an ECB data structure. The write function begins at step 3500 and proceeds to step 3505 where the ECB data structure is stored in the queue identified by variable DCT. out_event_waiting_q. The function then proceeds to step 3510 where variable ECB. EVENT is analyzed to determine whether no event waiting is specified. If no event waiting is not specified, then the function proceeds to step 3520. Otherwise, the function proceeds to step 3515 where a value is returned indicating that the I/O request will be processed, and the function proceeds to end.

At step 3520, variable DCT. dc. dev_mode is analyzed to determine whether the specified physical device is operating in slave mode. If the specified hardware device is operating in slave mode, then the function proceeds to step 3530. Otherwise, the function proceeds to step 3525 where the sys_if function is invoked indicating a semaphore which is to be sent to the output task of the device driver, and the function proceeds to step 3530. At step 3530, a value is returned indicating that the I/O request has been accepted, and the function proceeds to end.

The device specific interface 112 of the device driven 110 implements the FSMs which execute the input and output I/O requests. There is at least one task for executing an input I/O request, and at least one task for executing an output I/O request. The task for executing an input I/O request implements a retrieve function (state) for retrieving matured requested I/O event data. The output task manipulates the ecb data structures stored in a queue identified by variable DCT. out_event_waiting_q, and the data stored in a queue identified by variable DCT. out_buffer_q.

The program code in the device specific interface 112 does not access the physical hardware directly, instead, it calls assembly functions provided by the hardware dependent interface 113 of the device driven 110.

The hardware dependent interface 113 comprises assembly subroutines which directly access the physical components of a specified physical device. More specifically, the hardware dependent interface 113 comprises the following assembly subroutines, i.e., read, write, device data input and device data output.

Figure 31:
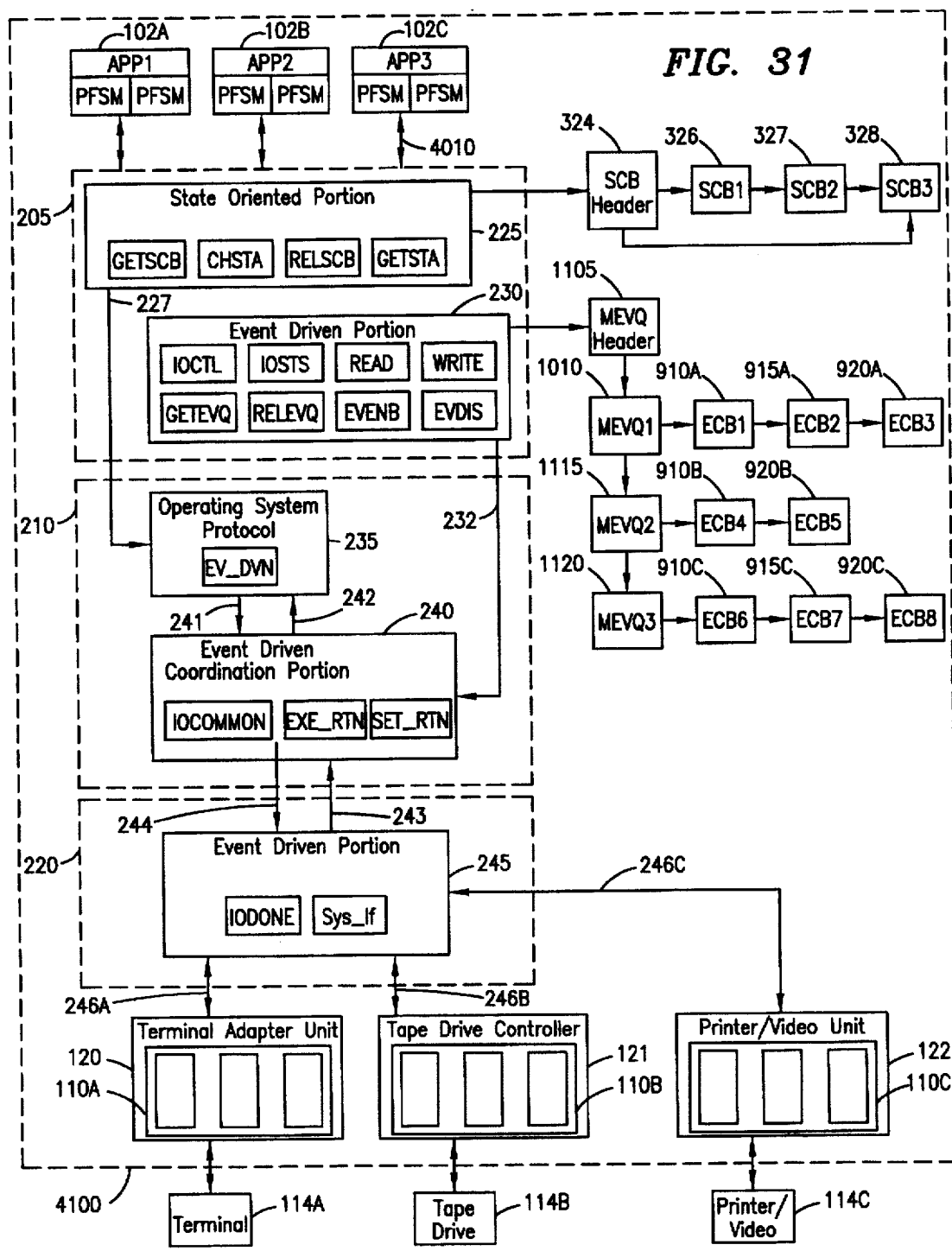
FIG. 31 is a block diagram of an exemplary embodiment of the present invention as it exists within a telecommunications switch.

FIG. 31 is a block diagram of an exemplary embodiment of the present invention as it exist within a telecommunications switch 4100. The switch 4100 comprises a plurality of application programs App1 102a, App2 102b, and App3 102c, each one having PFSMs embedded therein, an operating system having an I/O Event Manager including the application interface 205, the internal interface 210 and the device driver interface 220, an a plurality of device driver 110a–c connected to physical devices 114a–c, all of which are substantially similar in operation compared to the embodiments shown in FIGS. 1 and 2. As noted above, the FSMs are referred to as PFSMs because they are designed specifically to implement telecommunication services. The device drivers 110a–c can be, for example, drivers for a terminal adapter unit (TAU) 120, a tape drive controller (TDC) 121, and a printer/video unit (PVU) 122, respectively. The TAU 120 is a terminal adapter unit of the type TAU-2680 manufactured by Ericsson Business Communications Inc., in Cypress, Calif.

The application interface 205 comprises the state oriented portion 225 and the event driven portion 230, both providing the functions shown and previously described above. The state oriented portion uses SCB data structures similar to those described and shown above, i.e., SCB Header 324, SCB 1 326, SCB 2 327 and SCB 3 328 described in more detail below. The event driven portion 230 employs ECB data structures similar to those described and shown above, i.e., ECB1–ECB8, 910a–c, 916a–c, and 920a–c, all of which are maintained by corresponding MEVQ data structures similar to those described and shown above, i.e., MEVQ Header 1105, MEVQ1 1110, MEVQ2 1115 and MEVQ3 1120.

App1 102a, App2 102b, and App3 102c use the state oriented portion 225 to perform state transitions for their associated PFSMS. The state oriented portion 225 implements state transitions by manipulating processes which are associated with the PFSMs. The manipulation of the PFSM processes requires the storage and retrieval of process and PFSM data. The State oriented portion 225 uses data structures SCB1 326, SCB2 327, and SCB3 328 for the storage and retrieval of process and PFSM data for App1 102a, App2 102b, and App3 102c, respectively. The state oriented portion 225 also employs an SCB Header 324 data structure to maintain the SCB data structures. The state oriented portion 225 implements the manipulation of the processes associated with the PFSMS by using the operating system protocol 235 within the internal interface 210 via logic path 227.

App1 102a, App2 102b, and App3 102c use the event driven portion 230 to implement I/O requests for event driven control over the Input/Output (I/O) capabilities of the terminal 114a, the tape drive 114b, or the printer/video 114c. Each I/O request which specifies active waiting necessitates the storage and retrieval of process and control data associated with the application program making the I/O request. In the preferred embodiment of the present invention ECB data structures are used to perform the task. For example, App1 102a may make three such I/O requests specifying active waiting (hereinafter referred to as active I/O requests) from the event driven portion 230 for the terminal 114a. The event driven portion 230 employs data structures ECB1 910a, ECB2 915a, and ECB3 920a ("App1 ECBs") for the three active I/O requests, and uses an MEVQ1 1110 data structure to maintain the App1 ECBs.

In another example, App2 102b may make two active I/O requests from the event driven portion 230 for controlling Tape Drive 114c. The event driven portion 230 employs data structures ECB4 910b, and ECB5 920b ("App2 ECBs") for the two active I/O requests, and employs an MEVQ2 1115 data structure to maintain the App2 ECBs.

In yet another example, App3 102c may make three active I/O requests from the event driven portion 230 for controlling the Printer/Video 114c. The event driven portion 230 employs data structures ECB6 910c, ECB7 915c, and ECB8 920c ("App3 ECBs") for the three active I/O requests, and uses an MEVQ3 1120 data structure to maintain the App3 ECBs. In addition, the event driven portion 230 uses a MEVQ header 1105 data structure to maintain the MEVQ1 1110, MEVQ2 1115, and MEVQ3 1120 data structures.

The event driven portion 230 implements I/O requests by using the event driven coordination portion 240 of the internal interface 210 via logic path 232. The event driven coordination portion 240 further implements the I/O requests by using the event driver portion 245 of the Device Driver interface 220 via logic paths 244 and 243.

The event driven portion 245 further implements the active I/O requests by invoking functions contained within device drivers responsible for communicating with the desired physical device. For example, the active I/O requests from App1 102a, which are represented by the App1 ECBs, are implemented by the event driver portion 245. The event driver portion 245 invokes functions within a TAU device driver 110a, and passes the App1 ECBs via logic path 246a. The TAU device driver 110a uses internal operations and data structures such as a Device Control Table (DCT) to implement the I/O requests.

In another example, the active I/O requests from App2 4003, which are represented by the App2 ECBs, are implemented by the event driver portion 245. The event driver portion 245 invokes functions within a tape device driver 110b, and passes the App2 ECBs via logic path 246b. The tape device driver 110b uses internal operations and data structures such as a DCT to implement the I/O requests.

In yet another example, the active I/O requests from App3 102b, which are represented by the App3 ECBs, are implemented by the event driver portion 245. The event driver portion 245 invokes functions within a printer/video (PV) device driver 110c, and passes he App3 ECBs via logic path 246c. The PV device driver 110c uses internal operations and data structures such as a DCT to implement the I/O requests.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the present invention as defined in the following claims.

What is claimed is:

1. A method of implementing transitions from one state to another within a finite state machine being implemented by an application program executing on an operating system comprising an Input/Output (I/O) Event Manager subsystem, the finite state machine having at least one process within the operating system, the method comprising the steps of:
   implementing each individual state of the finite state machine in a main state processing function within the application program;
   creating a state vector table within the application program, the state vector table forming a single dimensioned array having a plurality of elements each one of which contains a physical address for a corresponding state of the finite state machine;
   requesting from the I/O Event Manager subsystem an assignment of a state control block to the finite state machine, the state control block identifying a single one of the at least one process;
   requesting from the I/O Event Manager subsystem a transition from a first state to a second state of the finite state machine; and
   directing the identified process from the first state to the second state of the finite state machine with the I/O Event Manager subsystem.

2. The method of claim 1 wherein the step of creating a state vector table includes the step of:
   creating a state vector table within the application program, the state vector table forming a single dimensioned array having a plurality of elements each one of which contains a physical address for a state having a sequence within the finite state machine which has a one-to-one correspondence with the sequence of the element within the state vector table.

3. The method of claim 2 wherein the step of requesting from the I/O Event Manager subsystem an assignment of a state control block to the finite state machine includes the step of:
   storing a pointer to the identified process within the state control block.

4. The method of claim 3 further including the step of:
   storing a pointer to the state vector table within the assigned state control block.

5. The method of claim 4 wherein the step of directing includes the steps of:
   accessing the state control block to locate the identified process and the state vector table;
   retrieving a stack within the operating system which is associated with the identified process;
   retrieving the physical address for the second state from the state vector table; and
   pushing the retrieved physical address onto the retrieved stack, thereby performing the requested transition by directing the identified process from the first state to the second state of the finite state machine.

6. The method of claim 5 wherein the operating system is a multi-tasking operating system.

7. The method of claim 5 wherein the operating system is a preemptive multi-tasking operating system.

8. The method of claim 5 wherein the operating system is executing within a telecommunications switch.

9. The method of claim 6 wherein the multi-tasking operating system is executing within a telecommunications switch.

10. A method of providing an application program with event driven control over the inputs and outputs of a hardware device, the application program executing on an operating system comprising an Input/Output Event Manager subsystem and having at least one process associated with the application program, the I/O Event Manager Subsystem using a device driver to communicate with the hardware device and supporting a plurality of types of event waiting, the method comprising the steps of:
   receiving within the I/O Event Manager subsystem an Input/Output (I/O) request from the application program, the I/O request including a specification for one of the plurality of types of event waiting and an event of one of the inputs or outputs of the hardware device;
   assigning an event control block to the I/O request with the I/O Event Manager subsystem;
   storing the specified type of event waiting, the specified event, and an identification of a single one of the at least one process in the assigned event control block;
   transmitting the event control block to the device driver;
   receiving the event control block in the I/O Event Manager subsystem from the device driver after the specified event has occurred; and manipulating the identified process with the I/O Event Manager subsystem to implement the specified type of event waiting thereby providing event driven control over the inputs and outputs of the hardware device.

11. The method of claim 10 wherein the specified type of event waiting is passive.

12. The method of claim 11 wherein the step of transmitting includes the step of:

suspending the identified process.

13. The method of claim 12 wherein the step of manipulating includes the step of:

reactivating the suspended process.

14. The method of claim 10 wherein the specified type of event waiting is redirection.

15. The method of claim 14 wherein the step of manipulating includes the step of:

redirecting the identified process to another location within the application program.

16. The method of claim 10 wherein the specified type of event waiting is active.

17. The method of claim 16 wherein the step of manipulating includes the step of:

redirecting the identified process to a location where the I/O request was made.

18. The method of claim 10 wherein a plurality of event control blocks are dynamically created during the initialization of the I/O Event Manager subsystem.

19. The method of claim 10 wherein the operating system is a multi-tasking operating system.

20. The method of claim 11 wherein the operating system is a preemptive multi-tasking operating system.

21. The method of claim 19 wherein the multi-tasking operating system is executing within a telecommunications switch.

22. A method of creating a device driver for providing event driven control over the inputs and outputs of a hardware device for an Input/Output (I/O) Event Manager subsystem of an operating system, the method comprising the steps of:

creating a plurality of input assembly functions each one of which controls one of the inputs of the hardware device;

creating a plurality of output assembly functions each one of which controls one of the outputs of the hardware device;

storing the input and output assembly functions in a first file;

creating an input state machine which monitors and retrieves data from the inputs of the hardware device by executing the input assembly functions;

creating an output state machine which monitors and transmits data to the outputs of the hardware device by executing the output assembly functions;

storing the input and output state machines in a second file;

creating a plurality of system interface functions each one of which controls both the input and output state machines;

storing the plurality of system interface functions in a third file;

inserting the physical location of each one of the system interface functions into a device vector table;

providing the I/O Event Manager access to the device vector table; and providing the device driver access to the I/O Event Manager.

23. An apparatus for implementing transitions from one state to another within a finite state machine being implemented by an application program executing on an operating system comprising an Input/Output (I/O) Event Manager subsystem, the finite state machine having at least one process within the operating system, the apparatus comprising:

means for implementing each individual state of the finite state machine in a main state processing function within the application program;

means for creating a state vector table within the application program, the state vector table forming a single dimensioned array having a plurality of elements each one of which contains a physical address for a corresponding state of the finite state machine;

means for requesting from the I/O Event Manager subsystem an assignment of a state control block to the finite state machine, the state control block identifying a single one of the at least one process;

means for requesting from the I/O Event Manager subsystem a transition from a first state to a second state of the finite state machine; and means for directing the identified process from the first state to the second state of the finite state machine with the I/O Event Manager subsystem.

24. The apparatus of claim 23 wherein the means for creating a state vector table includes:

means for creating a state vector table within the application program, the state vector table forming a single dimensioned array having a plurality of elements each one of which contains a physical address for a state having a sequence within the finite state machine which has a one-to-one correspondence with the sequence of the element within the state vector table.

25. The apparatus of claim 24 wherein the means for requesting from the I/O Event Manager subsystem an assignment of a state control block to the finite state machine includes:

means for storing a pointer to the identified process within the state control block.

26. The apparatus of claim 25 further including:

means for storing a pointer to the state vector table within the assigned state control block.

27. The apparatus of claim 26 wherein the means for directing includes:

means for accessing the state control block to locate the identified process and the state vector table;

means for retrieving a stack within the operating system which is associated with the identified process;

means for retrieving the physical address for the second state from the state vector table; and means for pushing the retrieved physical address onto the retrieved stack, thereby performing the requested transition by directing the identified process from the first state to the second state of the finite state machine.

28. The apparatus of claim 27 wherein the operating system is a multi-tasking operating system.

29. The apparatus of claim 27 wherein the operating system is a preemptive multi-tasking operating system.

30. The apparatus of claim 27 wherein the operating system is executing within a telecommunications switch.

31. The apparatus of claim 29 wherein the multi-tasking operating system is executing within a telecommunications switch.

32. An apparatus of providing an application program with event driven control over the inputs and outputs of a hardware device, the application program executing on an operating system comprising an Input/Output Event Manager subsystem and having at least one process associated with the application program, the I/O Event Manager Subsystem using a device driver to communicate with the hardware device and supporting a plurality of types of event waiting, the apparatus comprising:

- means for receiving within the I/O Event Manager subsystem an Input/Output (I/O) request from the application program, the I/O request including a specification for one of the plurality of types of event waiting and an event of one of the inputs or outputs of the hardware device;
- means for assigning an event control block to the I/O request with the I/O Event Manager subsystem;
- means for storing the specified type of event waiting, the specified event, and an identification of a single one of the at least one process in the assigned event control block;
- means for transmitting the event control block to the device driver;
- means for receiving the event control block in the I/O Event Manager subsystem from the device driver after the specified event has occurred; and
- means for manipulating the identified process with the I/O Event Manager subsystem to implement the specified type of event waiting thereby providing event driven control over the inputs and outputs of the hardware device.

33. The apparatus of claim 32 wherein the specified type of event waiting is passive.

34. The apparatus of claim 33 wherein the means for transmitting includes:

means for suspending the identified process.

35. The apparatus of claim 34 wherein the means for manipulating includes:

means for reactivating the suspended process.

36. The apparatus of claim 32 wherein the specified type of event waiting is redirection.

37. The apparatus of claim 36 wherein the means for manipulating includes:

means for redirecting the identified process to another location within the application program.

38. The apparatus of claim 32 wherein the specified type of event waiting is active.

39. The apparatus of claim 38 wherein the means for manipulating includes:

means for redirecting the identified process to a location where the I/O request was made.

40. The apparatus of claim 32 wherein a plurality of event control blocks are dynamically created during the initialization of the I/O Event Manager subsystem.

41. The apparatus of claim 32 wherein the operating system is a multi-tasking operating system.

42. The apparatus of claim 33 wherein the operating system is a preemptive multi-tasking operating system.

43. The apparatus of claim 41 wherein the multi-tasking operating system is executing within a telecommunications switch.

44. A method of implementing, within an application program, real-time event driven control over a hardware device, said application program executing within a computing system having an operating system, said method comprising the steps of:

inserting an Input/Output (I/O) Event Manager subsystem in said operating system;

loading a device driver, within said computing system, for driving said hardware device;

executing a request instruction within said application program, said request instruction specifying an event from said hardware device, said request instruction further specifying a type of event waiting including redirection event waiting;

processing said request instruction with said I/O Event Manager subsystem while said application program continues to simultaneously execute instructions other than said request instruction, said processing including the steps of:

transmitting said request instruction to said device driver;

receiving within said I/O Event Manager subsystem an indication that said event is mature; and directing said application program to execute a first instruction based upon said mature event, said first instruction being user definable.

45. The method of claim 44 further comprising the step of:

executing, within said application program, a plurality of request instructions, each one of said plurality of request instructions specifying an event from said hardware device.

46. The method of claim 44 wherein said first instruction is located immediately after said request instruction.

47. The method of claim 44 wherein said operating system is a multi-tasking operating system.

48. The method of claim 44 wherein said operating system is a preemptive multi-tasking operating system.

49. The method of claim 44 wherein said computing system is a telecommunications switch.

50. The method of claim 44 wherein said computing system is a terminal adapter unit.

51. A method of implementing, within an application program, real-time event driven control over software, said application program and said software executing within a computing system having an operating system, said method comprising the steps of:

inserting an Input/Output (I/O) Event Manager subsystem in said operating system;

executing a request instruction, within said application program, said request instruction specifying a type of event waiting including redirection event waiting;

processing said request instruction with said I/O Event Manager subsystem while said application program continues to simultaneously execute instructions other than said request instruction, said processing including the steps of:

transmitting said request instruction to said software;

receiving, within said I/O Event Manager subsystem, an indication that said event is mature; and directing said application program to execute a first instruction based upon said mature event, said first instruction being user definable.

52. The method of claim 51 wherein said first instruction is located immediately after said request instruction.

53. The method of claim 51 wherein said operating system is a multi-tasking operating system.

54. The method of claim 51 wherein said operating system is a preemptive multi-tasking operating system.

55. The method of claim 51 wherein said computing system is a telecommunications switch.

56. The method of claim 51 wherein said computing system is a terminal adapter unit.

57. A computing system for providing an application program with real-time event driven control over a hardware device, said computing system comprising:

means for executing an operating system having an Input/ Output (I/O) Event Manager subsystem;

means for executing a device driver for driving said hardware device;

means for executing a request instruction within said application program, said request instruction specifying an event from said hardware device, said request instruction further specifying a type of event waiting including redirection event waiting;

means for processing said request instruction with said I/O Event Manager subsystem while said application program continues to simultaneously execute instructions other than said request instruction, said processing means including:

means for transmitting said request instruction to said device driver;

means for receiving within said I/O Event Manager subsystem an indication that said event is mature; and means for directing said application program to execute a first instruction based upon said mature event, said first instruction being user definable.

58. The computing system of claim 57 further comprising:

means for executing a plurality of request instructions within said application program, each one of said plurality of request instructions specifying an event from said hardware device.

59. The computing system of claim 57 wherein said operating system is a multi-tasking operating system.

60. The computing system of claim 57 wherein said operating system is a preemptive multi-tasking operating system.

61. The computing system of claim 57 wherein said computing system is a telecommunications switch.

62. The computing system of claim 57 wherein said computing system is a terminal adapter unit.

63. A computing system for providing an application program with real-time event driven control, over software, said computing system comprising:

means for executing an operating system having an Input/ Output (I/O) Event Manager subsystem;

means for executing a request instruction within said application program, said request instruction specifying a type of event waiting including redirection event waiting;

means for processing said request instruction with said I/O Event Manager subsystem while said application program continues to simultaneously execute instructions other than said request instruction, said processing means including:

means for transmitting said request instruction to said software;

means for receiving, within said I/O Event Manager subsystem, an indication that said event is mature; and means for directing said application program to execute a first instruction based upon said mature event, said first instruction being user definable.

64. The computing system of claim 63 wherein said first instruction is located immediately after said request instruction.

65. The computing system of claim 63 wherein said operating system is a multi-tasking operating system.

66. The computing system of claim 63 wherein said operating system is a preemptive multi-tasking operating system.

67. The computing system of claim 63 wherein said computing system is a telecommunications switch.

68. The computing system of claim 63 wherein said computing system is a terminal adapter unit.

* * * * *

UNITED STATES PATENT AND TRADEMARK OFFICE
CERTIFICATE OF CORRECTION

PATENT NO. : 5,721,920
DATED : February 24, 1998
INVENTOR(S) : Simon Chung-Tong Mak et al.

It is certified that error appears in the above-identified patent and that said Letters Patent is hereby corrected as shown below:

<u>Column 2,</u>
Line 38, replace "(sub_arry)" with -- (scb_arry) --

<u>Column 3,</u>
Line 40, replace "are flow chart" with -- are a flow chart --

<u>Column 13,</u>
Line 22, replace "are pass ed" with -- are passed --
Lines 48 and 50, replace "STS_STU" with -- STS_STRU --

<u>Column 14,</u>
Line 21, replace "ecb_array is make." with -- ecb_array is made. --
Line 65, replace "rw_STU" with -- rw_STRU --

<u>Column 15,</u>
Line 1, replace "rw_STU" with -- rw_STRU --

<u>Column 22,</u>
Line 20, replace "driver indicated" with -- driver has indicated --

<u>Column 31,</u>
Line 66, replace "an a plurality" with -- and a plurality --

UNITED STATES PATENT AND TRADEMARK OFFICE
CERTIFICATE OF CORRECTION

PATENT NO.   : 5,721,920
DATED        : February 24, 1998
INVENTOR(S)  : Simon Chung-Tong Mak et al.

It is certified that error appears in the above-identified patent and that said Letters Patent is hereby corrected as shown below:

Column 32,
Line 19, replace "916a-c," with -- 915a-c, --

Column 33,
Line 32, replace "passes he App3" with -- passes the App3 --

Signed and Sealed this

Sixth Day of May, 2003

JAMES E. ROGAN
*Director of the United States Patent and Trademark Office*